(12) United States Patent
Takagishi

(10) Patent No.: US 9,467,509 B2
(45) Date of Patent: Oct. 11, 2016

(54) DEVICE CONTROL METHOD AND COMPUTER-READABLE RECORDING MEDIUM

(71) Applicant: PANASONIC INTELLECTUAL PROPERTY CORPORATION OF AMERICA, Torrance, CA (US)

(72) Inventor: Satoru Takagishi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/582,462

(22) Filed: Dec. 24, 2014

(65) Prior Publication Data

US 2015/0180967 A1     Jun. 25, 2015

Related U.S. Application Data

(63) Continuation of application No. PCT/JP2013/003431, filed on May 30, 2013.

(60) Provisional application No. 61/806,536, filed on Mar. 29, 2013.

(51) Int. Cl.
*G06F 15/16* (2006.01)
*H04L 29/08* (2006.01)
(Continued)

(52) U.S. Cl.
CPC ............ *H04L 67/104* (2013.01); *H04L 67/02* (2013.01); *H04M 1/72561* (2013.01); *H04M 3/493* (2013.01)

(58) Field of Classification Search
USPC ........................................................ 709/204
See application file for complete search history.

(56) References Cited

U.S. PATENT DOCUMENTS

| 6,763,226 B1* | 7/2004 | McZeal, Jr. ........ H04B 7/18595 370/354 |
| 2003/0108176 A1* | 6/2003 | Kung ...................... H04M 3/54 379/211.02 |

(Continued)

FOREIGN PATENT DOCUMENTS

| JP | 2002-182774 | 6/2002 |
| JP | 2004-144602 | 5/2004 |

(Continued)

OTHER PUBLICATIONS

Search report and Written Opinion of the International Searching Authority from PCT/JP2013/003431, mail date is Aug. 27, 2013.

*Primary Examiner* — Richard G Keehn
(74) *Attorney, Agent, or Firm* — Greenblum & Bernstein, P.L.C.

(57) ABSTRACT

A method in a communication system in the present disclosure includes: receiving a first access from the information apparatus which starts a first application for a telephone conversation function; transmitting an identifier and a confirmation destination address to the information apparatus in response to the first access; receiving an instruction to the information apparatus from the information processing apparatus; receiving a second access using the confirmation destination address from the information apparatus; transmitting the instruction to the information apparatus in response to the second access; and when it is judged that the instruction instructs the information apparatus to start the second application for providing a camera function, causing the information apparatus to continue the telephone conversation process, to start the second application without involving a user operation, receiving image information captured using the camera function from the information apparatus, and forwarding the image information to the information processing apparatus.

18 Claims, 40 Drawing Sheets

(51) Int. Cl.
*H04M 1/725* (2006.01)
*H04M 3/493* (2006.01)

(56) References Cited

U.S. PATENT DOCUMENTS

| | | | | |
|---|---|---|---|---|
| 2004/0228336 A1* | 11/2004 | Kung | ............... | H04L 12/14 370/352 |
| 2006/0101116 A1* | 5/2006 | Rittman | ............. | H04L 12/1813 709/204 |
| 2010/0073201 A1* | 3/2010 | Holcomb | .............. | G08G 1/005 340/990 |
| 2010/0298026 A1* | 11/2010 | Goodman | ......... | H04M 1/72583 455/552.1 |
| 2011/0249086 A1* | 10/2011 | Guo | ...................... | H04N 7/147 348/14.12 |
| 2012/0239783 A1 | 9/2012 | Sugaya | | |
| 2013/0065569 A1* | 3/2013 | Leipzig | ................... | H04W 8/22 455/416 |
| 2014/0136665 A1 | 5/2014 | Sugaya | | |
| 2015/0142605 A1* | 5/2015 | Durante | ............. | G06Q 30/0601 705/26.61 |

FOREIGN PATENT DOCUMENTS

| | | |
|---|---|---|
| JP | 2007-134814 | 5/2007 |
| JP | 2008-040915 | 2/2008 |
| JP | 2012-195843 | 10/2012 |
| WO | 2009/022502 | 2/2009 |

\* cited by examiner

FIG. 12

| ACCESS DESTINATION INFORMATION OF CLOUD SERVER | ACCESS DESTINATION INFORMATION OF CALL-RESPONSE CONTROL SERVER | IDENTIFICATION INFORMATION OF OPERATOR OPERATION TERMINAL |
|---|---|---|
| http://cloud-server.com/ | http://remote-tel.com/ | 0000010001 |

| ACCESS DESTINATION INFORMATION OF CLOUD SERVER | ACCESS DESTINATION INFORMATION OF CALL-RESPONSE CONTROL SERVER | IDENTIFICATION INFORMATION OF OPERATOR OPERATION TERMINAL |
|---|---|---|
| http://cloud-server.com/ | http://remote-tel.com/ | 0000010001 |

9701

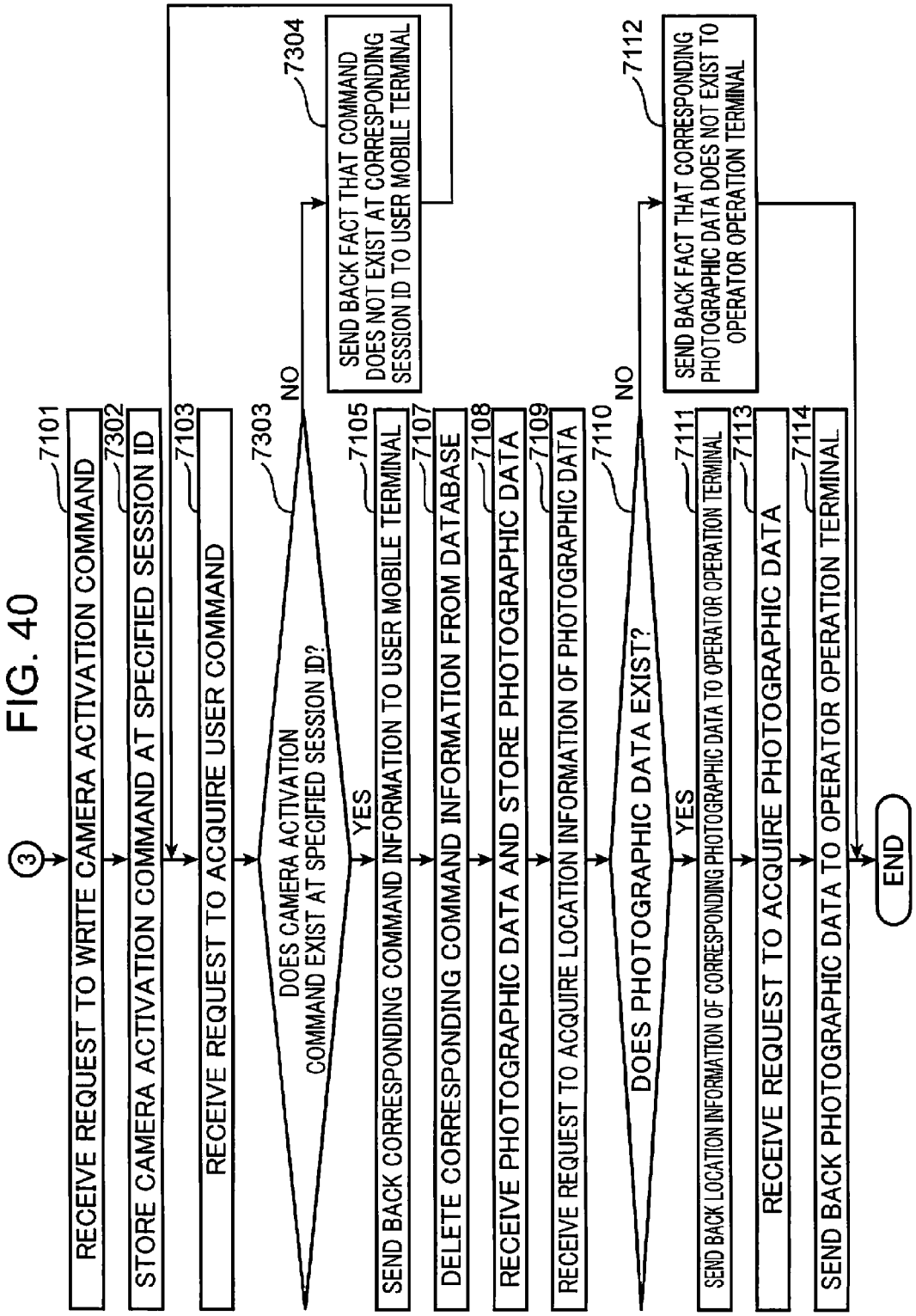

DEVICE CONTROL METHOD AND COMPUTER-READABLE RECORDING MEDIUM

RELATED APPLICATIONS

This application is a continuation application of International Application No. PCT/JP2013/003431, filed May 30, 2013, which claims the benefit of U.S. Provisional Application No. 61/806,536, filed Mar. 29, 2013, the disclosures of which are incorporated by reference herein in their entireties.

TECHNICAL FIELD

The present disclosure relates to a device control method and a computer-readable recording medium.

BACKGROUND ART

Patent Document 1 relates to a service system in which an operator searches for a destination on behalf of a user of a mobile phone. Specifically, when an application named "EZ Koban" is started on a display screen of a mobile phone 1, the mobile phone 1 acquires a current position of the mobile phone 1 from a GPS apparatus 3 (FIG. 4). Next, the application is interrupted and a call is made by the mobile phone 1 to a service center of an operator (FIG. 4). In a telephone conversation with the user via the mobile phone 1, the operator orally confirms a destination of the user. The operator searches for map information from a current position of the mobile phone 1 to a destination and registers the map information in an EZ Koban server 4 (FIG. 5). The user of the mobile phone 1 ends the telephone conversation with the operator, restarts the application with the mobile phone 1, and accesses the EZ Koban server 4 to acquire the map information (FIG. 6).

However, the background art described above conceivably requires further improvement.

CITATION LIST

Patent Document

Patent Document 1: Japanese Unexamined Patent Publication No. 2004-144602

SUMMARY OF INVENTION

In one general aspect, the techniques disclosed here feature a device control method in a communication system connectable via a network to an information apparatus of a user and to an information processing apparatus of a service center, the information apparatus being equipped with a first application for providing a telephone conversation function and a second application for providing a camera function, the device control method comprising:

receiving a first access from the information apparatus based on a telephone conversation instruction at the information apparatus, the telephone conversation instruction instructing a telephone conversation with the information processing apparatus, the information apparatus starting the first application to execute a telephone conversation process with the information processing apparatus based on the telephone conversation instruction, an identifier, which identifies the information apparatus, being assigned to the information apparatus by the first access;

transmitting the identifier and a confirmation destination address to the information apparatus in response to the first access, the confirmation destination address being for confirming an instruction from the information processing apparatus to the information apparatus;

receiving from the information processing apparatus the instruction to the information apparatus in association with the identifier;

receiving from the information apparatus a second access using the confirmation destination address in association with the identifier;

transmitting the instruction to the information apparatus corresponding to the identifier, to the information apparatus in response to the second access; and when it is judged at the information apparatus that the transmitted instruction instructs the information apparatus to start the second application, causing the information apparatus to continue the telephone conversation process using the first application and to start the second application without involving a user operation at the information apparatus, receiving from the information apparatus image information captured by the information apparatus using the camera function provided by the second application, and forwarding the image information to the information processing apparatus.

According to the present disclosure, a further improvement can be achieved. These general and specific aspects may be implemented using a system, a method, and a computer program, and any combination of systems, methods, and computer programs.

BRIEF DESCRIPTION OF DRAWINGS

FIG. 12 is a diagram showing an example of a user access destination information table of a cloud server according to the first embodiment of the present disclosure.

FIG. 32 is a diagram showing an example of a user access destination information table of a cloud server according to the third embodiment of the present disclosure.

FIG. 40 is a diagram showing a process flow including and subsequent to start of a telephone conversation of a cloud server according to the third embodiment of the present disclosure.

Figure 1:
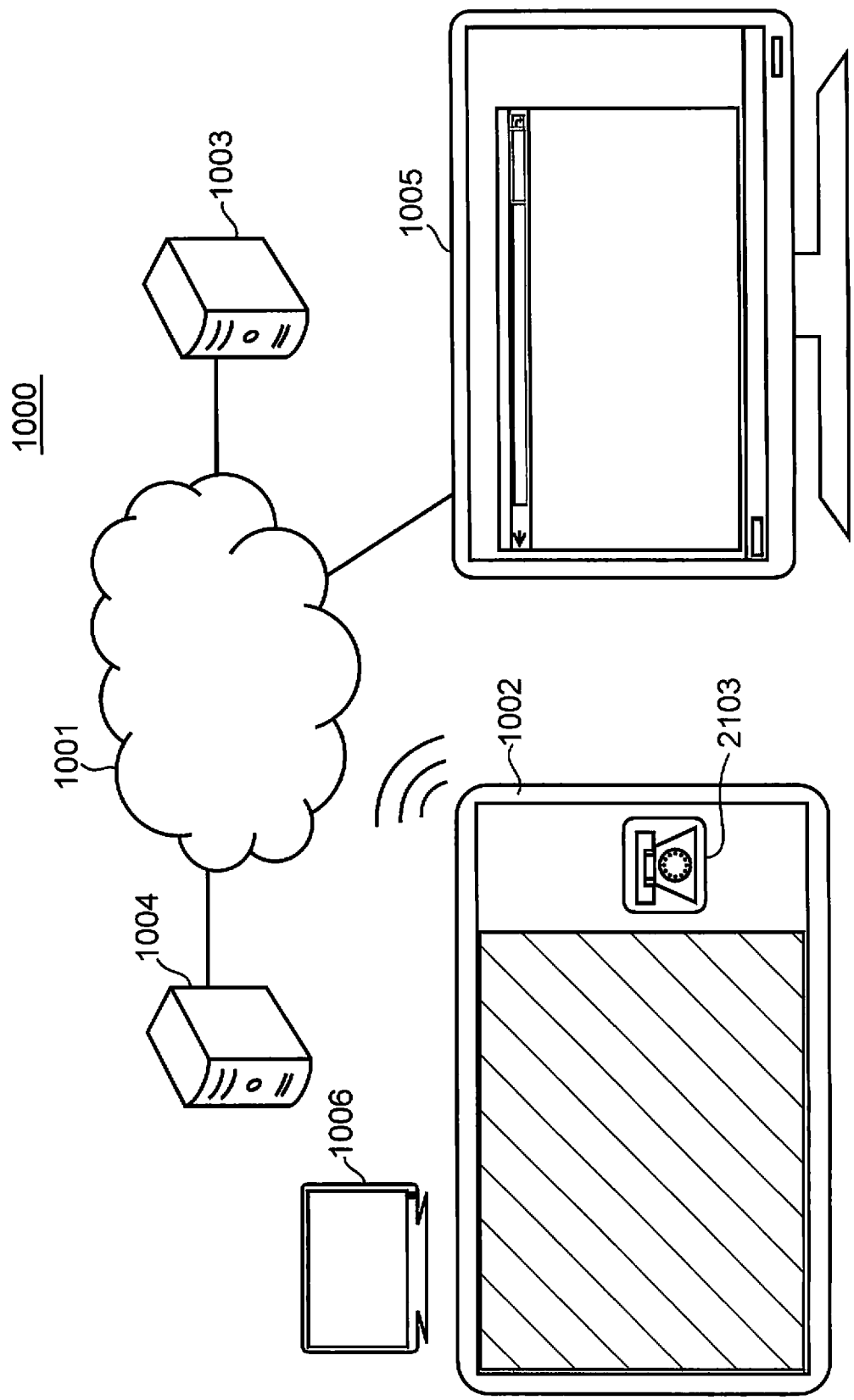
FIG. 1 is a diagram showing an overall configuration according to a first embodiment of the present disclosure.

DETAILED DESCRIPTION (Circumstances to Invent an Aspect of the Present Disclosure)

First, viewpoints of an aspect according to the present disclosure will be described.

In Patent Document 1, a series of processes is performed in a same device that is the mobile phone 1 in a sequence of 1) start of application, 2) telephone conversation process, and 3) restart of application. A plurality of types of processes such as a process by an application and a voice telephone conversation process are included in the series of processes. In this case, each of the processes 1) to 3) is proactively performed by the mobile phone 1 with respect to an operator or the EZ Koban server 4. Therefore, this is not a case where functions built into the mobile phone 1 are activated from the outside by remote control. This is simply a case where the mobile phone 1 retrieves, from the EZ Koban server 4, map information prepared by the operator and registered in the EZ Koban server 4 by restarting an application that had already been started by the user.

Based on the considerations described above, the present inventors has arrived to invent the respective aspects according to the present disclosure as presented below.

An aspect of the present disclosure is a device control method in a communication system connectable via a network to an information apparatus of a user and to an information processing apparatus of a service center, the information apparatus being equipped with a first application for providing a telephone conversation function and a second application for providing a camera function, the device control method comprising:

receiving a first access from the information apparatus based on a telephone conversation instruction at the information apparatus, the telephone conversation instruction instructing a telephone conversation with the information processing apparatus, the information apparatus starting the first application to execute a telephone conversation process with the information processing apparatus based on the telephone conversation instruction, an identifier, which identifies the information apparatus, being assigned to the information apparatus by the first access;

transmitting the identifier and a confirmation destination address to the information apparatus in response to the first access, the confirmation destination address being for confirming an instruction from the information processing apparatus to the information apparatus;

receiving from the information processing apparatus the instruction to the information apparatus in association with the identifier;

receiving from the information apparatus a second access using the confirmation destination address in association with the identifier;

transmitting the instruction to the information apparatus corresponding to the identifier, to the information apparatus in response to the second access; and when it is judged at the information apparatus that the transmitted instruction instructs the information apparatus to start the second application, causing the information apparatus to continue the telephone conversation process using the first application and to start the second application without involving a user operation at the information apparatus, receiving from the information apparatus image information captured by the information apparatus using the camera function provided by the second application, and forwarding the image information to the information processing apparatus.

According to the aspect described above, preparation of a passive process by the information apparatus is performed based on a proactive process by the information apparatus of a telephone conversation process based on a telephone conversation instruction by the information apparatus.

Accordingly, the user of the information apparatus is not required to perform any operation other than the telephone conversation instruction in order to enable the information processing apparatus to remotely control the information apparatus. Therefore, a process for remotely controlling the information apparatus with the information processing apparatus can be simplified.

In addition, the information apparatus can be remotely controlled with the information processing apparatus from an initial timing of a telephone conversation at which a telephone conversation process based on a telephone conversation instruction by the information apparatus is started. As a result, the information apparatus can be controlled while reducing time lag in relation to progress of the telephone conversation.

Furthermore, while continuing the telephone conversation process started under the initiative of the information apparatus, a second application for providing a camera function that is mounted to the information apparatus is started by remotely controlling the information apparatus under the initiative of the communication system without involving a user operation at the information apparatus. Image information captured by the camera function is forwarded to the information processing apparatus.

Accordingly, for example, the camera function of the information apparatus can be started by remote control during a telephone conversation between the user of the information apparatus and an operator and by having the user use the information apparatus to, for example, capture an image of a product number or a failure location of a target device experiencing a malfunction, the image can be forwarded to the information processing apparatus of the operator. Therefore, the user of the information apparatus can be provided with appropriate advice or maintenance information based on visual information in the form of an image in addition to voice information in the form of a telephone conversation.

In addition, the user of the information apparatus need only issue a telephone conversation instruction and need not perform a separate operation at the information apparatus to start the second application. Therefore, operations by the user of the information apparatus can be simplified and a state can be created in the information apparatus where image information can be provided in addition to voice information provided by the telephone conversation instruction issued by the user.

For example, in cases where a malfunction occurs in a household electrical appliance of the user and the user engages in the telephone conversation using the information apparatus with the service center in order to repair the malfunction, simply exchanging voice information may not be sufficient to repair the malfunction. In such cases, if an application for providing a camera function that is mounted to the information apparatus can be started from the service center by remote control, an image of the household electrical appliance experiencing the malfunction can be captured using the camera function and a solution can be provided based on visual information in the form of the captured image and on the voice information.

In the aspect described above, for example, the information processing apparatus may acquire the identifier transmitted by the information apparatus.

According to the aspect described above, since the information processing apparatus acquires the identifier transmitted by the information apparatus, the information processing apparatus can reliably acquire the identifier.

In the aspect described above, for example, the information apparatus may be equipped with a third application for requesting remote support to the communication system;

a third access may be received from the information apparatus based on start of the third application at the information apparatus;

address information of the information processing apparatus may be transmitted to the information apparatus in response to the third access; and the information apparatus may execute the telephone conversation process with the information processing apparatus, using the address information of the information processing apparatus, based on the telephone conversation instruction instructing the telephone conversation with the information processing apparatus.

According to the aspect described above, the information apparatus is equipped with a third application for requesting remote support to the communication system. A third access is received from the information apparatus based on start of the third application at the information apparatus. Address information of the information processing apparatus is transmitted to the information apparatus in response to the third access. The mobile information apparatus executes the telephone conversation process with the information processing apparatus using the address information of the information processing apparatus based on the telephone conversation instruction instructing the telephone conversation with the information processing apparatus. Therefore, the information apparatus can favorably execute the telephone conversation process with the information processing apparatus by simply starting the third application and issuing the telephone conversation instruction.

In the aspect described above, for example, when a display screen corresponding to the third application is displayed on the information apparatus based on the start of the third application, the display screen may include a telephone conversation instruction button of the first application or an image capture button of the second application.

According to the aspect described above, when a display screen corresponding to the third application is displayed on the information apparatus based on the start of the third application, the display screen includes a telephone conversation instruction button of the first application or an image capture button of the second application. Therefore, when the third application is started on the information apparatus, by operating the telephone conversation instruction button or the image capture button, the telephone conversation function provided by the first application or the camera function provided by the second application can be favorably operated.

In the aspect described above, for example, after the instruction to the information apparatus corresponding to the identifier is transmitted to the information apparatus in response to the second access, the instruction to the information apparatus may be erased from the communication system.

According to the aspect described above, after an instruction to the information apparatus corresponding to the identifier is transmitted to the information apparatus in response to the second access, the instruction to the information apparatus is erased from the communication system. Therefore, the likelihood of a misoperation in which a same instruction to the information apparatus is retransmitted to the information apparatus can be eliminated.

For example, the aspect described above may further includes:

managing the instruction to the information apparatus with a value for identifying the instruction after receiving from the information apparatus the second access using the confirmation destination address in association with the identifier; and transmitting to the information apparatus the instruction to the information apparatus with the value for identifying the instruction, in response to the second access.

According to the aspect described above, after receiving the second access using the confirmation destination address in association with the identifier from the information apparatus, the instruction to the information apparatus is managed with a value for identifying the instruction. The instruction to the information apparatus is transmitted to the information apparatus with the value for identifying the instruction, in response to the second access. Therefore, based on the value for identifying the instruction, the information apparatus can determine whether the instruction is the same as the previous instruction or different from the previous instruction.

Another aspect of the present disclosure is a method for controlling an information apparatus which is equipped with a first application for providing a telephone conversation function and a second application for providing a camera function, the method causing a computer of the information apparatus to:

sense a telephone conversation instruction instructing a telephone conversation with a predetermined destination;

start the first application to perform the telephone conversation with the predetermined destination when the telephone conversation instruction is sensed;

execute an access to the predetermined server using address information of a predetermined server that differs from the predetermined destination, separately from the telephone conversation process, in response to sensing of the telephone conversation instruction;

receive an identifier and a confirmation destination address from the predetermined server, the identifier identifying the information apparatus, the confirmation destination address being for confirming an instruction to the information apparatus from an information processing apparatus corresponding to the predetermined destination;

access the predetermined server based on the confirmation destination address to receive the instruction to the information apparatus from the predetermined server; and when it is judged that the received instruction instructs to start the second application, start the second application without involving a user operation at the information apparatus in a state where the telephone conversation process is continued using the first application on the information apparatus, and transmit to the predetermined server image information captured by the information apparatus using the camera function provided by the second application.

According to the present aspect, in response to sensing, at the information apparatus, of a telephone conversation instruction instructing a telephone conversation with the information processing apparatus, an identifier is acquired for identifying the information apparatus from the predetermined server separately from a telephone conversation process required by the telephone conversation instruction.

Accordingly, preparation of a passive process by the information apparatus involving being subjected to remote control by the information processing apparatus is performed based on a proactive process by the information apparatus of a telephone conversation process based on the telephone conversation instruction by the information apparatus.

Therefore, the user of the information apparatus is not required to perform any operation other than the telephone conversation instruction in order to enable the information processing apparatus to remotely control the information apparatus. As a result, a process for remotely controlling the information apparatus with the information processing apparatus can be simplified.

In addition, the information apparatus can be remotely controlled with the information processing apparatus from an initial timing of a telephone conversation at which a telephone conversation process based on a telephone conversation instruction by the information apparatus is started. As a result, the information apparatus can be controlled while reducing time lag in relation to progress of the telephone conversation.

Furthermore, in a state where the telephone conversation process which has been started under the initiative of the information apparatus is continued, a second application for providing a camera function that is mounted to the information apparatus is started by remotely controlling the information apparatus under the initiative of the predetermined server without involving a user operation at the information apparatus. Image information captured by the camera function is forwarded to the predetermined server.

Accordingly, for example, the camera function of the information apparatus can be started by remote control during a telephone conversation between the user of the information apparatus and an operator and by having the user use the information apparatus to, for example, capture an image of a product number or a failure location of a target device experiencing a malfunction, the image can be forwarded to the information processing apparatus of the operator. Therefore, the user of the information apparatus can be provided with appropriate advice or maintenance information based on visual information in the form of an image in addition to voice information in the form of a telephone conversation.

In addition, the user of the information apparatus need only issue a telephone conversation instruction and need not perform a separate operation at the information apparatus to start the second application. Therefore, operations of the user on the information apparatus can be simplified and a state can be created in the information apparatus where image information can be provided in addition to voice information provided by the telephone conversation instruction issued by the user.

In the other aspect described above, for example, the information apparatus may be equipped with a third application for requesting remote support to the information processing apparatus, the method may further cause the computer of the information apparatus to:

start the third application when sensing an instruction to start the third application;

display on a display of the information apparatus a display screen which corresponds to the third application upon start of the third application, the display screen including a telephone conversation instruction button; and execute access to the predetermined server using address information of the predetermined server included in the third application, in response to sensing of the telephone conversation instruction.

According to the aspect described above, the information apparatus is equipped with a third application for requesting remote support to the information processing apparatus. The third application is started when an instruction to start the third application is sensed. Upon start of the third application, a display screen corresponding to the third application is displayed on the display of the information apparatus. The display screen includes a telephone conversation instruction button. In response to the sensing of the telephone conversation instruction, address information of a predetermined server included in the third application is read out and access to the predetermined server is executed. Therefore, the user of the information apparatus can execute access to the predetermined server by simply starting the third application and operating the telephone conversation instruction button. As a result, the number of operations by the user that are required to access the predetermined server can be reduced.

In the other aspect described above, for example, the information apparatus may be equipped with a third application for requesting remote support to the information processing apparatus, the method may further cause the computer of the information apparatus to:

start the third application when sensing an instruction to start the third application;

execute access to the predetermined server to acquire address information of the predetermined destination, using address information of the predetermined server included in the third application, upon start of the third application;

receive the address information of the predetermined destination from the predetermined server, in response to the access to the predetermined server; and execute the telephone conversation process based on the start of the first application using the address information of the predetermined destination when the telephone conversation instruction is sensed.

According to the aspect described above, the information apparatus is equipped with a third application for requesting remote support to the information processing apparatus. The third application is started when an instruction to start the third application is sensed. Access to the predetermined server to acquire address information of the predetermined destination is executed, using address information of the predetermined server included in the third application, upon start of the third application. The address information of the predetermined destination is received from the predetermined server in response to the access to the predetermined server. The telephone conversation process based on the start of the first application is executed using the address information of the predetermined destination when the telephone conversation instruction is sensed. Therefore, the user of the information apparatus can execute the telephone conversation process using address information of the predetermined destination by simply starting the third application and operating the telephone conversation instruction button. As a result, the number of operations by the user that are required for the telephone conversation process with the predetermined destination can be reduced.

In the other aspect described above, for example, a display screen corresponding to the third application may be displayed on the information apparatus based on the start of the third application, the display screen including a telephone conversation instruction button of the first application.

According to the aspect described above, a display screen corresponding to the third application is displayed on the information apparatus based on the start of the third application. The display screen includes a telephone conversation instruction button of the first application. Therefore, the user of the information apparatus can activate the telephone conversation function provided by the first application by simply starting the third application and operating the telephone conversation instruction button. As a result, the number of operations by the user that are required for a telephone conversation process can be reduced.

For example, the other aspect described above may further cause the computer of to information apparatus to:

access the predetermined server based on the confirmation destination address to receive an instruction to the information apparatus from the predetermined server with a value for identifying the instruction; and store the value for identifying the instruction in a memory of the information apparatus, wherein when the received value is the same as a value previously stored in the memory of the information apparatus, the second application is not started.

According to the aspect described above, an instruction to the information apparatus is received from the predetermined server with a value for identifying the instruction by accessing the predetermined server based on the confirmation destination address. The value for identifying the instruction is stored in a memory of the information apparatus. When the received value is the same as a value previously stored in the memory of the information apparatus, the second application is not started. Therefore, a misoperation in which the second application is restarted by a same instruction as a previous instruction can be eliminated.

In the other aspect described above, for example, the value for identifying the instruction may include a hash value.

Another aspect of the present disclosure is a non-transitory computer-readable recording medium which stores a program executed by an information apparatus which is equipped with a first application for providing a telephone conversation function and a second application for providing a camera function.

the program causing a computer of the information apparatus to:

sense a telephone conversation instruction instructing a telephone conversation with a predetermined destination;

start the first application to perform the telephone conversation with the predetermined destination when the telephone conversation instruction is sensed;

execute an access to the predetermined server using address information of a predetermined server that differs from the predetermined destination, separately from the telephone conversation process, in response to sensing of the telephone conversation instruction;

receive an identifier and a confirmation destination address from the predetermined server, the identifier identifying the information apparatus, the confirmation destination address being for confirming an instruction to the information apparatus from an information processing apparatus corresponding to the predetermined destination;

access the predetermined server based on the confirmation destination address to receive the instruction to the information apparatus from the predetermined server; and when it is judged that the received instruction instructs an instruction to start the second application, start the second application without involving a user operation at the information apparatus in a state where the telephone conversation process is continued using the first application on the information apparatus, and transmit to the predetermined server image information captured by the information apparatus using the camera function provided by the second application.

In the other aspect described above, for example, the program may be used for requesting remote support to the information processing apparatus.

the program may further cause the computer of the information apparatus to:

display on a display of the information apparatus a display screen which corresponds to the program, based on start of the program, the display screen including a telephone conversation instruction button; and execute access to the predetermined server, using address information of the predetermined server included in the program, in response to sensing of the telephone conversation instruction.

In the other aspect described above, for example, the program may be used for requesting remote support to the information processing apparatus, the program may further cause the computer of the information apparatus to:

execute access to the predetermined server to acquire address information of the predetermined destination, using address information of the predetermined server included in the program, upon start of the program;

receive the address information of the predetermined destination from the predetermined server, in response to the access to the predetermined server; and execute the telephone conversation process based on the start of the first application using the address information of the predetermined destination when the telephone conversation instruction is sensed.

In the other aspect described above, for example, a display screen corresponding to the program may be displayed on the information apparatus based on the start of the program, and the display screen may include a telephone conversation instruction button of the first application.

In the other aspect described above, for example, the program may further cause the computer of the information apparatus to:

receive from the predetermined server an instruction to the information apparatus with a value for identifying the instruction by accessing the predetermined server based on the confirmation destination address; and store the value for identifying the instruction in a memory of the information apparatus, and when the received value is the same as a value previously stored in the memory of the information apparatus, the second application is not started.

In the other aspect described above, for example, the value for identifying the instruction may include a hash value.

Hereinafter, respective embodiments of the present disclosure will be described with reference to the drawings. It should be noted that same reference symbols are used to denote same components in the respective drawings.

(First Embodiment)

FIG. 1 is a diagram showing an overall configuration of a remote support system 1000 according to a first embodiment of the present disclosure. As shown in FIG. 1, the remote support system 1000 includes a user mobile terminal 1002, a cloud server 1003, a call-response control server 1004, and an operator operation terminal 1005. The user mobile terminal 1002, the cloud server 1003, the call-response control server 1004, and the operator operation terminal 1005 are connected via an external network 1001 such as the Internet so as to be capable of communicating with each other.

A mobile information apparatus such as a smartphone and a tablet is adopted as the user mobile terminal 1002. However, these are merely examples and a button type mobile information apparatus such as a mobile phone may be adopted as the user mobile terminal 1002. The cloud server 1003 is arranged at a cloud center. The cloud server 1003 mediates exchange of data, commands, and the like between the user mobile terminal 1002 and the operator operation terminal 1005. The call-response control server 1004 controls voice telephone conversation via the network 1001. The operator operation terminal 1005 is arranged at a support center. The operator operation terminal 1005 acquires information from the cloud server 1003 on, for example, a browser. For example, a personal computer is adopted as the operator operation terminal 1005.

Figure 2:
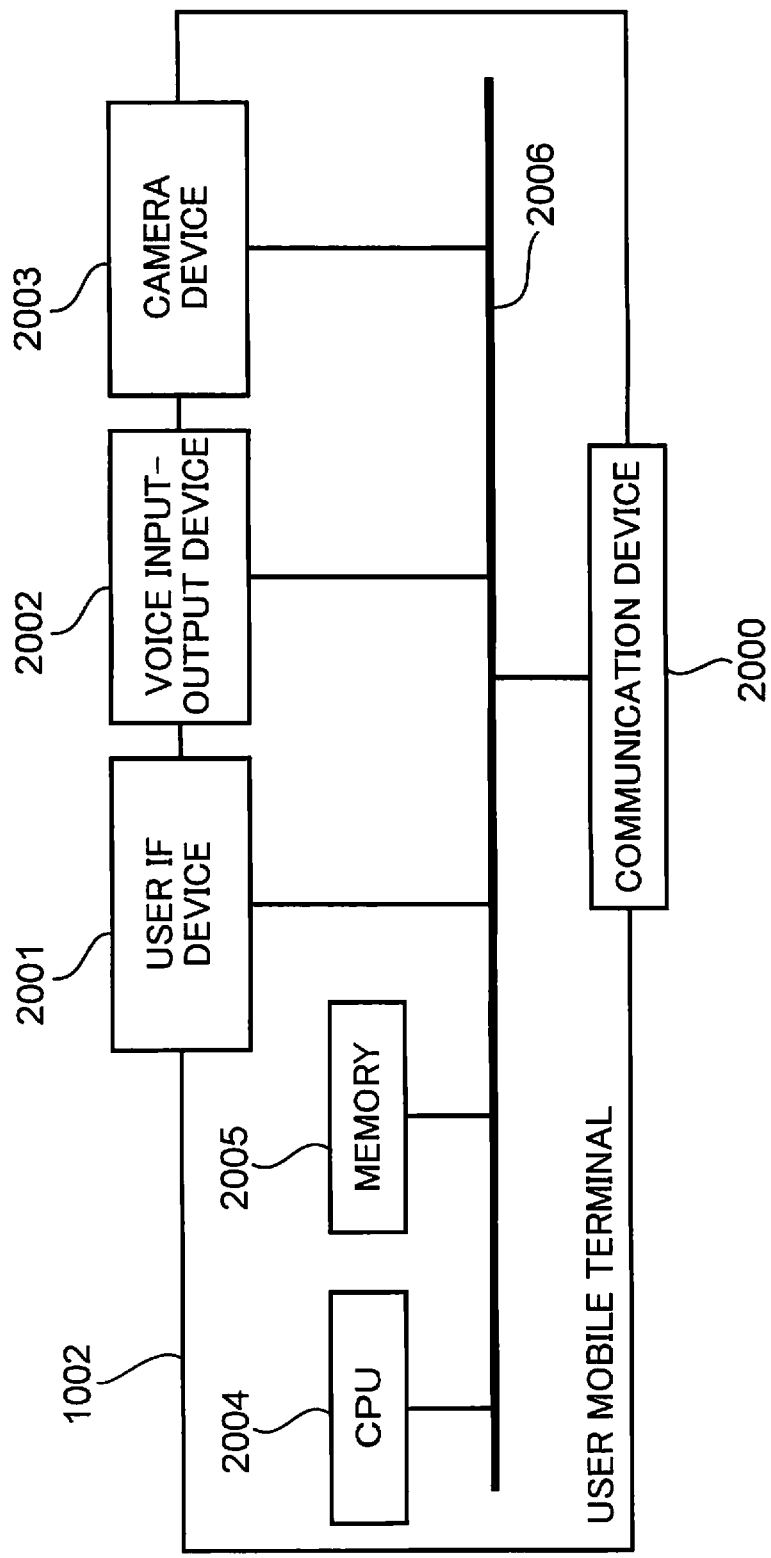
FIG. 2 is a block diagram showing a configuration of a user mobile terminal according to the first embodiment of the present disclosure.
Figure 3:
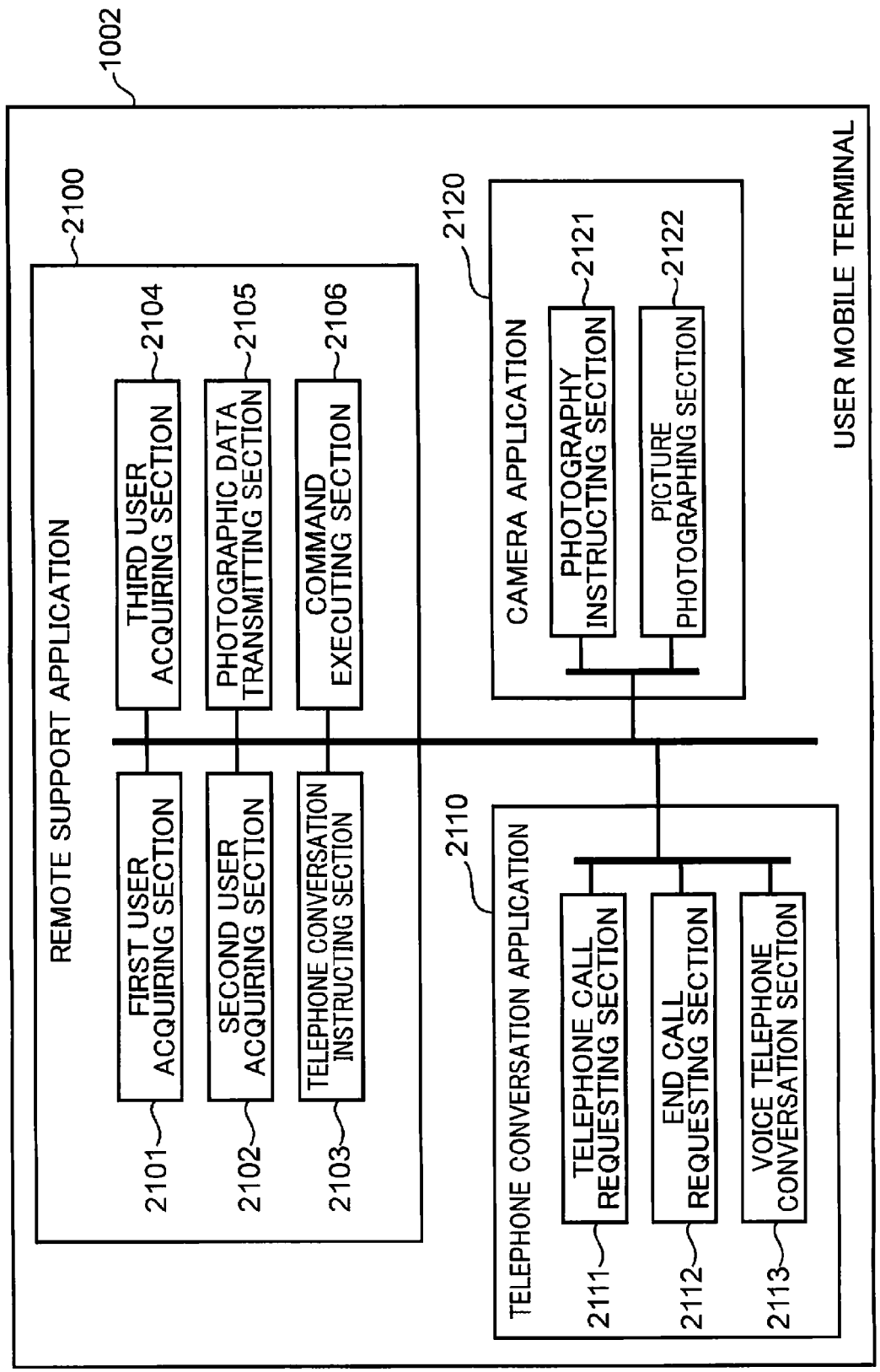
FIG. 3 is a diagram showing functional blocks of a user mobile terminal according to the first embodiment of the present disclosure.

FIG. 2 is a block diagram showing a configuration of the user mobile terminal 1002 according to the first embodiment of the present disclosure. FIG. 3 is a diagram showing functional blocks of the user mobile terminal 1002 according to the first embodiment of the present disclosure.

As shown in FIG. 2, the user mobile terminal 1002 includes a communication device 2000, a user interface (IF)

device 2001, a voice input-output device 2002, a camera device 2003, a CPU 2004, and a memory 2005. The communication device 2000, the user IF device 2001, the voice input-output device 2002, the camera device 2003, the CPU 2004, and the memory 2005 are connected to one another via a bus 2006.

The communication device 2000 communicates with the cloud server 1003, the call-response control server 1004, and the operator operation terminal 1005 via the network 1001. The user IF device 2001 displays information to the user and accepts operations from the user. The user IF device 2001 includes, for example, a touch panel type display. The voice input-output device 2002 includes a microphone and a speaker and enables voice telephone conversation between an operator that operates the operator operation terminal 1005 and the user. The camera device 2003 includes an imaging sensor and photographs, for example, a photographic object device 1006 (FIG. 1).

The CPU 2004 controls the entire user mobile terminal 1002. The memory 2005 stores a program for operating the CPU 2004. In addition, the memory 2005 stores data, commands, and the like received from the cloud server 1003 and the operator operation terminal 1005. Operations by the respective functional blocks shown in FIG. 3 are realized as the CPU 2004 executes the program stored in the memory 2005.

As shown in FIG. 3, as functional blocks, the user mobile terminal 1002 includes a remote support application 2100, a telephone conversation application 2110, and a camera application 2120. Specific operations by the respective functional blocks will be described in detail later.

The remote support application 2100 is an application for requesting remote support to the cloud server 1003 or the operator operation terminal 1005. FIG. 1 shows a state where the remote support application 2100 has been started by the user on the user mobile terminal 1002. The remote support application 2100 includes a first user acquiring section 2101, a second user acquiring section 2102, a telephone conversation instructing section 2103, a third user acquiring section 2104, a photographic data transmitting section 2105, and a command executing section 2106.

The first user acquiring section 2101 acquires access destination information from the cloud server 1003 when the user starts the remote support application 2100. The telephone conversation instructing section 2103 is a telephone conversation instruction button that is used by the user to instruct a voice telephone conversation. As shown in FIG. 1, the telephone conversation instructing section 2103 is displayed on a display screen of the user mobile terminal 1002 when the user starts the remote support application 2100.

When the telephone conversation instructing section 2103 is operated by the user, the second user acquiring section 2102 acquires a session ID (Identification Data) and a user command URL (Uniform Resource Locator) from the cloud server 1003. The session ID is identification information identifying a current communication. The session ID is issued by the cloud server 1003 for each communication. The user command URL is information representing a location of an instruction addressed to the user mobile terminal 1002. The user command URL is issued by the cloud server 1003 for each individual user mobile terminal 1002.

The third user acquiring section 2104 periodically inquires presence or absence of a user command to the cloud server 1003. If a user command is present in the cloud server 1003, the third user acquiring section 2104 acquires the user command from the cloud server 1003. The photographic data transmitting section 2105 transmits data photographed by the camera application 2120 to the cloud server 1003. The command executing section 2106 executes the user command acquired by the third user acquiring section 2104. If the user command is, for example, a camera activation command, the command executing section 2106 starts the camera application 2120.

The telephone conversation application 2110 starts as the user operates the telephone conversation instructing section 2103. The telephone conversation application 2110 includes a telephone call requesting section 2111, an end call requesting section 2112, and a voice telephone conversation section 2113.

The telephone call requesting section 2111 makes a telephone call request to the call-response control server 1004 when a session ID and a user command URL are acquired by the second user acquiring section 2102. The telephone call request includes information identifying the user mobile terminal 1002, such as a telephone number of the user, and the session ID. When end call is instructed by the user, the end call requesting section 2112 makes an end call request to the call-response control server 1004. The voice telephone conversation section 2113 performs a voice telephone conversation with, for example, an operator who operates the operator operation terminal 1005.

Figure 15:
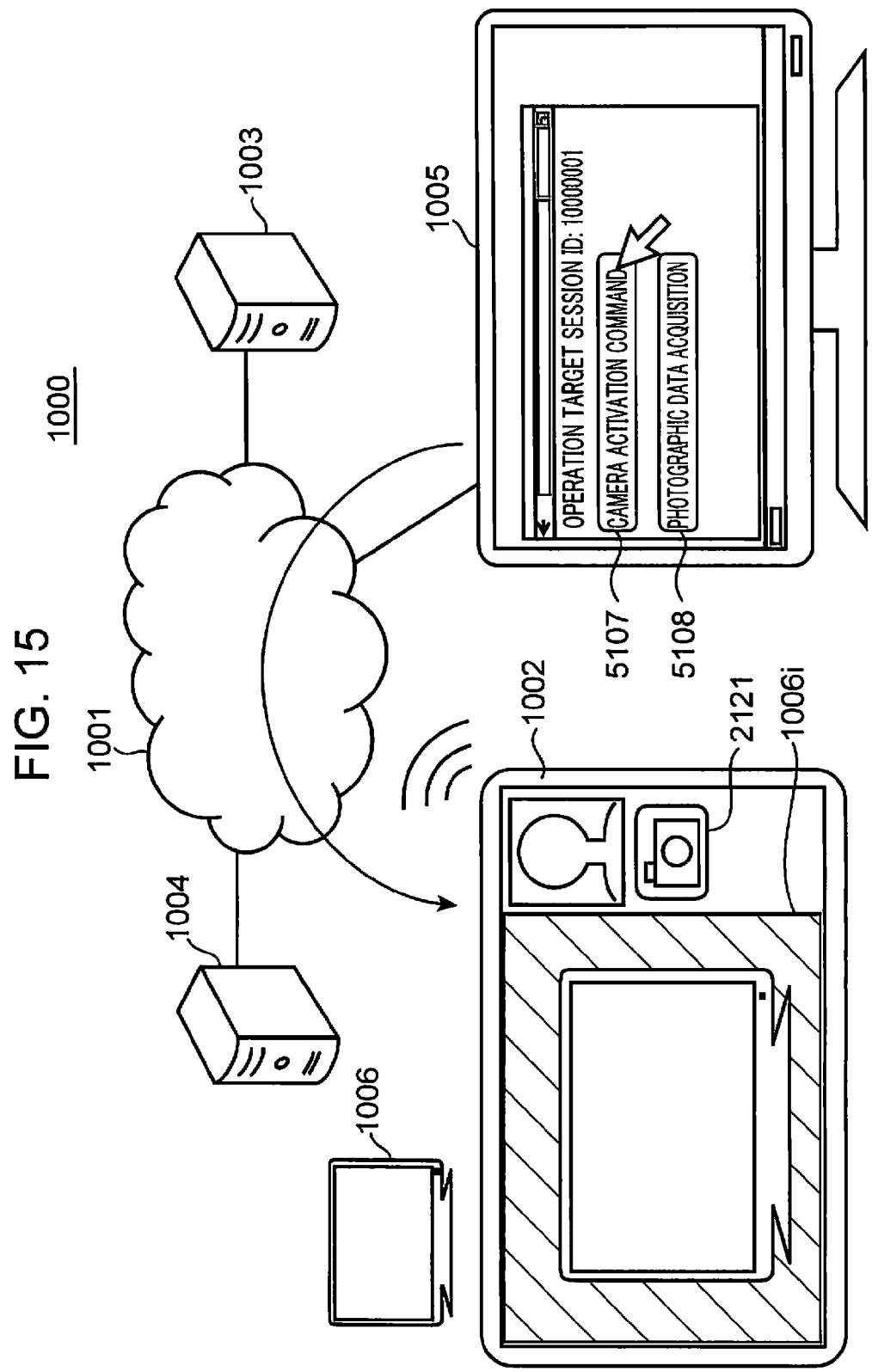
FIG. 15 is a diagram showing an overall configuration after a camera activation command button is operated on an operator operation terminal according to the first embodiment of the present disclosure.

The camera application 2120 includes a photography instructing section 2121 and a picture photographing section 2122. The photography instructing section 2121 is a photography instruction button that is used by the user to instruct picture photography. As shown in FIG. 15 to be described later, the photography instructing section 2121 is displayed on the display screen of the user mobile terminal 1002 when the camera application 2120 is started. The picture photographing section 2122 performs picture photography of the photographic object device 1006 when the user operates the photography instructing section 2121.

Figure 4:
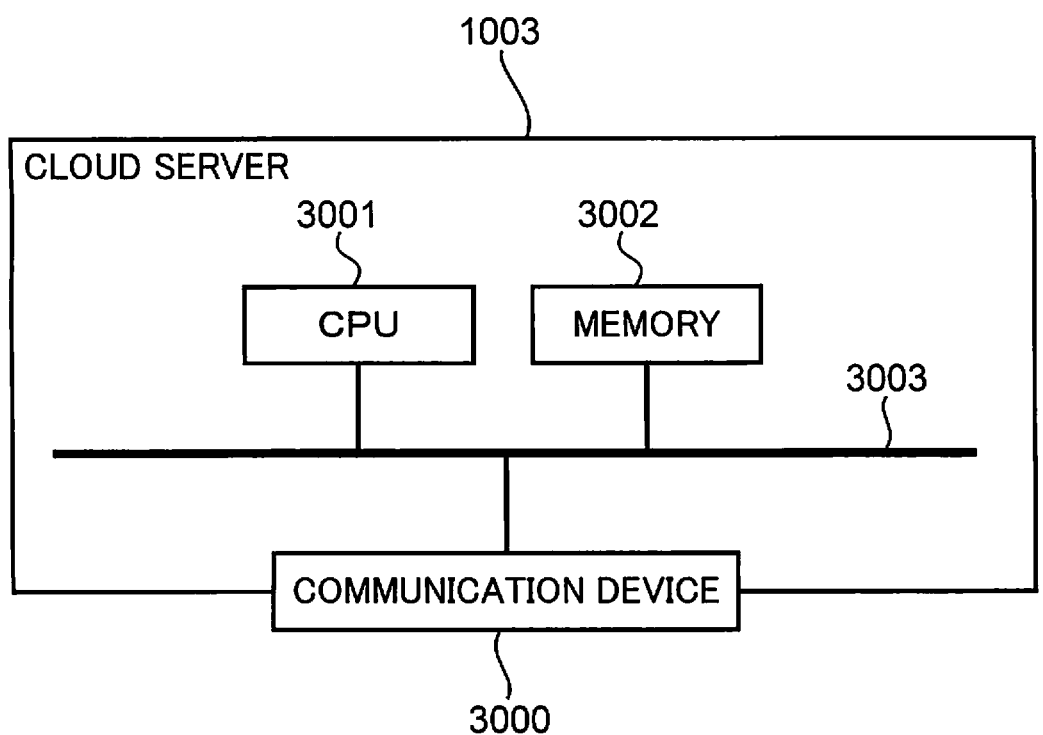
FIG. 4 is a block diagram showing a configuration of a cloud server according to the first embodiment of the present disclosure.
Figure 5:
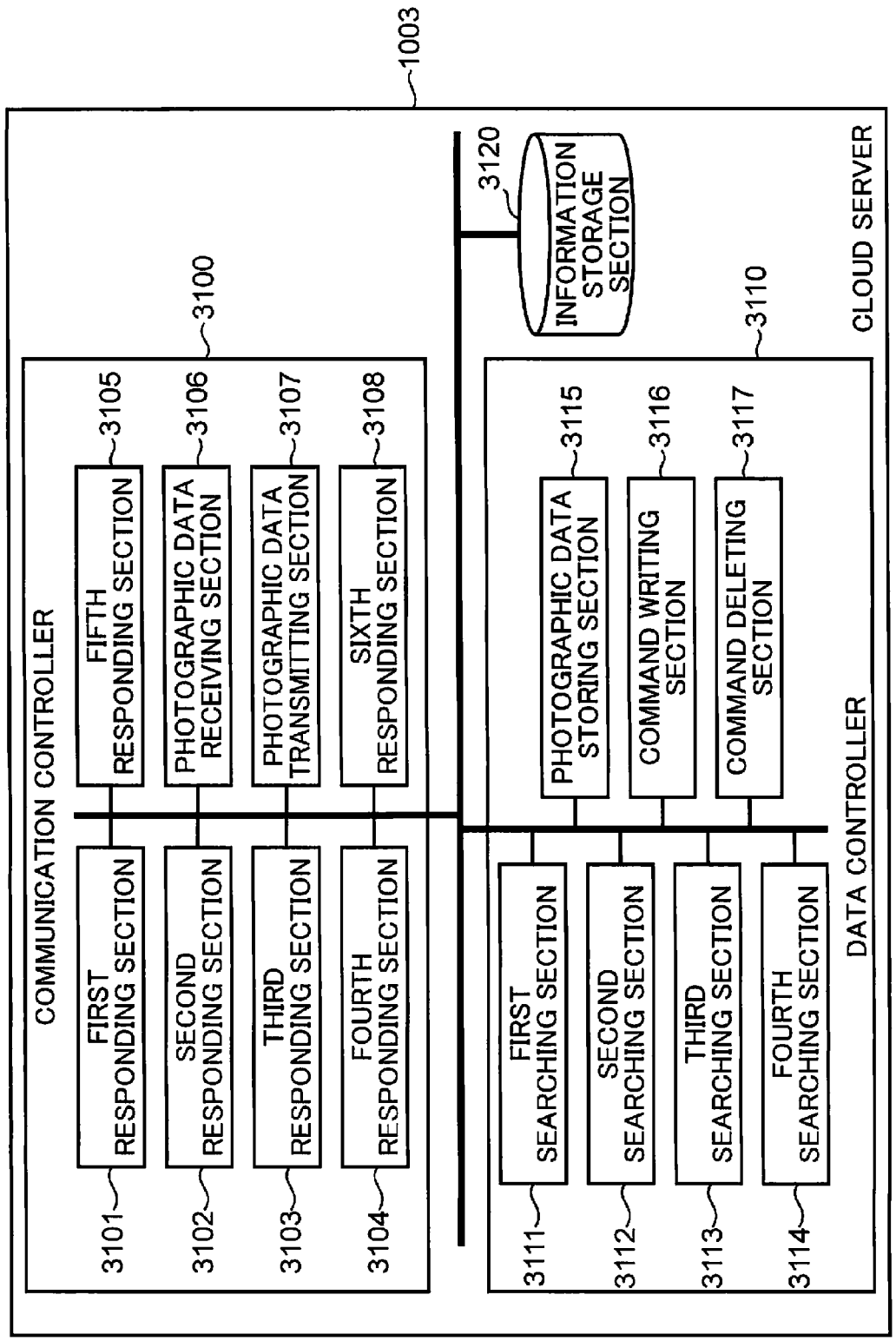
FIG. 5 is a diagram showing functional blocks of a cloud server according to the first embodiment of the present disclosure.

FIG. 4 is a block diagram showing a configuration of the cloud server 1003 according to the first embodiment of the present disclosure. FIG. 5 is a diagram showing functional blocks of the cloud server 1003 according to the first embodiment of the present disclosure.

As shown in FIG. 4, the cloud server 1003 includes a communication device 3000, a CPU 3001, and a memory 3002. The communication device 3000, the CPU 3001, and the memory 3002 are connected to one another via a bus 3003.

The communication device 3000 communicates with the user mobile terminal 1002 and the operator operation terminal 1005 via the network 1001. The CPU 3001 controls the entire cloud server 1003. The memory 3002 is constituted by, for example, a hard disk. The memory 3002 stores a program for operating the CPU 3001. In addition, the memory 3002 stores data, commands, and the like transmitted from the user mobile terminal 1002 and the operator operation terminal 1005. Operations by the respective functional blocks shown in FIG. 5 are realized as the CPU 3001 executes the program stored in the memory 3002.

As shown in FIG. 5, as functional blocks, the cloud server 1003 includes a communication controller 3100, a data controller 3110, and an information storage section 3120. Specific operations by the respective functional blocks will be described in detail later.

The communication controller 3100 includes a first responding section 3101, a second responding section 3102, a third responding section 3103, a fourth responding section 3104, a fifth responding section 3105, a photographic data receiving section 3106, a photographic data transmitting section 3107, and a sixth responding section 3108.

In response to a request for access destination information by the user mobile terminal 1002, the first responding section 3101 sends back access destination information to the user mobile terminal 1002. The second responding section 3102 issues a session ID and a user command URL in response to a request for a session ID and a user command URL by the user mobile terminal 1002. The second responding section 3102 sends back the issued session ID and user command URL to the user mobile terminal 1002 and, at the same time, stores the session ID and the user command URL in the information storage section 3120.

In response to a request for a user command URL from the operator operation terminal 1005, the third responding section 3103 sends back the user command URL to the operator operation terminal 1005. In response to a request to acquire a user command from the user mobile terminal 1002, the fourth responding section 3104 sends back a user command to the user mobile terminal 1002. In response to a request to write an instruction from the operator operation terminal 1005, the fifth responding section 3105 stores an instruction from the operator operation terminal 1005 in the information storage section 3120.

The photographic data receiving section 3106 receives photographic data transmitted from the user mobile terminal 1002. The photographic data transmitting section 3107 transmits the photographic data received by the photographic data receiving section 3106 to the operator operation terminal 1005. In response to a request for location information of photographic data photographed by the user from the operator operation terminal 1005, the sixth responding section 3108 sends back a URL representing the location information to the operator operation terminal 1005.

The data controller 3110 includes a first searching section 3111, a second searching section 3112, a third searching section 3113, a fourth searching section 3114, a photographic data storing section 3115, a command writing section 3116, and a command deleting section 3117.

The first searching section 3111 searches the information storage section 3120 for the access destination information requested by the user mobile terminal 1002. The second searching section 3112 searches the information storage section 3120 for the user command URL requested by the operator operation terminal 1005. The third searching section 3113 searches the information storage section 3120 for the user command requested by the user mobile terminal 1002.

The fourth searching section 3114 searches the information storage section 3120 for location information indicating where photographic data is stored. The photographic data storing section 3115 stores photographic data transmitted from the user mobile terminal 1002 in the information storage section 3120. The command writing section 3116 writes the instruction transmitted from the operator operation terminal 1005 in the information storage section 3120. After the instruction written into the information storage section 3120 is transmitted to the user mobile terminal 1002, the command deleting section 3117 deletes the instruction from the information storage section 3120.

Figure 6:
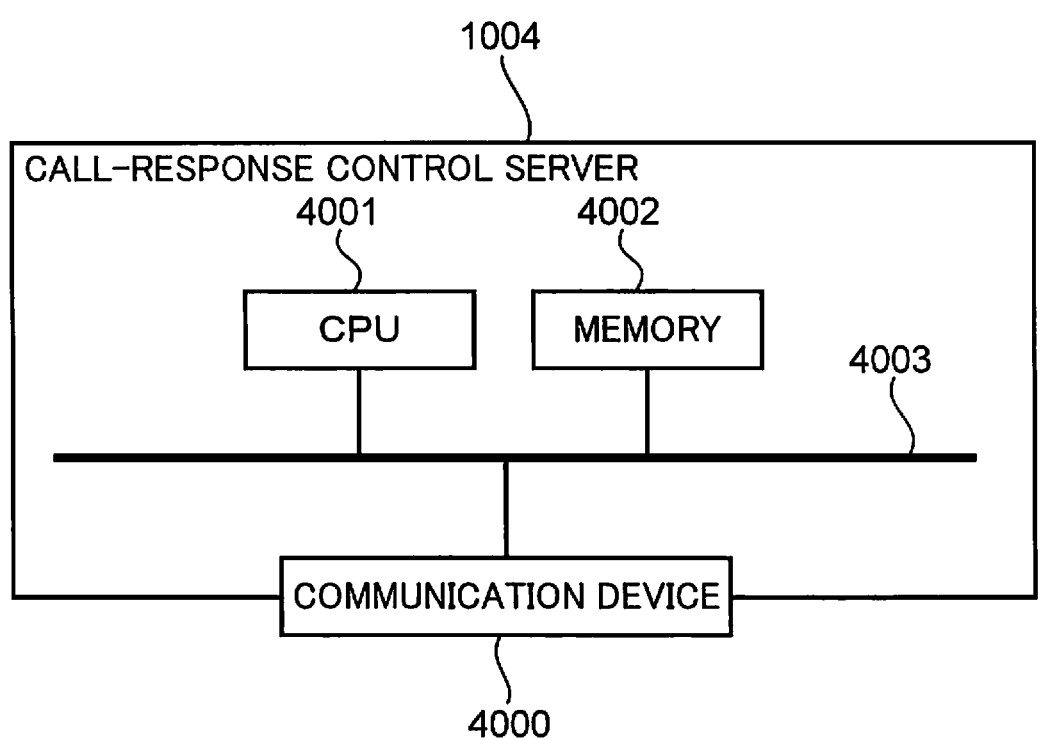
FIG. 6 is a block diagram showing a configuration of a call-response control server according to the first embodiment of the present disclosure.
Figure 7:
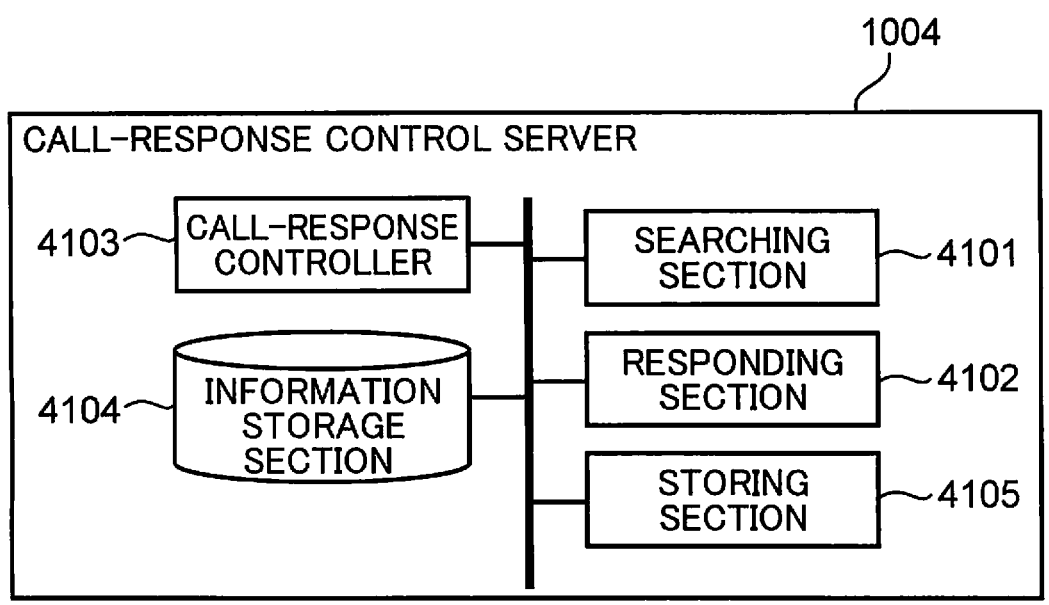
FIG. 7 is a diagram showing functional blocks of a call-response control server according to the first embodiment of the present disclosure.

FIG. 6 is a block diagram showing a configuration of the call-response control server 1004 according to the first embodiment of the present disclosure. FIG. 7 is a diagram showing functional blocks of the call-response control server 1004 according to the first embodiment of the present disclosure.

As shown in FIG. 6, the call-response control server 1004 includes a communication device 4000, a CPU 4001, and a memory 4002. The communication device 4000, the CPU 4001, and the memory 4002 are connected to one another via a bus 4003.

The communication device 4000 communicates with the user mobile terminal 1002 and the operator operation terminal 1005 via the network 1001. The CPU 4001 controls the entire call-response control server 1004. The memory 4002 is constituted by, for example, a hard disk. The memory 4002 stores a program for operating the CPU 4001. In addition, the memory 4002 stores data transmitted from the user mobile terminal 1002 and the operator operation terminal 1005. Operations by the respective functional blocks shown in FIG. 7 are realized as the CPU 4001 executes the program stored in the memory 4002.

As shown in FIG. 7, as functional blocks, the call-response control server 1004 includes a searching section 4101, a responding section 4102, a call-response controller 4103, an information storage section 4104, and a storing section 4105. Specific operations by the respective functional blocks will be described in detail later.

The call-response controller 4103 controls voice telephone conversation between a user who operates the user mobile terminal 1002 and an operator who operates the operator operation terminal 1005. The storing section 4105 stores information identifying the user mobile terminal 1002 and the session ID included in the telephone call request from the user mobile terminal 1002 in the information storage section 4104. The information identifying the user mobile terminal 1002 is, for example, a telephone number of the user. The searching section 4101 searches the information storage section 4104 for the session ID requested by the operator operation terminal 1005. In response to the request by the operator operation terminal 1005, the responding section 4102 sends back the session ID to the operator operation terminal 1005.

Figure 8:
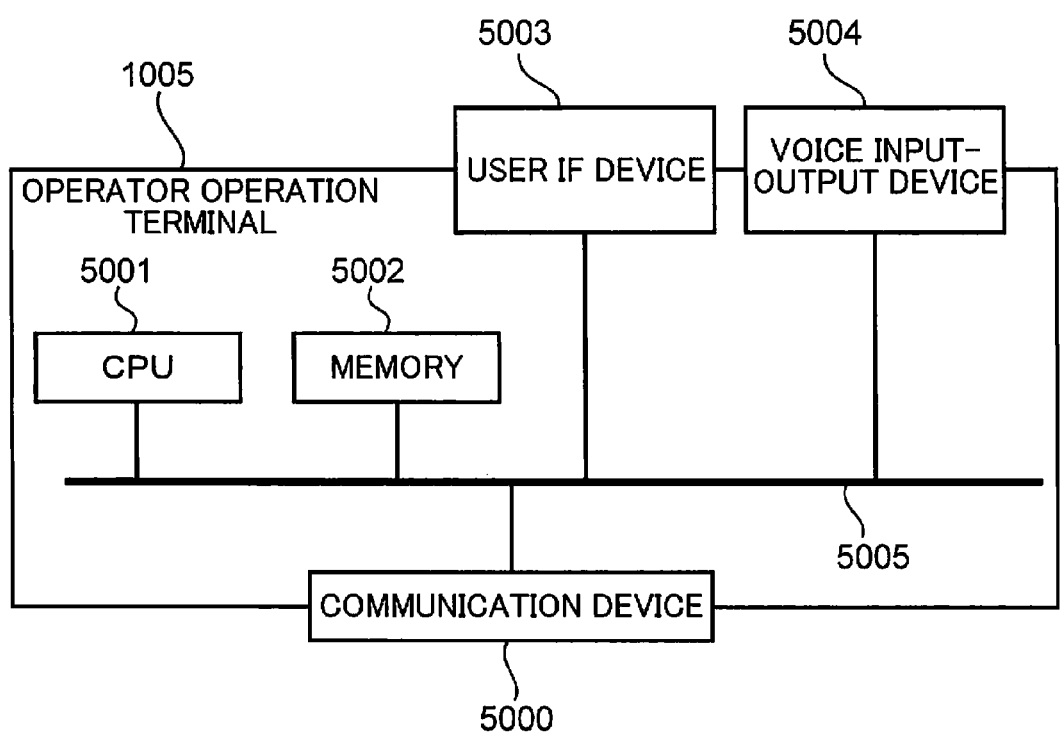
FIG. 8 is a block diagram showing a configuration of an operator operation terminal according to the first embodiment of the present disclosure.
Figure 9:
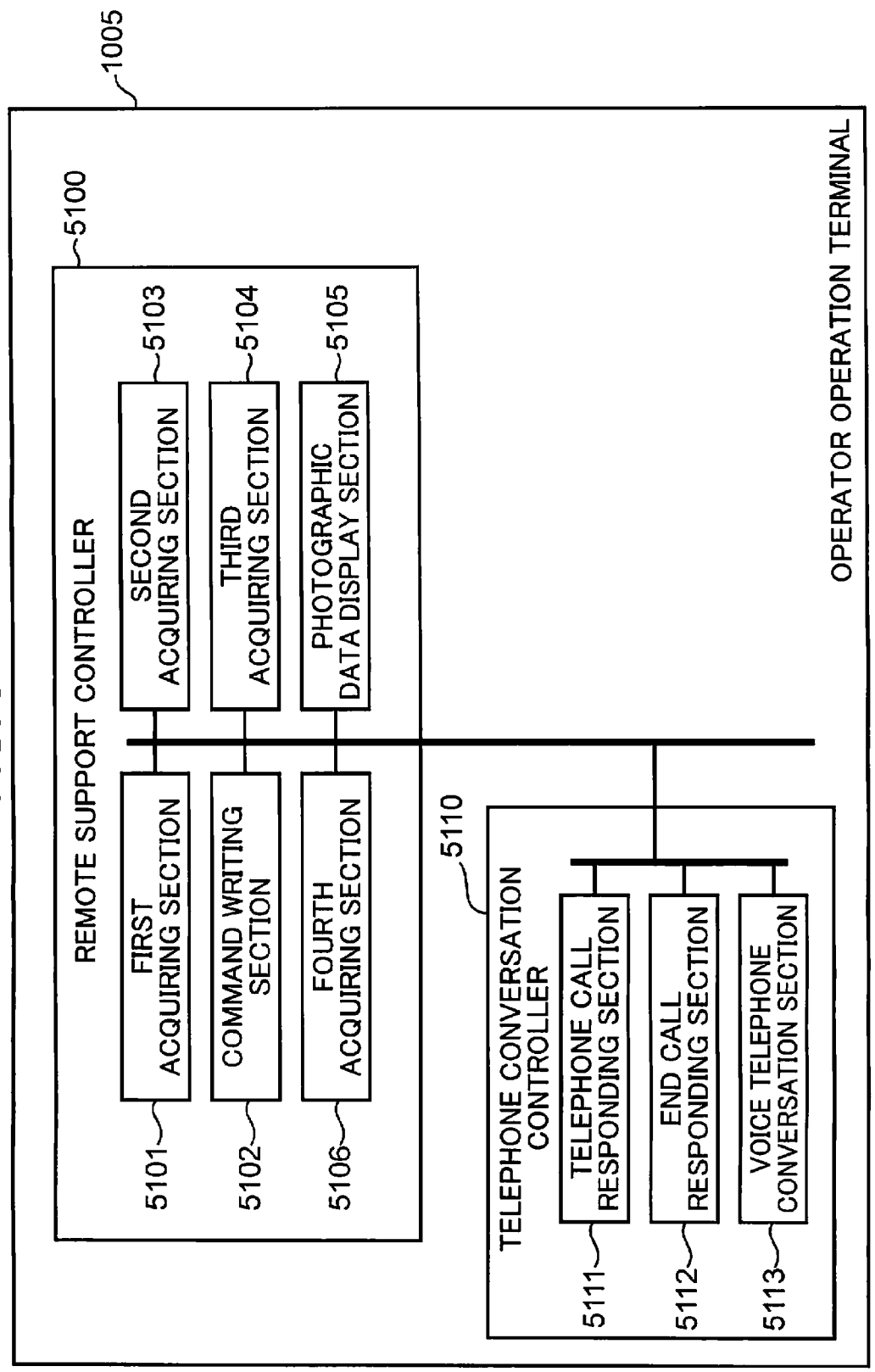
FIG. 9 is a diagram showing functional blocks of an operator operation terminal according to the first embodiment of the present disclosure.

FIG. 8 is a block diagram showing a configuration of the operator operation terminal 1005 according to the first embodiment of the present disclosure. FIG. 9 is a diagram showing functional blocks of the operator operation terminal 1005 according to the first embodiment of the present disclosure.

As shown in FIG. 8, the operator operation terminal 1005 includes a communication device 5000, a CPU 5001, a memory 5002, a user interface (IF) device 5003, and a voice input-output device 5004. The communication device 5000, the CPU 5001, the memory 5002, the user IF device 5003, and the voice input-output device 5004 are connected to one another via a bus 5005.

The communication device 5000 communicates with the user mobile terminal 1002, the cloud server 1003, and the call-response control server 1004 via the network 1001. The user IF device 5003 displays information to the operator and accepts operations from the operator. The voice input-output device 5004 includes a microphone and a speaker and enables voice telephone conversation between a user who operates the user mobile terminal 1002 and the operator.

The CPU 5001 controls the entire operator operation terminal 1005. The memory 5002 stores a program for operating the CPU 5001. In addition, the memory 5002 stores information and data transmitted from the user mobile terminal 1002 and the cloud server 1003. Operations by the respective functional blocks shown in FIG. 9 are realized as the CPU 5001 executes the program stored in the memory 5002.

As shown in FIG. 9, as functional blocks, the operator operation terminal 1005 includes a remote support controller 5100 and a telephone conversation controller 5110. Specific operations by the respective functional blocks will be described in detail later.

The remote support controller 5100 includes a first acquiring section 5101, a command writing section 5102, a second acquiring section 5103, a third acquiring section 5104, a photographic data display section 5105, and a fourth acquiring section 5106.

The first acquiring section 5101 acquires a session ID from the call-response control server 1004 when a request is made by the call-response control server 1004 for a response to a telephone call. When the session ID is acquired, the fourth acquiring section 5106 acquires a user command URL from the cloud server 1003. The command writing section 5102 requests the cloud server 1003 to write an instruction with respect to the user. The second acquiring section 5103 acquires information representing a location of photographic data photographed by the user from the cloud server 1003. The third acquiring section 5104 acquires photographic data photographed by the user from the cloud server 1003. The photographic data display section 5105 displays the acquired photographic data on the display screen of the operator operation terminal 1005.

The telephone conversation controller 5110 includes a telephone call responding section 5111, an end call responding section 5112, and a voice telephone conversation section 5113.

The telephone call responding section 5111 responds to a telephone call request from the user mobile terminal 1002 via the call-response control server 1004. The end call responding section 5112 responds to an end call request from the user mobile terminal 1002 via the call-response control server 1004. The voice telephone conversation section 5113 performs a voice telephone conversation with, for example, the user operating the user mobile terminal 1002.

In the present embodiment, the user mobile terminal 1002 corresponds to an example of the information apparatus, the cloud server 1003 corresponds to an example of the communication system and the predetermined server, and the operator operation terminal 1005 corresponds to an example of the information processing apparatus. In addition, in the present embodiment, the remote support application 2100 corresponds to an example of the third application, the telephone conversation application 2110 corresponds to an example of the first application, the camera application 2120 corresponds to an example of the second application, the telephone conversation instructing section 2103 corresponds to an example of the telephone conversation instruction button according to the first application, and the photography instructing section 2121 corresponds to an example of the imaging button according to the second application.

Figure 10:
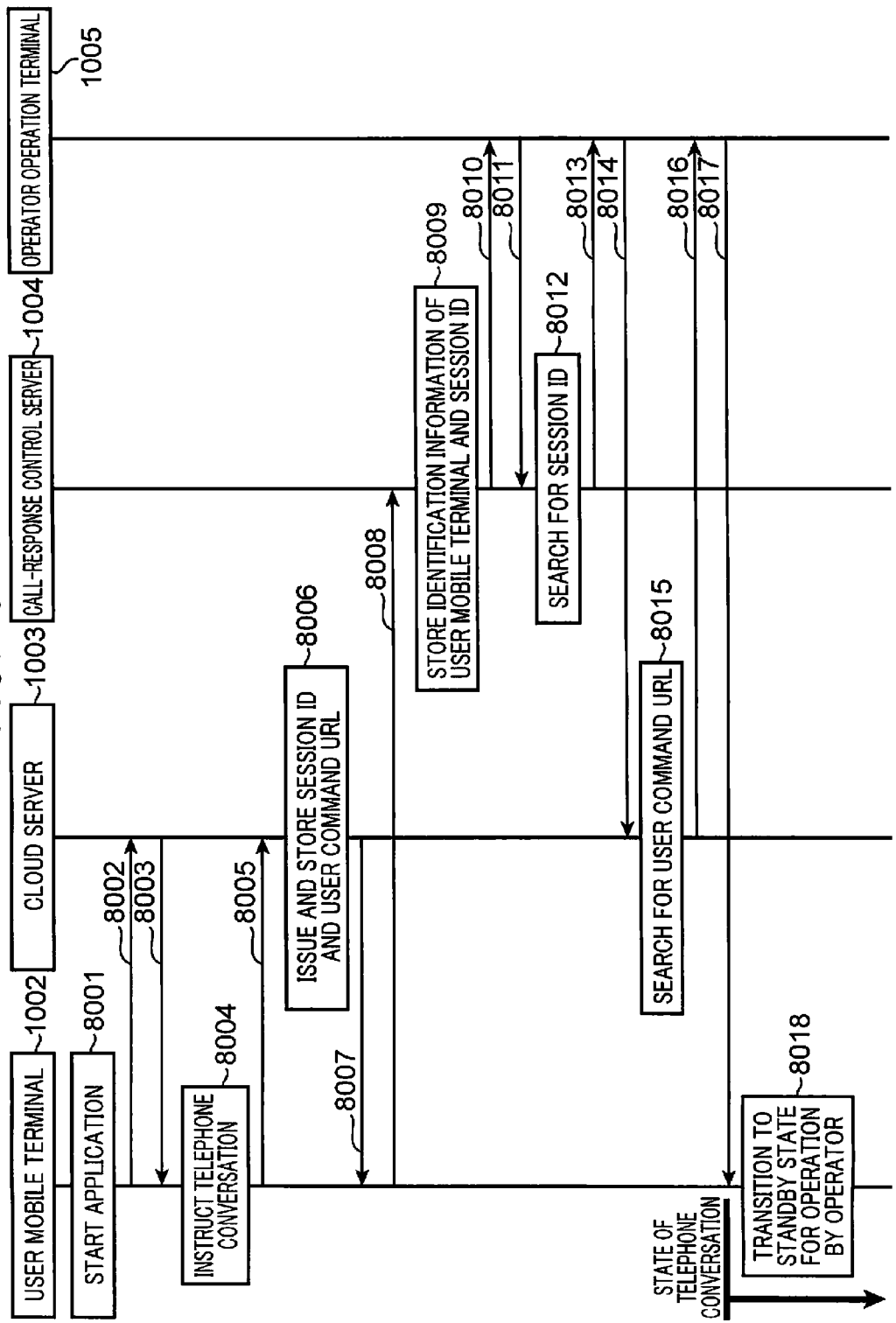
FIG. 10 is a diagram showing a sequence up to start of a telephone conversation according to the first embodiment of the present disclosure.
Figure 11:
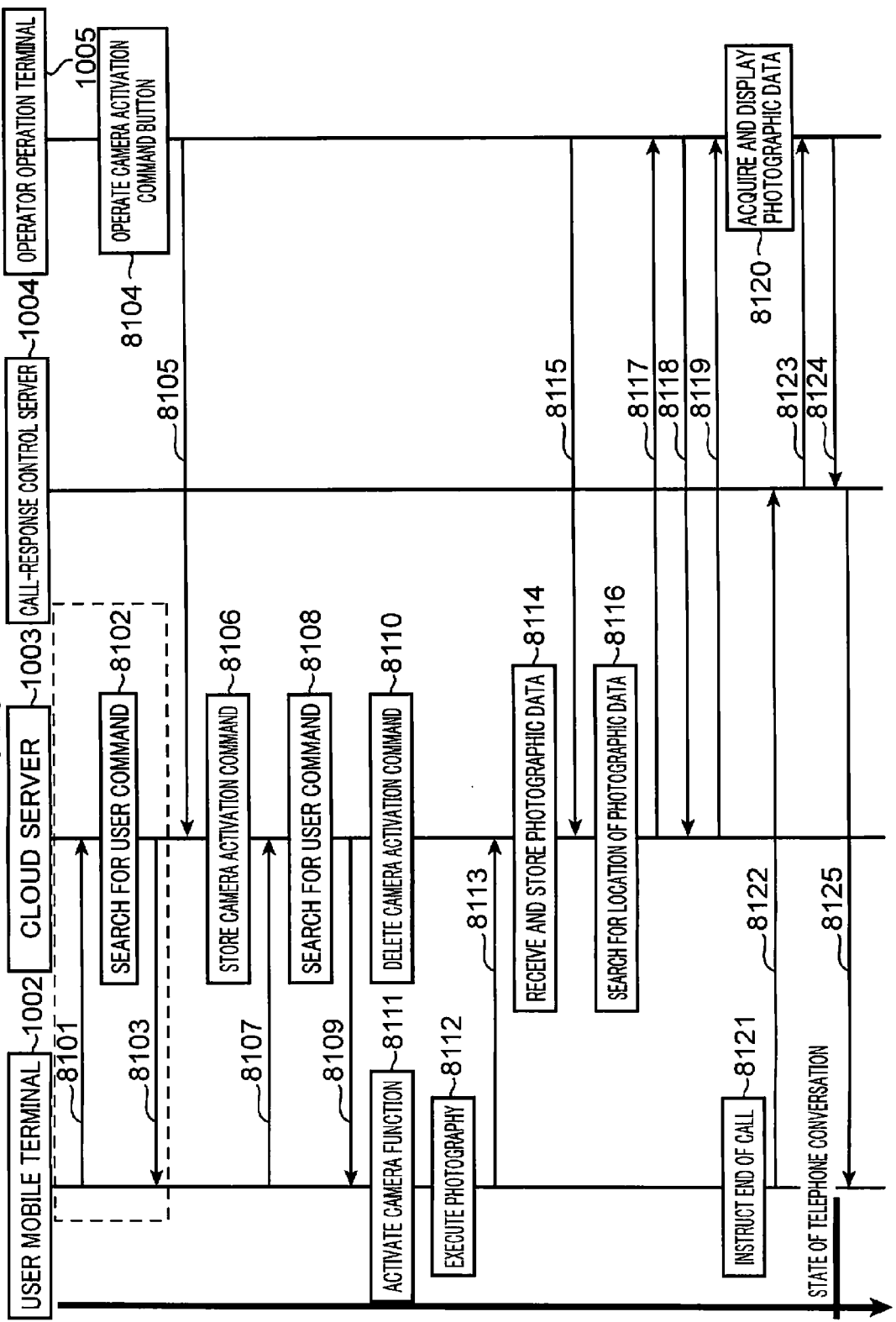
FIG. 11 is a diagram showing a sequence including and subsequent to start of a telephone conversation according to the first embodiment of the present disclosure.

FIGS. 10 and 11 are diagrams showing sequences according to the first embodiment of the present disclosure. FIG. 10 shows a sequence up to start of a telephone conversation, and FIG. 11 shows a sequence including and subsequent to the start of a telephone conversation. An operation sequence according to the first embodiment will now be described with reference to FIGS. 1 to 11.

In step 8001 in FIG. 10, the user starts the remote support application 2100 of the user mobile terminal 1002. As described earlier, FIG. 1 shows a state immediately after the remote support application 2100 is started. In step 8002, the first user acquiring section 2101 of the user mobile terminal 1002 requests the cloud server 1003 to acquire access destination information. In step 8003, the first responding section 3101 of the cloud server 1003 responds to the request to acquire access destination information.

FIG. 12 is a diagram showing an example of a user access destination information table 9001 of the cloud server 1003 according to the first embodiment of the present disclosure. The user access destination information table 9001 includes access destination information of the cloud server 1003, access destination information of the call-response control server 1004, and identification information of the operator operation terminal 1005. The identification information of the operator operation terminal 1005 is, for example, a telephone number of the operator operation terminal 1005.

In step 8003, the first responding section 3101 of the cloud server 1003 responds to the request to acquire access destination information from the user mobile terminal 1002 and sends back information on the user access destination information table 9001. The user mobile terminal 1002 stores access destination information of the cloud server 1003 in advance.

In subsequent step 8004 in FIG. 10, as the user operates the telephone conversation instructing section 2103, the telephone conversation application 2110 is started and a telephone conversation sequence is started.

Figure 13:
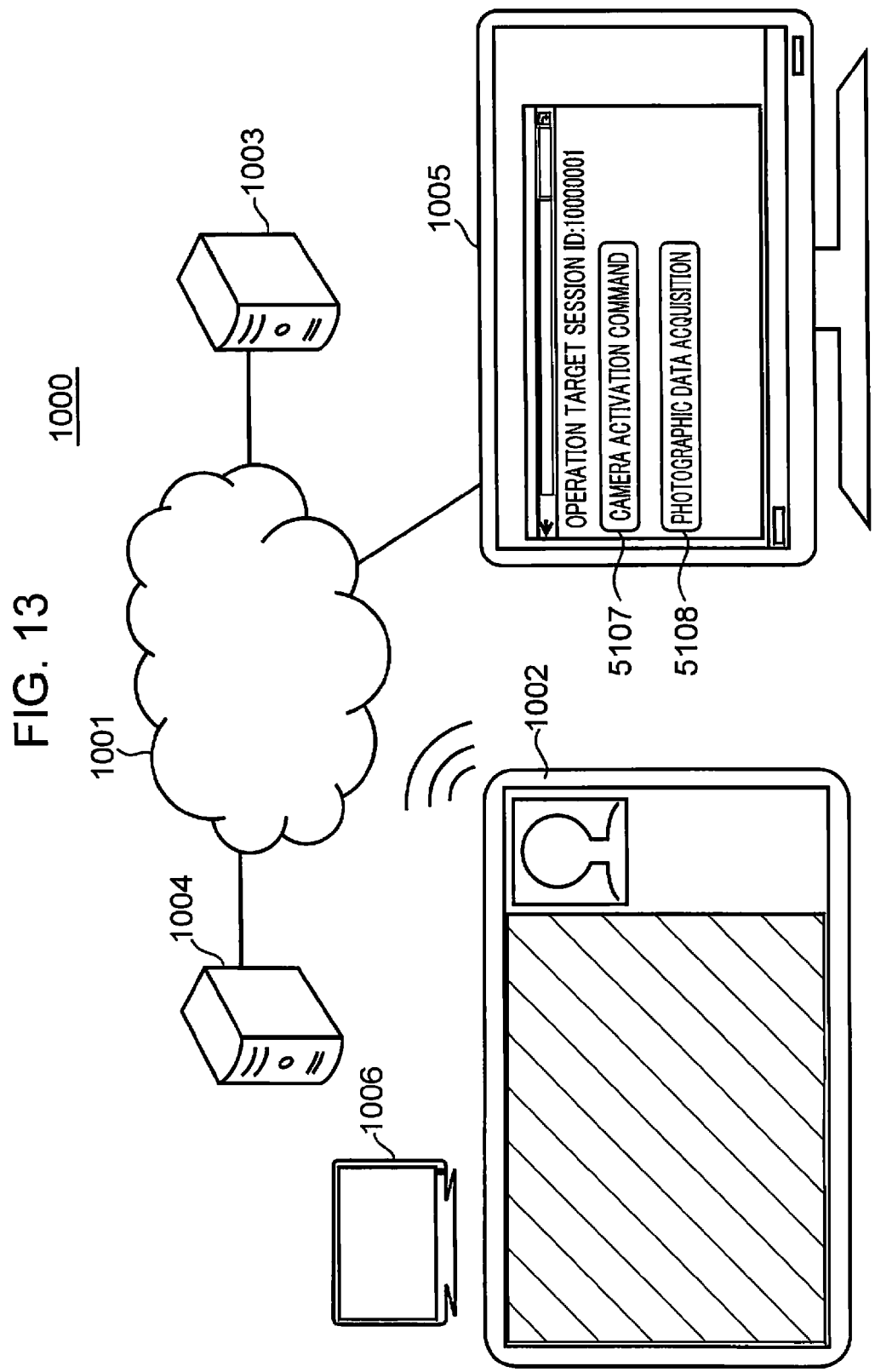
FIG. 13 is a diagram showing an overall configuration after a telephone conversation instruction is executed by a user mobile terminal according to the first embodiment of the present disclosure.

FIG. 13 is a diagram showing an overall configuration of the remote support system 1000 after the user mobile terminal 1002 executes a telephone conversation instruction according to the first embodiment of the present disclosure. In the user mobile terminal 1002, as the user operates the telephone conversation instructing section 2103 (FIG. 1), an operation screen for remote support including a camera activation command button 5107 and a photographic data acquisition button 5108 is displayed on the display screen of the operator operation terminal 1005 as shown in FIG. 13.

In step 8005 shown in FIG. 10, the second user acquiring section 2102 of the user mobile terminal 1002 requests the cloud server 1003 to acquire a session ID and a user command URL. In step 8006, the second responding section 3102 of the cloud server 1003 issues a session ID and a user command URL and stores the same in the information storage section 3120. In step 8007, the second responding section 3102 responds to the request by the user mobile terminal 1002 and sends back the issued session ID and user command URL to the user mobile terminal 1002. The second user acquiring section 2102 of the user mobile terminal 1002 stores the acquired session ID and user command URL in the memory 2005.

Figure 14:
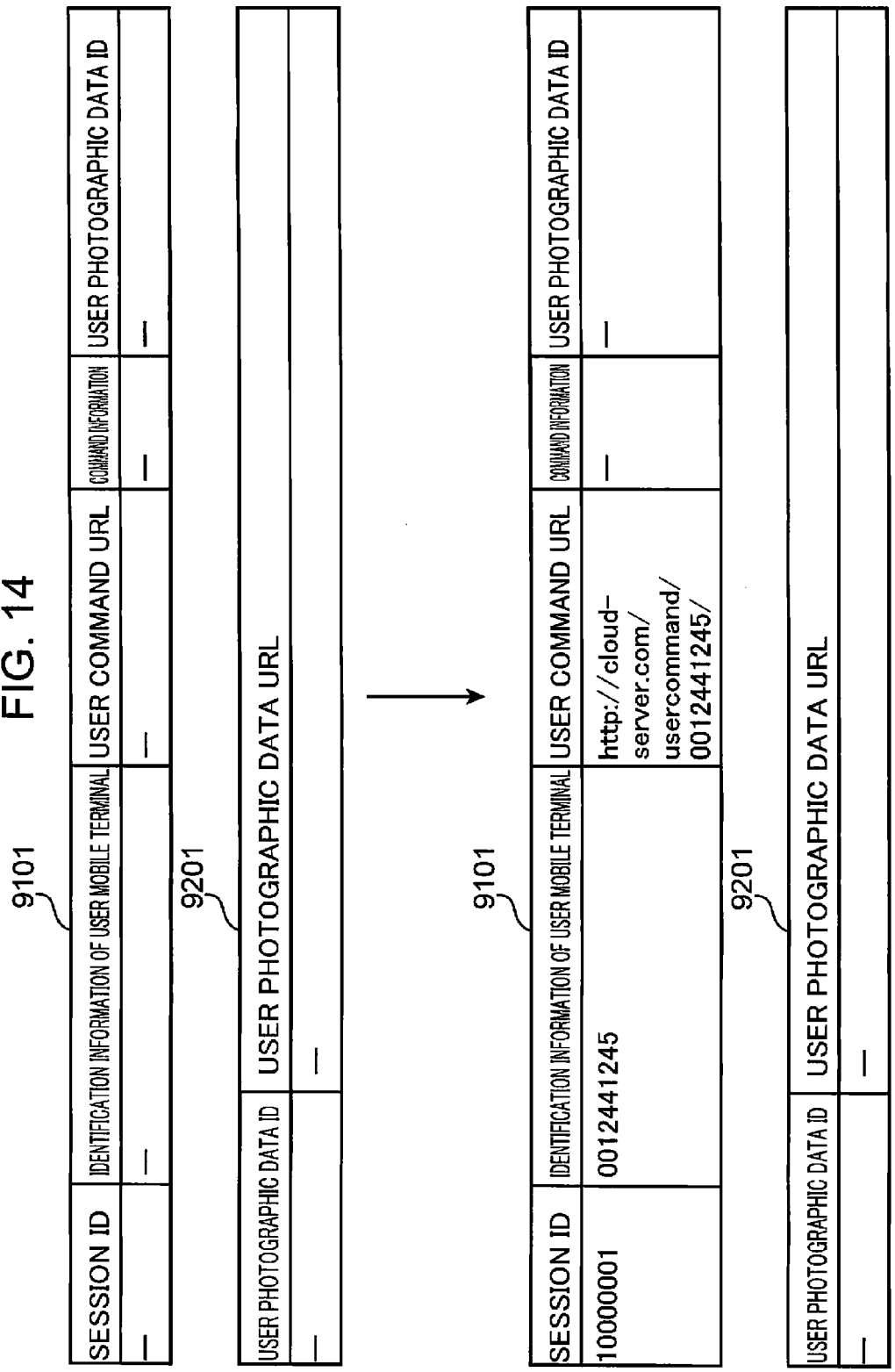
FIG. 14 is a diagram showing an example of a database operation upon issuance of a session ID and a user command URL of a cloud server according to the first embodiment of the present disclosure.

FIG. 14 is a diagram showing an example of a database operation upon issuance of a session ID and a user command URL of the cloud server 1003 according to the first embodiment of the present disclosure. The information storage section 3120 of the cloud server 1003 includes an ID command table 9101 and a photographic data table 9201 as databases.

The ID command table 9101 includes a session ID, identification information of the user mobile terminal 1002, a user command URL, command information, and a user photographic data ID for identifying photographic data that is photographed by the user. The identification information of the user mobile terminal 1002 is, for example, a telephone number of the user mobile terminal 1002. The photographic data table 9201 includes a user photographic data ID and a user photographic data URL representing a location of photographic data that is photographed by the user.

When the session ID and the user command URL are issued in step 8006 shown in FIG. 10, the session ID, the identification information of the user mobile terminal 1002, and the user command URL are written into a database as shown in FIG. 14.

In subsequent step 8008 in FIG. 10, the telephone call requesting section 2111 of the user mobile terminal 1002 issues a telephone call request to the call-response control server 1004. The telephone call request includes identification information (for example, a telephone number) of the user mobile terminal 1002 and the session ID. In step 8009, the storing section 4105 of the call-response control server 1004 stores the identification information of the user mobile terminal 1002 and the session ID included in the telephone call request from the user mobile terminal 1002 in a database of the information storage section 4104.

In step 8010, the call-response control server 1004 issues a request for a response to the telephone call to the operator operation terminal 1005. Specifically, the call-response control server 1004 notifies the operator operation terminal 1005 that a telephone call has been made and, at the operator operation terminal 1005, a ringing tone or the like is played. The request for a response to the telephone call includes identification information of the user mobile terminal 1002. In step 8011, the first acquiring section 5101 of the operator operation terminal 1005 issues a request to acquire a session ID to the call-response control server 1004. The request to acquire a session ID includes identification information of the user mobile terminal 1002.

In step 8012, the searching section 4101 of the call-response control server 1004 searches for a session ID stored in the information storage section 4104 among the identification information of the user mobile terminal 1002. In step 8013, the responding section 4102 of the call-response control server 1004 sends back the session ID to the operator operation terminal 1005 in response to the request to acquire a session ID from the operator operation terminal 1005.

In step 8014, the fourth acquiring section 5106 of the operator operation terminal 1005 issues a request to search for a user command URL to the cloud server 1003. The request to search for a user command URL includes the session ID. In step 8015, the second searching section 3112 of the cloud server 1003 searches, from the session ID, for a user command URL stored in the information storage section 3120. In step 8016, in response to the request for a user command URL from the operator operation terminal 1005, the third responding section 3103 of the cloud server 1003 sends back the user command URL to the operator operation terminal 1005.

In step 8017, the telephone call responding section 5111 of the operator operation terminal 1005 responds to the telephone call from the user mobile terminal 1002. Accordingly, a voice telephone conversation is started between the operator of the operator operation terminal 1005 and the user of the user mobile terminal 1002. In step 8018, the user mobile terminal 1002 transitions to a standby state for an operation by the operator of the operator operation terminal 1005.

In step 8101 shown in FIG. 11 subsequent to step 8018, the third user acquiring section 2104 of the user mobile terminal 1002 issues a request to acquire a user command to the cloud server 1003. The request to acquire a user command includes, for example, a user command URL. In step 8102, the third searching section 3113 of the cloud server 1003 searches for a user command stored in the information storage section 3120, from the user command URL included in the request to acquire a user command.

Moreover, the request to acquire a user command in step 8101 may include a session ID or identification information of the user mobile terminal 1002 in place of the user command URL. In this case, in step 8102, the third searching section 3113 of the cloud server 1003 may search for a user command stored in the information storage section 3120 from the session ID or the identification information of the user mobile terminal 1002 included in the request to acquire a user command.

In step 8103, the fourth responding section 3104 of the cloud server 1003 sends back the user command stored in the information storage section 3120 to the user mobile terminal 1002 in response to the request to acquire a user command. In this case, if a user command is not stored at a corresponding user command URL of the information storage section 3120, the fourth responding section 3104 of the cloud server 1003 transmits the fact to the user mobile terminal 1002.

Steps 8101 to 8103 which are enclosed by a dashed line are periodically repeated until the third user acquiring section 2104 of the user mobile terminal 1002 acquires a user command from the cloud server 1003.

In step 8104, the operator of the operator operation terminal 1005 operates the camera activation command button 5107 displayed on the display screen.

FIG. 15 is a diagram showing an overall configuration after the camera activation command button 5107 is operated on the operator operation terminal 1005 according to the first embodiment of the present disclosure. As shown in FIG. 15, when the camera activation command button 5107 is operated on the operator operation terminal 1005, the photography instructing section 2121 and an image 1006*i* of the captured photographic object device 1006 are displayed on the display screen of the user mobile terminal 1002.

In subsequent step 8105 shown in FIG. 11, the command writing section 5102 of the operator operation terminal 1005 issues a request to write a camera activation command to the cloud server 1003. The request to write a camera activation command includes the user command URL. In step 8106, the command writing section 3116 of the cloud server 1003 stores a camera activation command as a user command in association with the specified user command URL.

Figure 16:
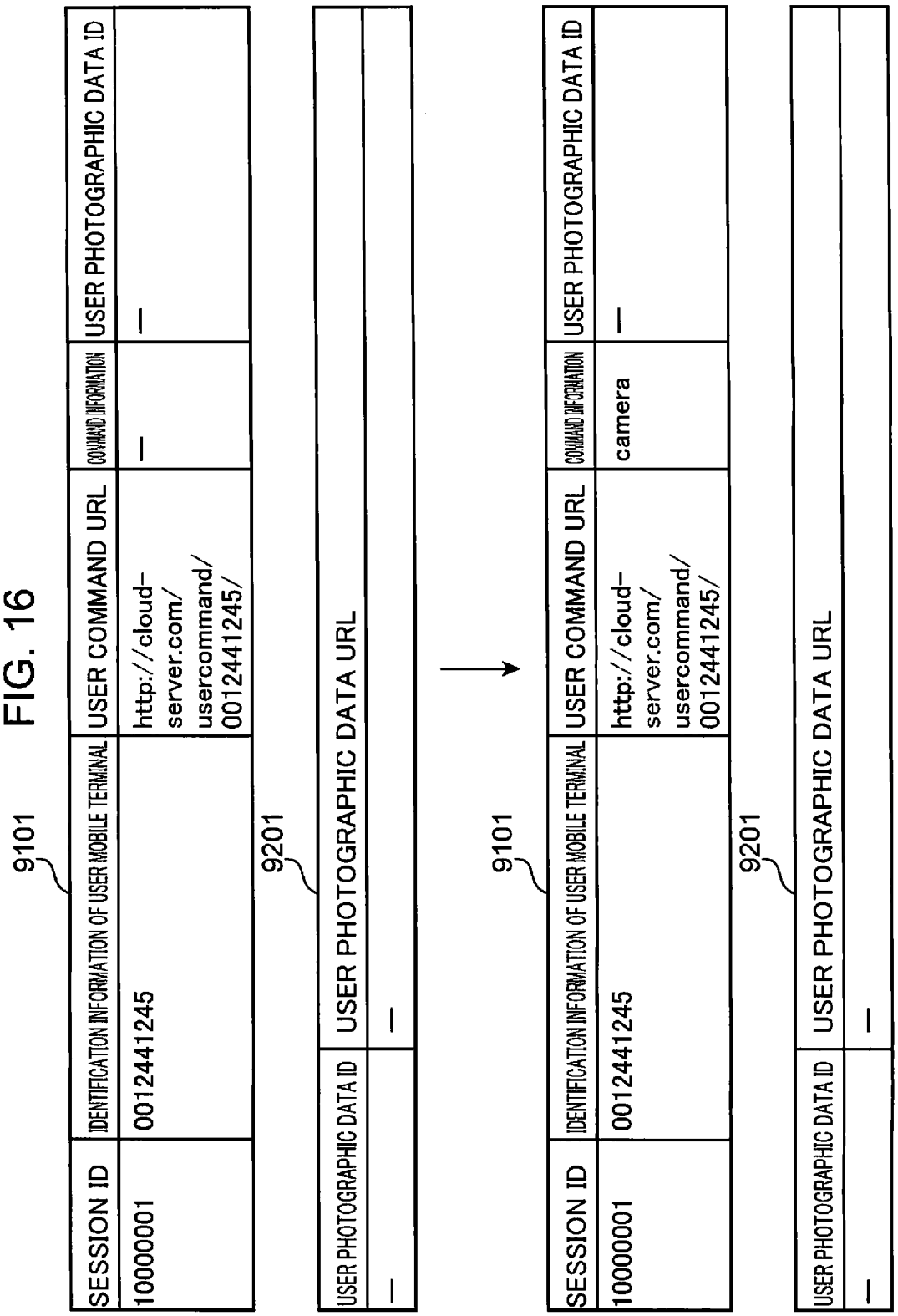
FIG. 16 is a diagram showing an example of a database operation when a camera activation command is stored as a user command in a cloud server according to the first embodiment of the present disclosure.

FIG. 16 is a diagram showing an example of a database operation when a camera activation command is stored as a user command by the cloud server 1003 according to the first embodiment of the present disclosure. In step 8106, as shown in FIG. 16, the camera activation command is written into a "command information" field in an ID command table 9101 including a corresponding user command URL. Moreover, the photographic data table 9201 does not change.

In subsequent step 8107 shown in FIG. 11, the third user acquiring section 2104 of the user mobile terminal 1002 issues a request to acquire a user command to the cloud server 1003. The request to acquire a user command includes, for example, a user command URL. In step 8108, the third searching section 3113 of the cloud server 1003 searches for a user command stored in the information storage section 3120, from the user command URL included in the request to acquire a user command.

In step 8109, the fourth responding section 3104 of the cloud server 1003 transmits the user command stored in the information storage section 3120 to the user mobile terminal 1002 in response to the request to acquire a user command. In this case, the user command includes a camera activation command. In step 8110, the command deleting section 3117 of the cloud server 1003 deletes the camera activation command after transmission of the user command.

Figure 17:
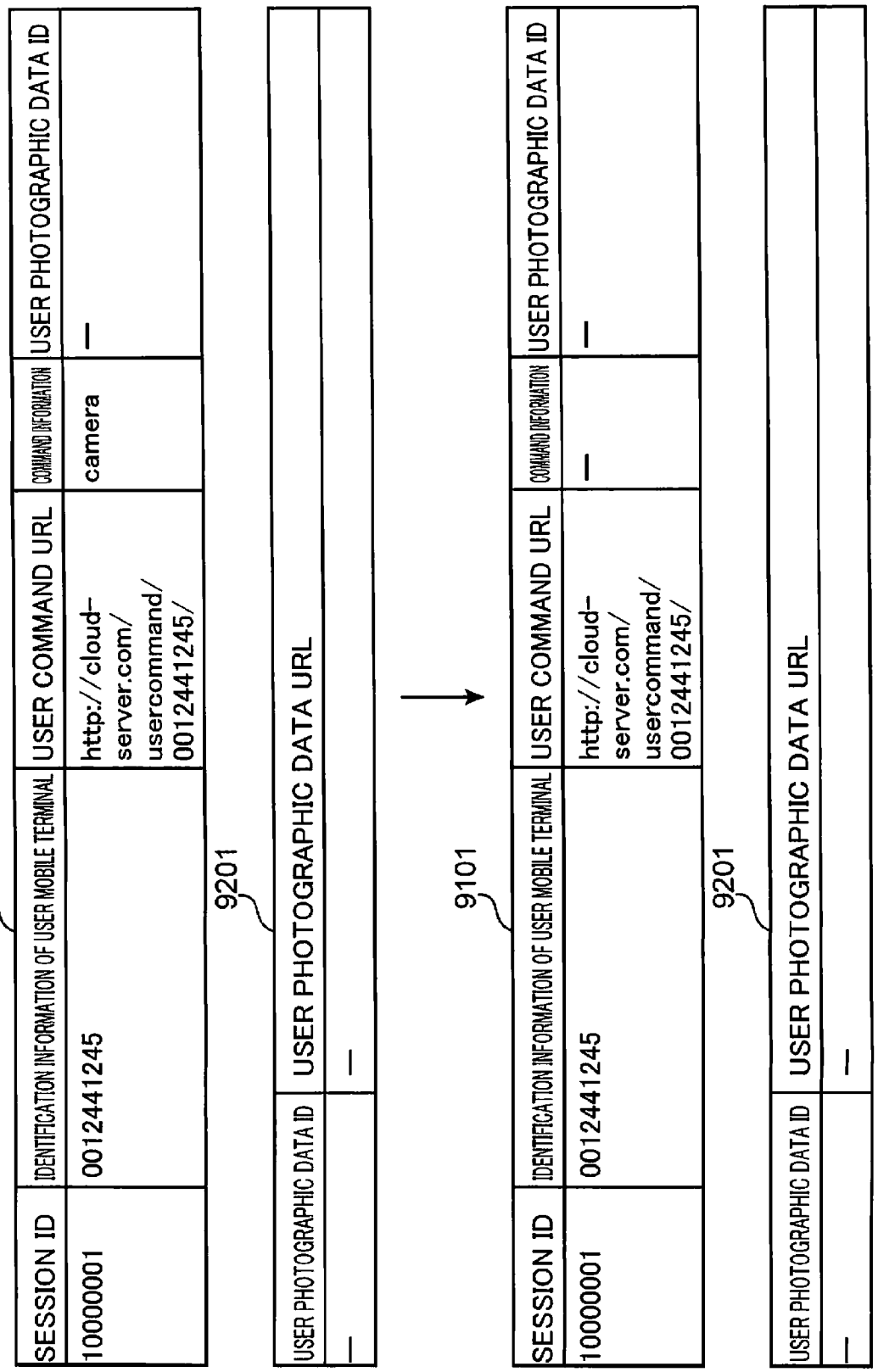
FIG. 17 is a diagram showing an example of a database operation when deleting a camera activation command of a cloud server according to the first embodiment of the present disclosure.

FIG. 17 is a diagram showing an example of a database operation when the cloud server deletes a camera activation command according to the first embodiment of the present disclosure. As shown in FIG. 17, in step 8110, the camera activation command in the "command information" field of the ID command table 9101 is deleted.

In subsequent step 8111 in FIG. 11, the command executing section 2106 of the user mobile terminal 1002 starts the camera application 2120 based on the user command acquired by the third user acquiring section 2104, that is, the camera activation command. In step 8112, when the user operates the photography instructing section 2121 displayed on the user mobile terminal 1002, the picture photographing section 2122 of the user mobile terminal 1002 executes picture photography of the photographic object device 1006.

In step 8113, the photographic data transmitting section 2105 of the user mobile terminal 1002 uploads photographic data to the cloud server 1003. In step 8114, photographic data transmitted by the user mobile terminal 1002 is received by the photographic data receiving section 3106 of the cloud server 1003, and the photographic data storing section 3115 stores the received photographic data in the information storage section 3120 in association with a user photographic data URL.

Figure 18:
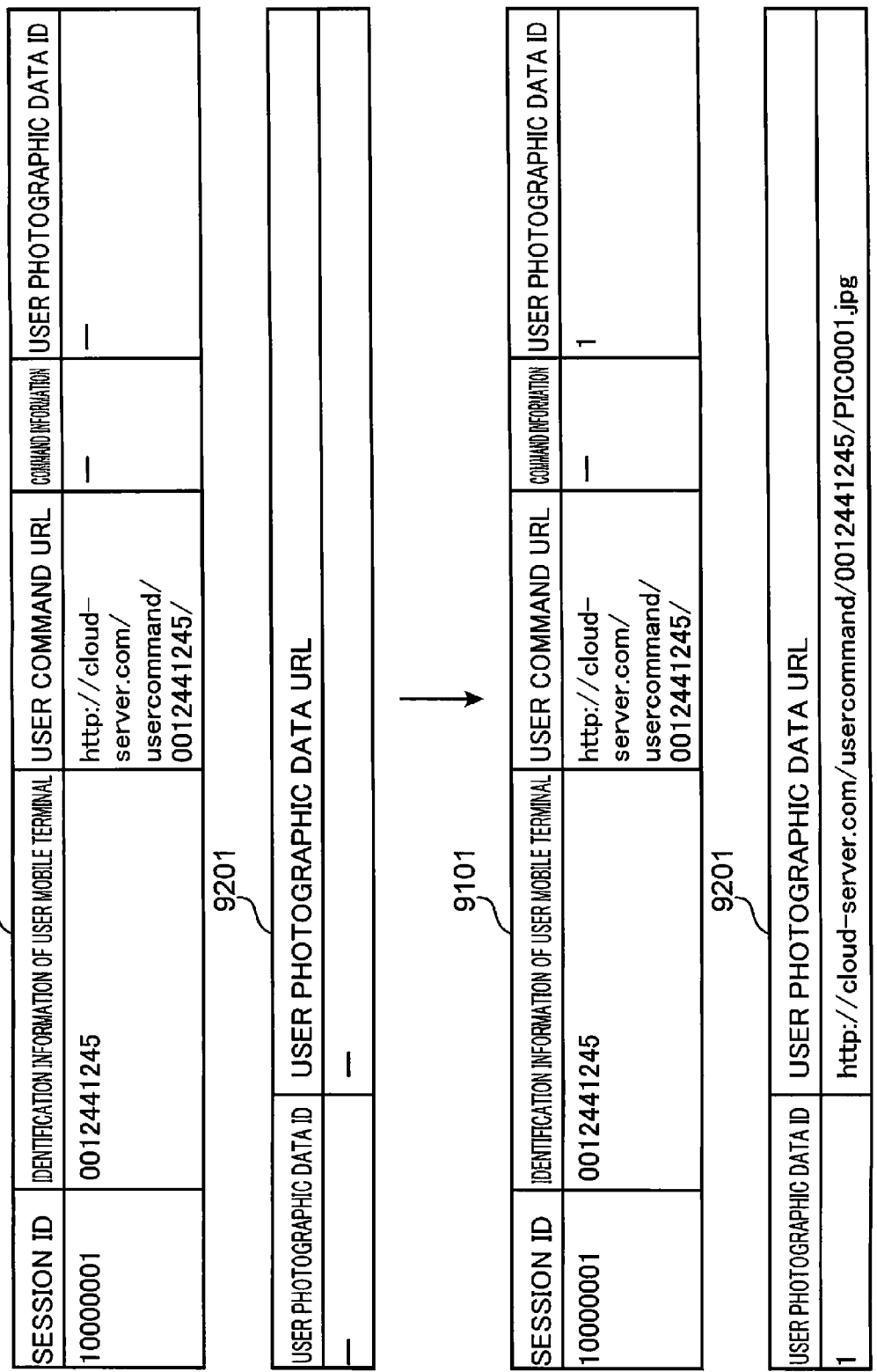
FIG. 18 is a diagram showing an example of a database operation when photographic data is stored by a cloud server according to the first embodiment of the present disclosure.

FIG. 18 is a diagram showing an example of a database operation when the cloud server stores photographic data according to the first embodiment of the present disclosure. In step 8114 shown in FIG. 11, for example, "1" is written into a "user photographic data ID" field of the ID command table 9101 as shown in FIG. 18. In addition, a corresponding "1" is written into a "user photographic data ID" field of the photographic data table 9201, and information representing a location of the photographic data is written into a "user photographic data URL" field.

In subsequent step 8115 in FIG. 11, when the photographic data acquisition button 5108 (for example, FIG. 15) displayed on the display screen of the operator operation terminal 1005 is operated, the second acquiring section 5103 of the operator operation terminal 1005 issues a request to acquire information regarding the location of the photographic data photographed by the user to the cloud server 1003. The acquisition request includes the session ID.

In step 8116, the fourth searching section 3114 of the cloud server 1003 searches for a location of the photographic data stored in the information storage section 3120 based on the session ID included in the acquisition request by the operator operation terminal 1005. In step 8117, in response to the acquisition request by the operator operation terminal 1005, the fourth responding section 3104 of the cloud server 1003 sends back information (the user photographic data URL shown in FIG. 18) regarding the location of the photographic data to the operator operation terminal 1005.

In step 8118, the third acquiring section 5104 of the operator operation terminal 1005 issues a request to the cloud server 1003 to acquire photographic data based on the information regarding the location of the photographic data. In step 8119, the photographic data transmitting section 3107 of the cloud server 1003 transmits the photographic data to the operator operation terminal 1005 in response to the acquisition request by the operator operation terminal 1005. In step 8120, the third acquiring section 5104 of the operator operation terminal 1005 acquires the photographic data and the photographic data display section 5105 displays the acquired photographic data on the display screen of the operator operation terminal 1005.

Figure 19:
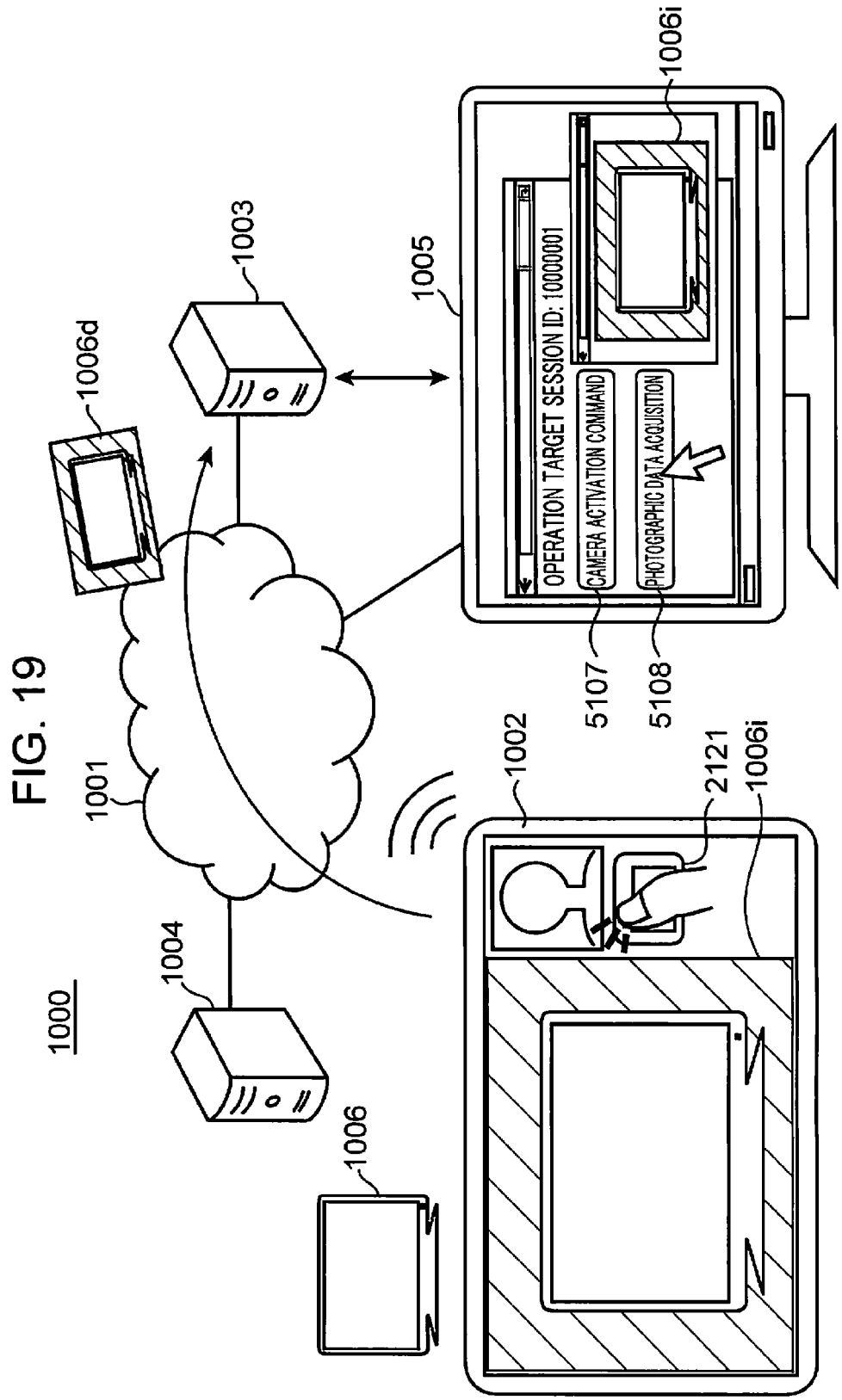
FIG. 19 is a diagram showing an overall configuration after a user operates a photography instructing section on a user mobile terminal according to the first embodiment of the present disclosure.

FIG. 19 is a diagram showing an overall configuration after the user operates the photography instructing section on the user mobile terminal according to the first embodiment of the present disclosure. In step 8112 shown in FIG. 11, picture photography is executed when the photography instructing section 2121 is operated by the user, and in step 8113, photographic data 1006d of the photographic object device 1006 is uploaded to the cloud server 1003 as shown in FIG. 19. Furthermore, when the photographic data acquisition button 5108 of the operator operation terminal 1005 is operated in step 8115, an image 1006i of the photographic object device 1006 is displayed on the display screen of the operator operation terminal 1005 in step 8120 as shown in FIG. 19.

When remote support is concluded, in step 8121 shown in FIG. 11, the user instructs end of call on the user mobile terminal 1002. In step 8122, the end call requesting section 2112 of the user mobile terminal 1002 issues an end call request to the call-response control server 1004. In step 8123, the call-response controller 4103 of the call-response control server 1004 transmits the end call request by the user mobile terminal 1002 to the operator operation terminal 1005.

In step 8124, the end call responding section 5112 of the operator operation terminal 1005 issues an end call response to the call-response control server 1004. In step 8125, the call-response controller 4103 of the call-response control server 1004 transmits the end call response by the operator operation terminal 1005 to the user mobile terminal 1002. Accordingly, the voice telephone conversation between the operator operation terminal 1005 and the user mobile terminal 1002 is concluded and the remote support application 2100 of the user mobile terminal 1002 is exited.

In the present embodiment, the session ID corresponds to an example of the identifier, and the user command URL corresponds to an example of the confirmation destination address. In addition, in the present embodiment, a request to acquire the session ID or the like in step 8005 shown in FIG. 10 corresponds to an example of the first access, a request to acquire the user command in step 8107 shown in FIG. 11 corresponds to an example of the second access, a request to acquire the access destination information in step 8002 shown in FIG. 10 corresponds to an example of the third access, and the camera activation command transmitted in step 8105 shown in FIG. 11 corresponds to an example of the instruction of the information apparatus. Furthermore, in the present embodiment, the identification information of the operator operation terminal 1005 included in the user access destination information table 9001 shown in FIG. 12 corresponds to an example of the address information of the information processing apparatus and the address information of the predetermined destination, and the access destination information of the cloud server 1003 corresponds to an example of the address information of the predetermined server.

Figure 20:
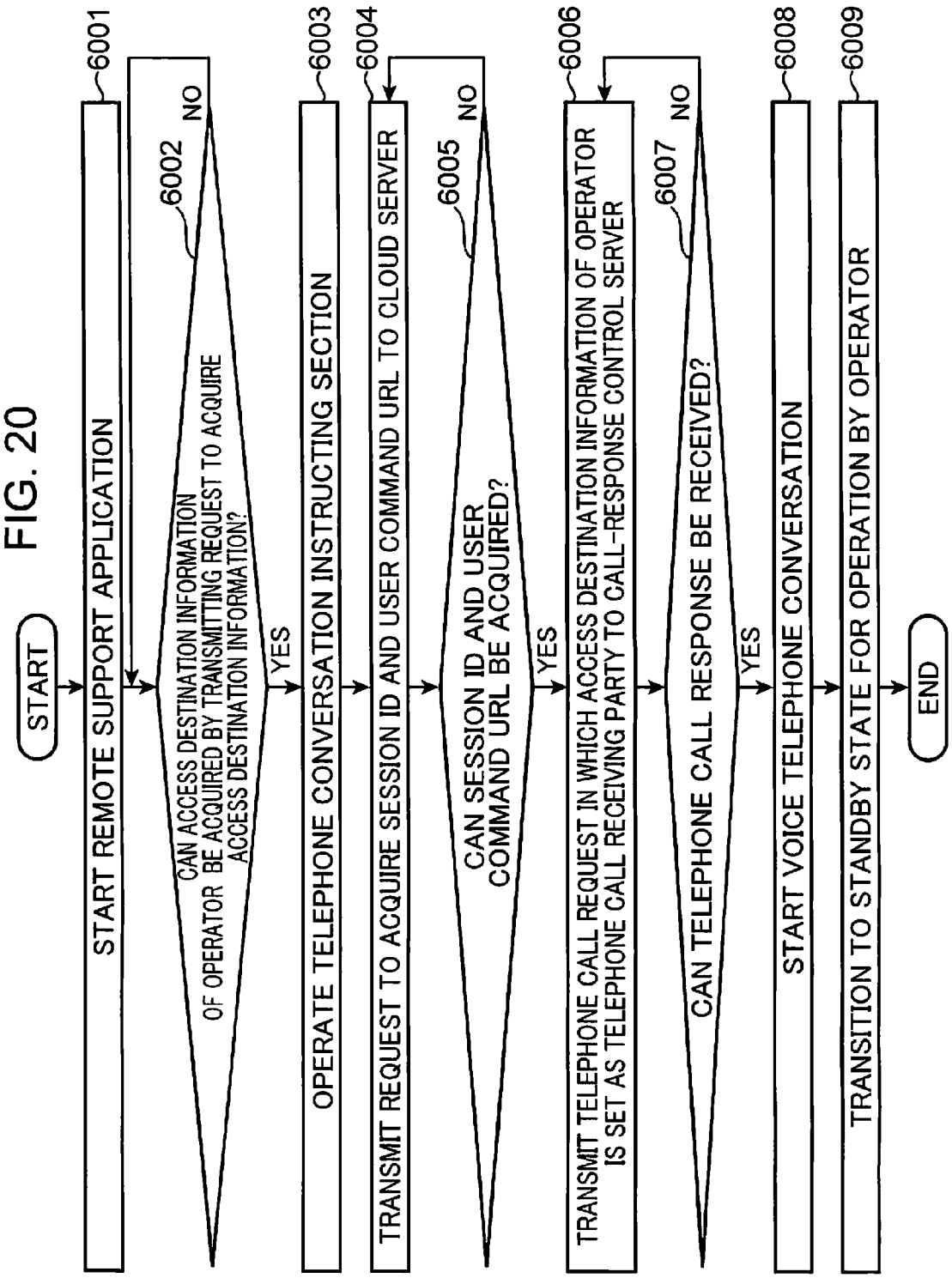
FIG. 20 is a diagram showing a process flow up to start of a telephone conversation of a user mobile terminal according to the first embodiment of the present disclosure.

FIG. 20 is a diagram showing a process flow up to start of a telephone conversation of the user mobile terminal 1002 according to the first embodiment of the present disclosure.

In step 6001 in FIG. 20, the user starts the remote support application 2100. In step 6002, the first user acquiring section 2101 transmits a request to acquire access destination information to the cloud server 1003 based on the access destination information of the cloud server 1003 stored in advance, and a determination is made on whether or not the access destination information of the operator operation terminal 1005 can be acquired. The access destination information of the operator operation terminal 1005 is, for example, identification information (a telephone number) of the operator operation terminal 1005.

If access destination information of an operator cannot be acquired (NO in step 6002), the process returns to step 6002 to be repeated for, for example, a predetermined number of times. If access destination information of the operator can be acquired (YES in step 6002), in step 6003, the user operates the telephone conversation instructing section 2103 and executes a telephone conversation instruction. Accordingly, the telephone conversation application 2110 is started.

In step 6004, the second user acquiring section 2102 transmits a request to acquire a session ID and a user command URL to the cloud server 1003. In step 6005, a determination is made on whether or not the second user acquiring section 2102 can acquire a session ID and a user command URL from the cloud server 1003. If the second user acquiring section 2102 cannot acquire a session ID and a user command URL (NO in step 6005), the process returns to step 6004 to be repeated for, for example, a predetermined number of times.

If the second user acquiring section 2102 can acquire a session ID and a user command URL (YES in step 6005), in step 6006, the telephone call requesting section 2111 transmits a telephone call request in which the access destination information of the operator is set as a telephone call receiving party to the call-response control server 1004. The telephone call request includes the session ID. In step 6007, a determination is made on whether or not the voice telephone conversation section 2113 can receive a telephone call response. If the voice telephone conversation section 2113 cannot receive a telephone call response (NO in step 6007), the process returns to step 6006 to be repeated for, for example, a predetermined number of times.

If the voice telephone conversation section 2113 can receive a telephone call response (YES in step 6007), in step 6008, a voice telephone conversation is started. In step 6009, the user mobile terminal 1002 transitions to a standby state for an operation by the operator and the present flow is concluded.

Figure 21:
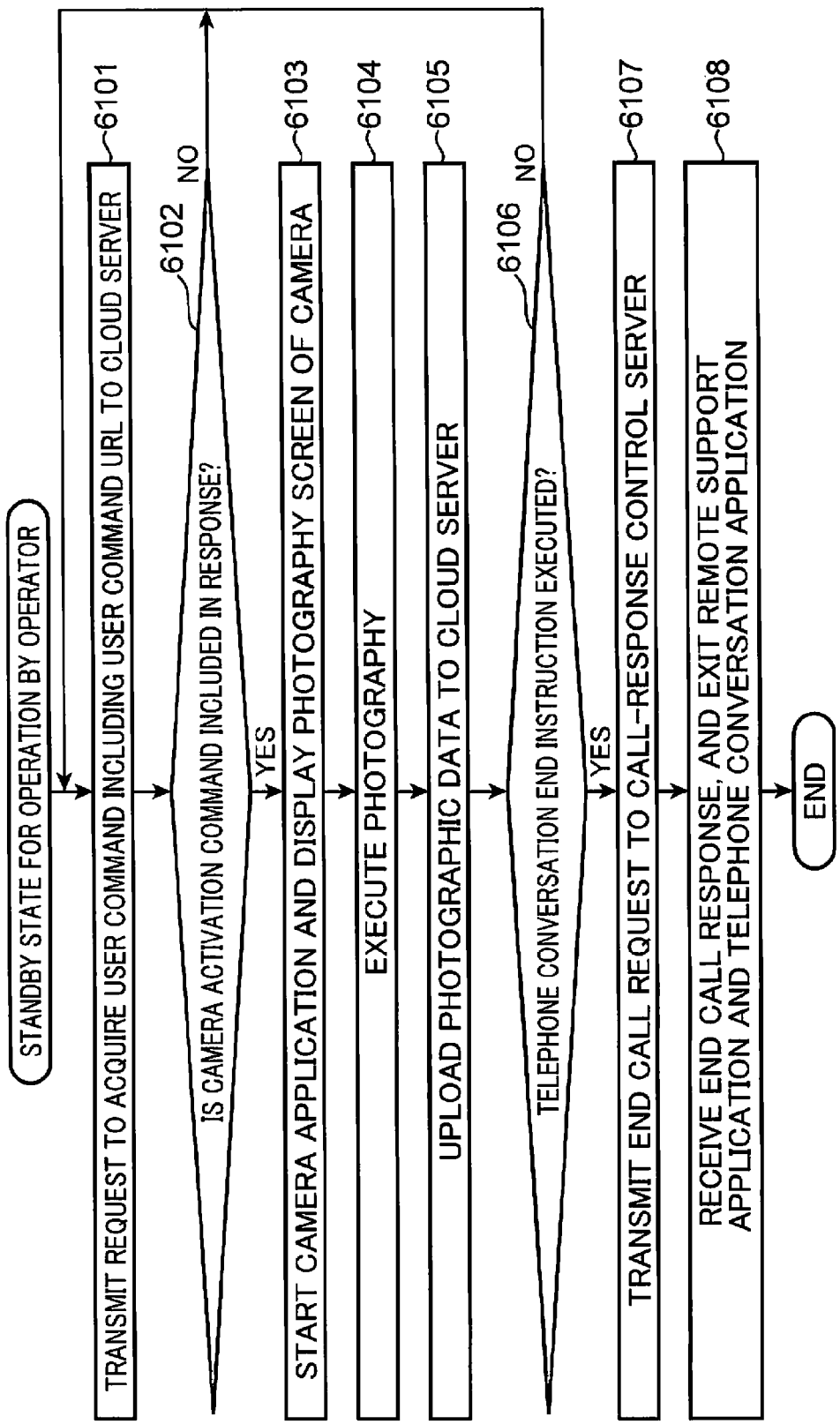
FIG. 21 is a diagram showing a process flow including and subsequent to start of a telephone conversation of a user mobile terminal according to the first embodiment of the present disclosure.

FIG. 21 is a diagram showing a process flow including and subsequent to start of a telephone conversation of the user mobile terminal 1002 according to the first embodiment of the present disclosure. The user mobile terminal 1002 is in a standby state for an operation by the operator.

In step 6101, the third user acquiring section 2104 transmits a request to acquire a user command including a user command URL to the cloud server 1003. In step 6102, a determination is made on whether or not the third user acquiring section 2104 can receive a response to the request to acquire a user command and whether or not a camera activation command is included in the received response. If a camera activation command is not included in the received response (NO in step 6102), the process returns to step 6101 and steps 6101 and 6102 are repeated. In other words, in a standby state for an operation by the operator, steps 6101 and 6102 are periodically repeated.

If a camera activation command is included in the received response in step 6102 (YES in step 6102), in step 6103, the command executing section 2106 starts the camera application 2120 in response to the camera activation command and displays a photography screen of the camera on the display screen. Accordingly, the standby state for an operation by the operator is canceled.

In step 6104, the user operates the photography instructing section 2121 and executes photography using the camera application 2120 running on the user mobile terminal 1002. In step 6105, the photographic data transmitting section 2105 uploads photographed data to the cloud server 1003.

In step 6106, a determination is made on whether or not the user has executed a telephone conversation end instruction. If the user has not executed a telephone conversation end instruction (NO in step 6106), the process returns to step 6101 and the steps described above are repeated. If the user executes a telephone conversation end instruction (YES in step 6106), in step 6107, the end call requesting section 2112 transmits an end call request to the call-response control server 1004. In step 6108, the voice telephone conversation section 2113 receives an end call request from the operator operation terminal 1005 via the call-response control server 1004, the remote support application 2100 and the telephone conversation application 2110 are exited, and the present flow is concluded.

Figure 22:
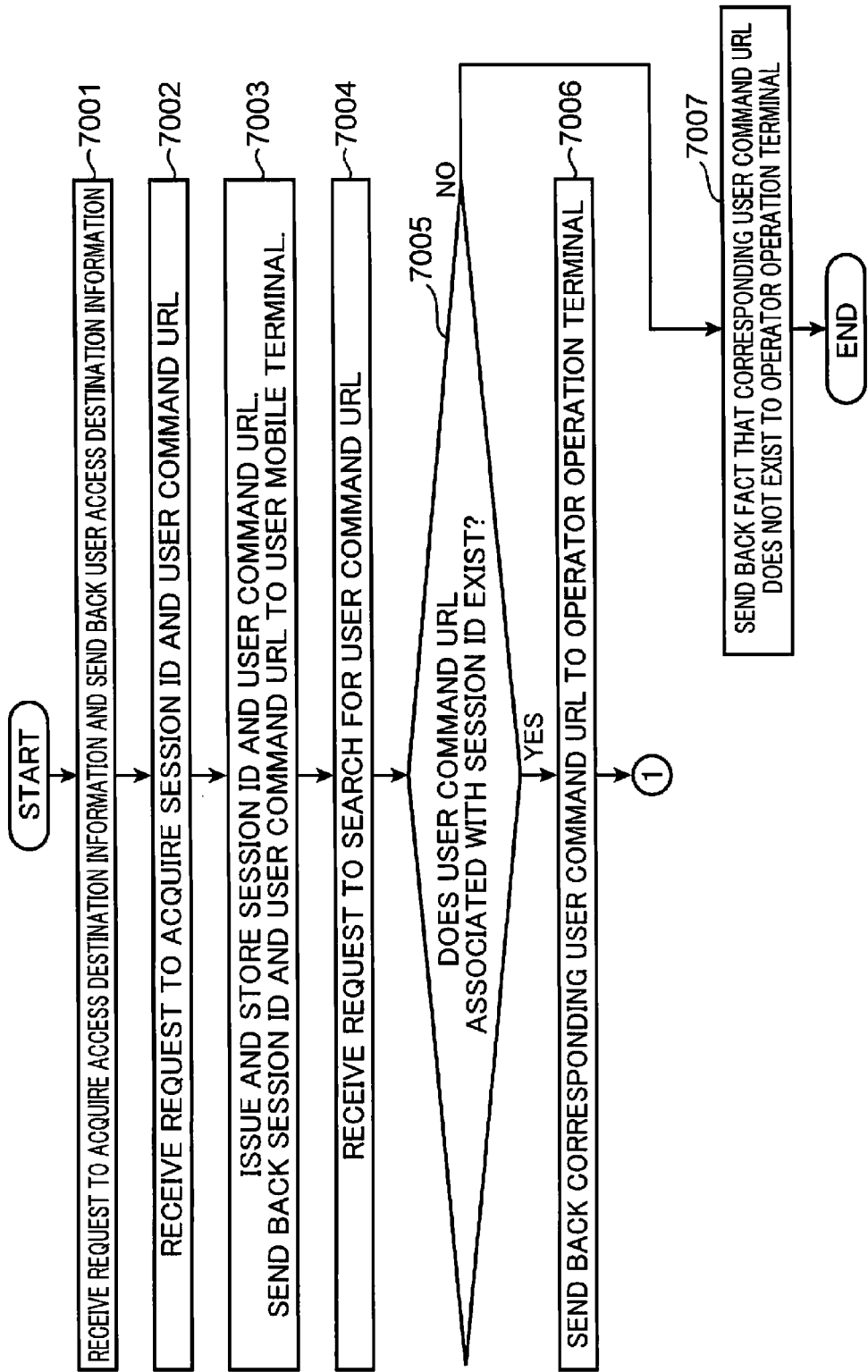
FIG. 22 is a diagram showing a process flow up to start of a telephone conversation of a cloud server according to the first embodiment of the present disclosure.
Figure 23:
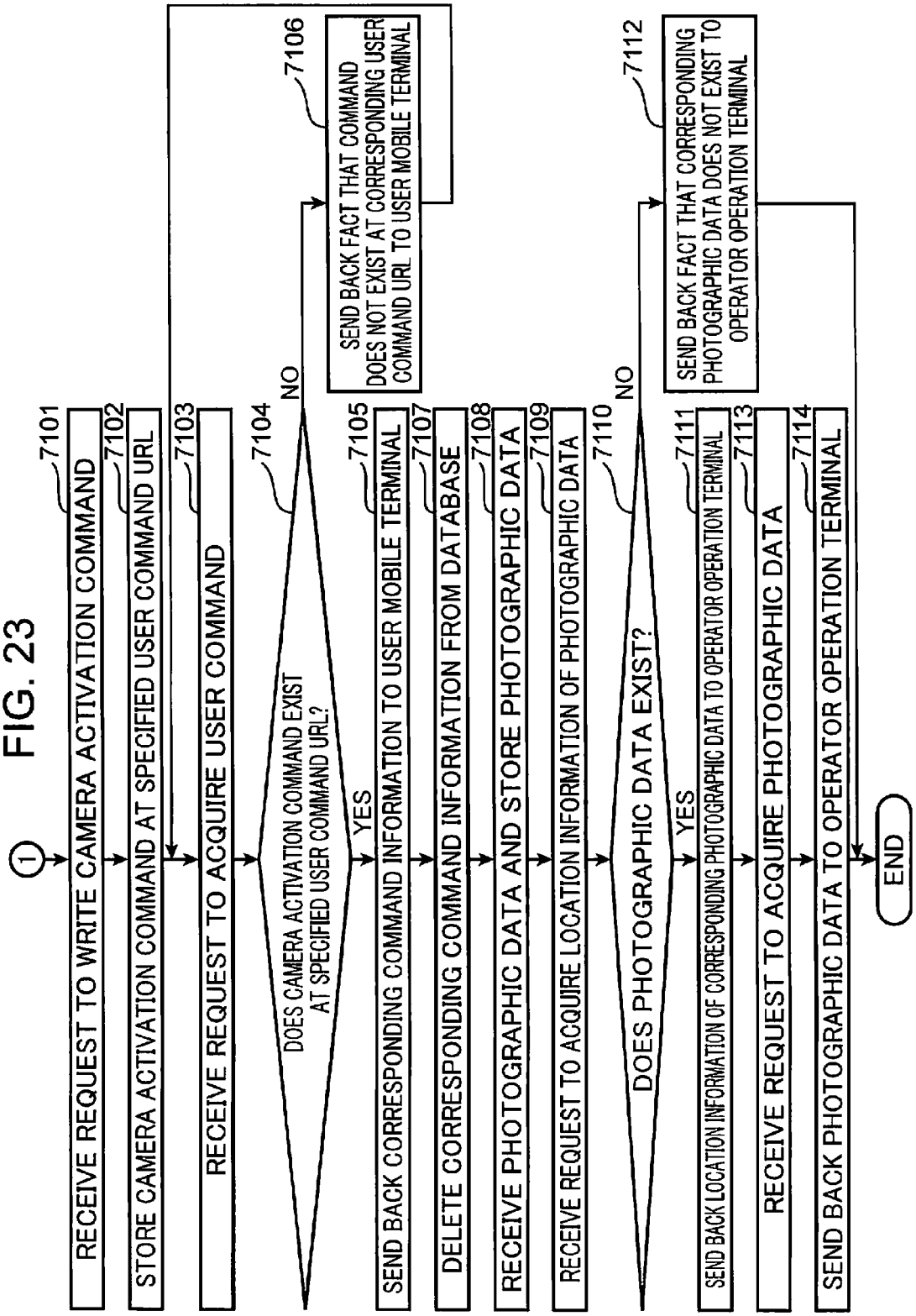
FIG. 23 is a diagram showing a process flow including and subsequent to start of a telephone conversation of a cloud server according to the first embodiment of the present disclosure.

FIGS. 22 and 23 are diagrams showing a process flow of the cloud server according to the first embodiment of the present disclosure. FIG. 22 shows a process flow up to start of a telephone conversation, and FIG. 23 shows a process flow including and subsequent to the start of a telephone conversation.

In step 7001 shown in FIG. 22, the cloud server 1003 receives a request to acquire access destination information from the user mobile terminal 1002 and, in response to the received acquisition request, the first responding section 3101 sends back information of the user access destination information table 9001 including identification information of the operator operation terminal 1005.

In step 7002, the cloud server 1003 receives a request to acquire a session ID and a user command URL from the user mobile terminal 1002. In step 7003, the second responding section 3102 issues a session ID and a user command URL associated with the session ID, and stores the same in the information storage section 3120. In addition, the second responding section 3102 sends back the session ID and the user command URL to the user mobile terminal 1002.

In step 7004, a request to search for a user command URL is received from the operator operation terminal 1005. The request to search for a user command URL includes a session ID. In step 7005, the second searching section 3112 searches the information storage section 3120 to determine whether or not a user command URL associated with the session ID included in the request to search for a user command URL exists.

If a user command URL associated with the session ID does not exist (NO in step 7005), in step 7007, the third responding section 3103 transmits the fact that a corresponding user command URL does not exist to the operator operation terminal 1005, performs a predetermined error process, and the present flow is concluded.

If a user command URL associated with the session ID exists (YES in step 7005), the third responding section 3103 sends back a corresponding user command URL to the operator operation terminal 1005.

In subsequent step 7101 shown in FIG. 23, the cloud server 1003 receives a request to write a camera activation command from the operator operation terminal 1005. The request to write a camera activation command includes a user command URL. In step 7102, the command writing section 3116 stores a camera activation command as a user command at the specified user command URL in the information storage section 3120.

In step 7103, the cloud server 1003 receives a request to acquire a user command from the user mobile terminal 1002. As described earlier, the request to acquire a user command includes, for example, a user command URL. In step 7104, the third searching section 3113 searches the information storage section 3120 to determine whether or not a camera activation command exists at the specified user command URL.

If a camera activation command does not exist at the specified user command URL (NO in step 7104), in step 7106, the fourth responding section 3104 sends back the fact that an instruction does not exist at the corresponding user command URL to the user mobile terminal 1002 and the process returns to step 7103.

If a camera activation command exists at the specified user command URL (YES in step 7104), in step 7105, the fourth responding section 3104 sends back corresponding command information, that is, the camera activation command to the user mobile terminal 1002. After transmitting the command information to the user mobile terminal 1002, in step 7106, the command deleting section 3117 deletes the corresponding command information, that is, the camera activation command from the information storage section 3120. Accordingly, the same command information is prevented from being resent to the user mobile terminal 1002.

In step 7108, the photographic data receiving section 3106 receives photographic data from the user mobile terminal 1002 and the photographic data storing section 3115 stores the received photographic data in the information storage section 3120 in association with a user photographic data URL.

In step 7109, the cloud server 1003 receives a request to acquire information related to a location of the photographic data from the operator operation terminal 1005. The acquisition request includes a session ID. In step 7110, the fourth searching section 3114 searches the information storage section 3120 based on the specified session ID and determines whether or not photographic data exists.

If photographic data does not exist (NO in step 7110), in step 7112, the fact that corresponding photographic data does not exist is sent back to the operator operation terminal 1005 and the present flow is concluded. On the other hand, if photographic data exists (YES in step 7110), in step 7111, the sixth responding section 3108 sends back location information of the corresponding photographic data, that is, the user photographic data URL of the photographic data table 9201 (for example, FIG. 18) to the operator operation terminal 1005.

In step 7113, the cloud server 1003 receives a request to acquire photographic data from the operator operation terminal 1005. In step 7114, the photographic data transmitting section 3107 sends back the photographic data to the operator operation terminal 1005 in response to the acquisition request by the operator operation terminal 1005 and the present flow is concluded. The cloud server 1003 may erase the session ID and the user command URL issued in the current remote support after, for example, a predetermined amount of time.

As described above, in the first embodiment, the operator operation terminal 1005 can remotely control the user mobile terminal 1002 by simply having the user start the remote support application 2100 on the user mobile terminal 1002 and operate the telephone conversation instructing section 2103 to start the telephone conversation application 2110. Therefore, a process by the operator operation terminal 1005 to remotely control the user mobile terminal 1002 can be simplified.

In addition, the user of the user mobile terminal 1002 need only issue a telephone conversation instruction and need not perform a separate operation at the user mobile terminal 1002 to start the camera application 2120. Therefore, operations of the user on the user mobile terminal 1002 can be simplified and a state can be created in the user mobile terminal 1002 where image information can be provided in addition to voice information provided by the telephone conversation instruction issued by the user.

Accordingly, the camera application 2120 of the user mobile terminal 1002 can be started by remote control during a telephone conversation between the user of the user mobile terminal 1002 and the operator of the operator operation terminal 1005 and by having the user capture an image of, for example, a product number or a failure location of the photographic object device 1006 experiencing a malfunction, photographic data can be forwarded to the operator operation terminal 1005. Therefore, the user of the user mobile terminal 1002 can be provided with appropriate advice or maintenance information based on visual information in the form of an image in addition to voice information in the form of a telephone conversation.

Moreover, in the first embodiment described above, the third user acquiring section 2104 of the user mobile terminal 1002 may go to the user command URL in the information storage section 3120 of the cloud server 1003 to directly read a user command in step 8101 or step 8107 shown in FIG. 11. In this case, steps 8102 and 8108 in which the cloud server 1003 searches for a user command and steps 8103 and 8109 in which the cloud server 1003 responds to the user mobile terminal 1002 can be deleted.

In addition, in the first embodiment described above, the fourth responding section 3104 of the cloud server 1003 may send back information (a URL) on an upload destination of photographic data to the user mobile terminal 1002 together with a camera activation command in step 8109 shown in FIG. 11. Furthermore, the photographic data transmitting section 2105 of the user mobile terminal 1002 may directly upload photographic data to the upload destination URL. In this case, step 8114 in which the cloud server 1003 stores photographic data can be deleted.

In addition, in the first embodiment described above, the operator operation terminal 1005 may go to a user photographic data URL of the information storage section 3120 of the cloud server 1003 to directly read photographic data. In this case, step 8119 in which the cloud server 1003 responds to the operator operation terminal 1005 can be deleted.

Furthermore, in the first embodiment described above, the image of the photographic object device 1006 captured by the user with the user mobile terminal 1002 may be either a still image or a moving image.

In addition, in the first embodiment described above, the photographic data transmitting section 2105 of the user mobile terminal 1002 may transmit a moving image or a still image to the operator operation terminal 1005 while also transmitting the moving image or the still image to the cloud server 1003 in step 8113 shown in FIG. 11.

(Second Embodiment)

Figure 24:
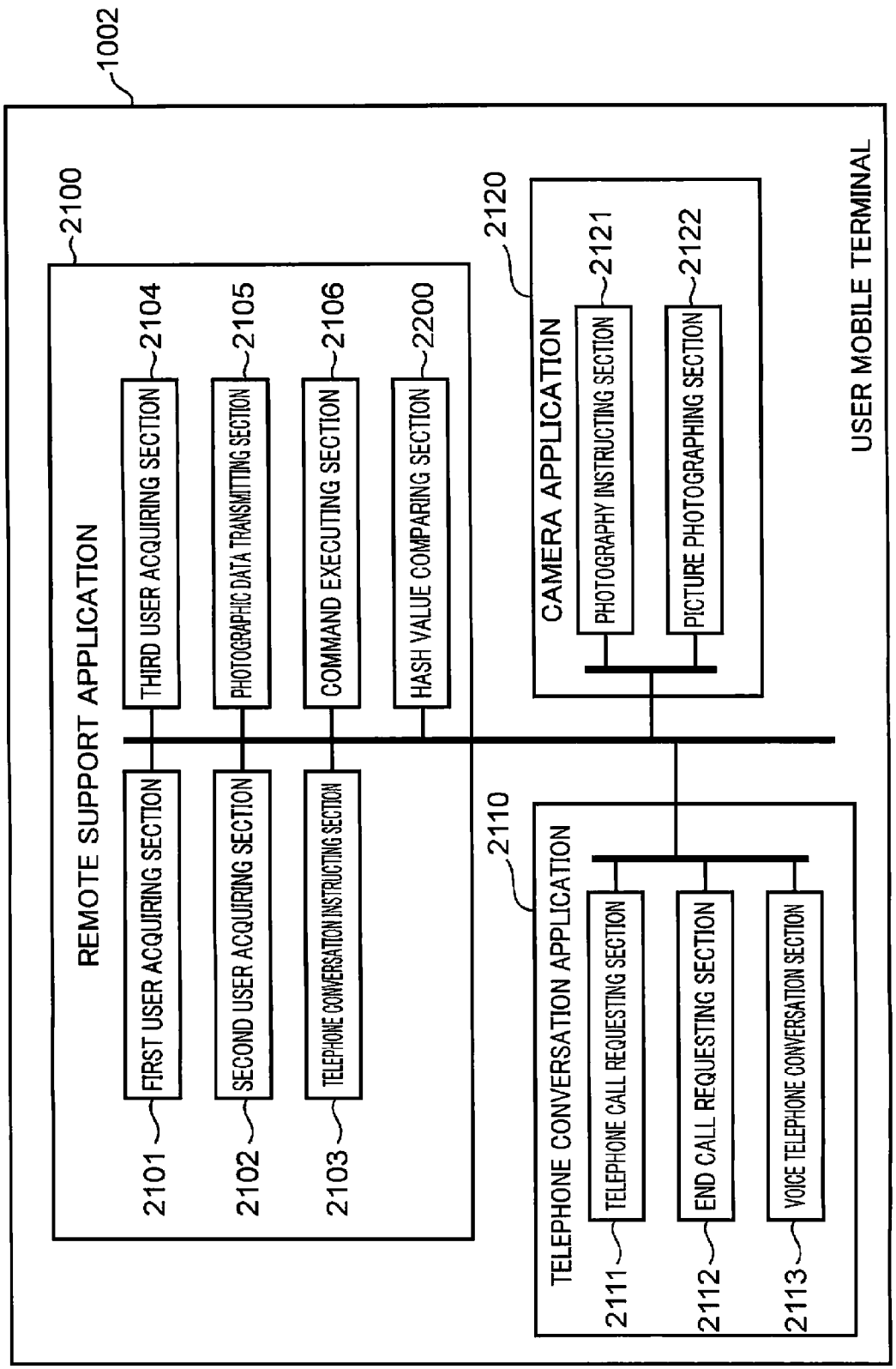
FIG. 24 is a diagram showing functional blocks of a user mobile terminal according to a second embodiment of the present disclosure.

FIG. 24 is a diagram showing functional blocks of the user mobile terminal 1002 according to the second embodiment of the present disclosure. A configuration of the remote support system 1000 according to the second embodiment is the same as that according to the first embodiment shown in FIG. 1. In addition, a configuration of the user mobile terminal 1002 according to the second embodiment is the same as that according to the first embodiment shown in FIG. 2. Furthermore, configurations and functional blocks of the cloud server 1003, the call-response control server 1004, and the operator operation terminal 1005 according to the second embodiment are the same as those according to the first embodiment shown in FIGS. 4 to 9.

As shown in FIG. 24, the remote support application 2100 of the user mobile terminal 1002 according to the second embodiment includes a hash value comparing section 2200 as a functional block. The third user acquiring section 2104 according to the second embodiment acquires a user command and a hash value (to be described later) from the cloud server 1003.

The hash value comparing section 2200 compares a hash value stored in the memory 2005 with a new hash value acquired by the third user acquiring section 2104. The hash value comparing section 2200 notifies a comparison result to the command executing section 2106. If the hash value stored in the memory 2005 differs from the new hash value acquired by the third user acquiring section 2104, the hash value comparing section 2200 deletes the hash value stored in the memory 2005 and stores the new hash value acquired by the third user acquiring section 2104 in the memory 2005.

The command executing section 2106 executes a new user command acquired by the third user acquiring section 2104 only when the hash value stored in the memory 2005 differs from the new hash value acquired by the third user acquiring section 2104. In other words, if the hash value stored in the memory 2005 and the new hash value acquired by the third user acquiring section 2104 are the same, the command executing section 2106 does not execute the new user command acquired by the third user acquiring section 2104. In the present embodiment, a hash value corresponds to an example of the value for identifying the instruction.

Figure 25:
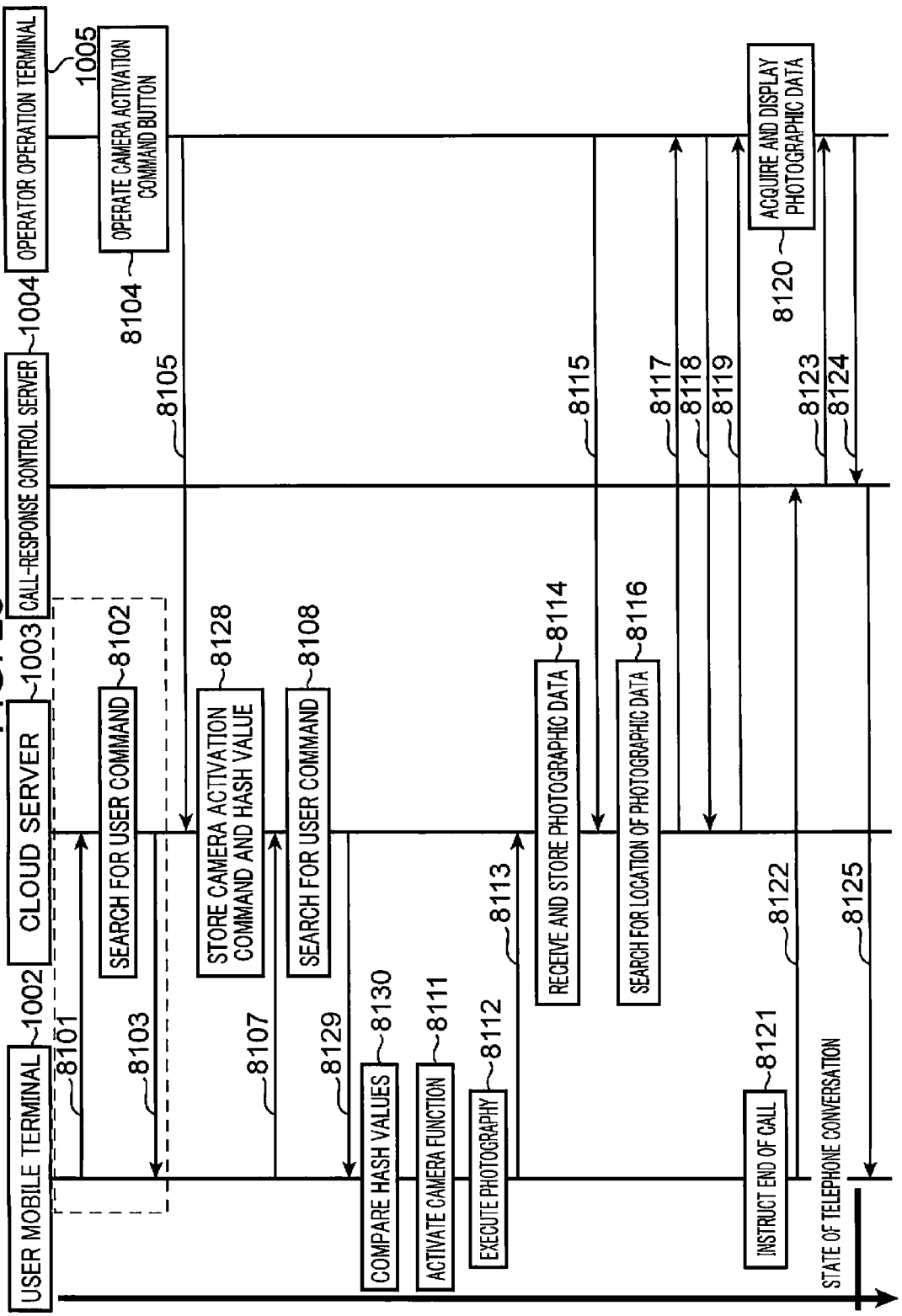
FIG. 25 is a diagram showing a sequence including and subsequent to start of a telephone conversation according to the second embodiment of the present disclosure.
Figure 26:
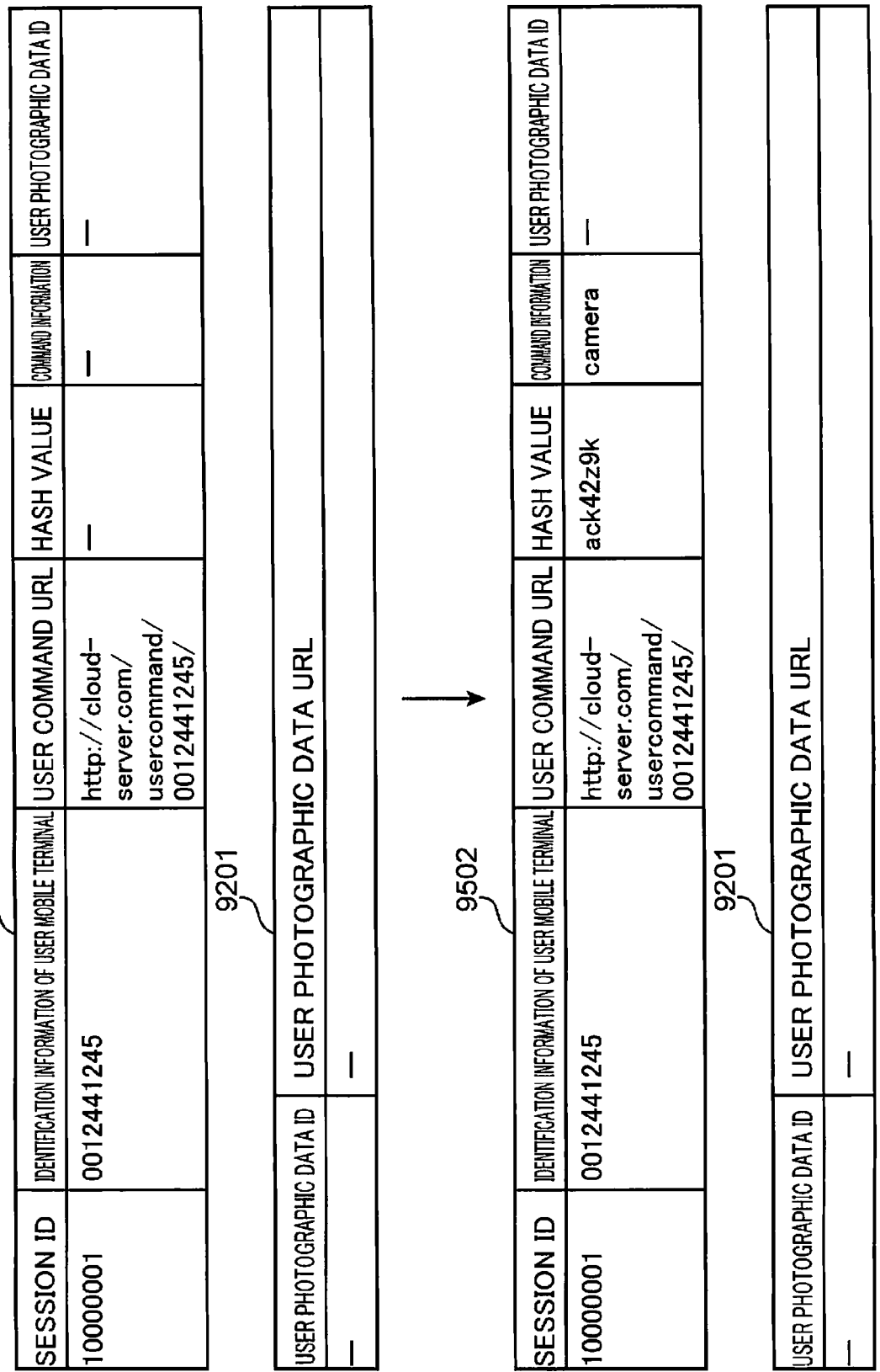
FIG. 26 is a diagram showing an example of a database operation when a camera activation command is stored as a user command in a cloud server according to the second embodiment of the present disclosure.

FIG. 25 is a diagram showing a sequence including and subsequent to start of a telephone conversation according to the second embodiment of the present disclosure. FIG. 26 is a diagram showing an example of a database operation when the cloud server stores a camera activation command as a user command according to the second embodiment of the present disclosure. A sequence up to start of a telephone conversation according to the second embodiment of the present disclosure is the same as the first embodiment shown in FIG. 10.

In FIG. 25, steps 8101 to 8105 are the same as steps 8101 to 8105 shown in FIG. 11. In step 8128 subsequent to step 8105, the command writing section 3116 of the cloud server 1003 stores a camera activation command as a user command in association with a specified user command URL. In addition, in step 8128, the command writing section 3116 generates a hash value using a hash function from the camera activation command and stores the generated hash value in association with the specified user command URL.

As shown in FIG. 26, an ID command table 9502 stored in the cloud server 1003 according to the second embodiment includes a "hash value" field in addition to the respective fields included in the ID command table 9101 (for example, FIG. 16) according to the first embodiment. In step 8128 in FIG. 25, as shown in FIG. 26, a camera activation command is written into a "command information" field and a hash value is written into the "hash value" field of the ID command table 9502 having a corresponding user command URL.

Subsequent steps 8107 and 8108 shown in FIG. 25 are the same as steps 8107 and 8108 shown in FIG. 11. In step 8129 subsequent to step 8108, the fourth responding section 3104 of the cloud server 1003 transmits the user command stored in the information storage section 3120 to the user mobile terminal 1002 in response to the request to acquire a user command. In the second embodiment, the user command includes a camera activation command and a hash value.

In step 8130, the hash value comparing section 2200 of the user mobile terminal 1002 compares a hash value stored in the memory 2005 with the hash value transmitted in step 8129. As a result of the comparison by the hash value comparing section 2200, if the hash value stored in the memory 2005 differs from the hash value transmitted in step 8129, the process proceeds to subsequent step 8111. Steps 8111 to 8125 are the same as steps 8111 to 8125 shown in FIG. 11.

Figure 27:
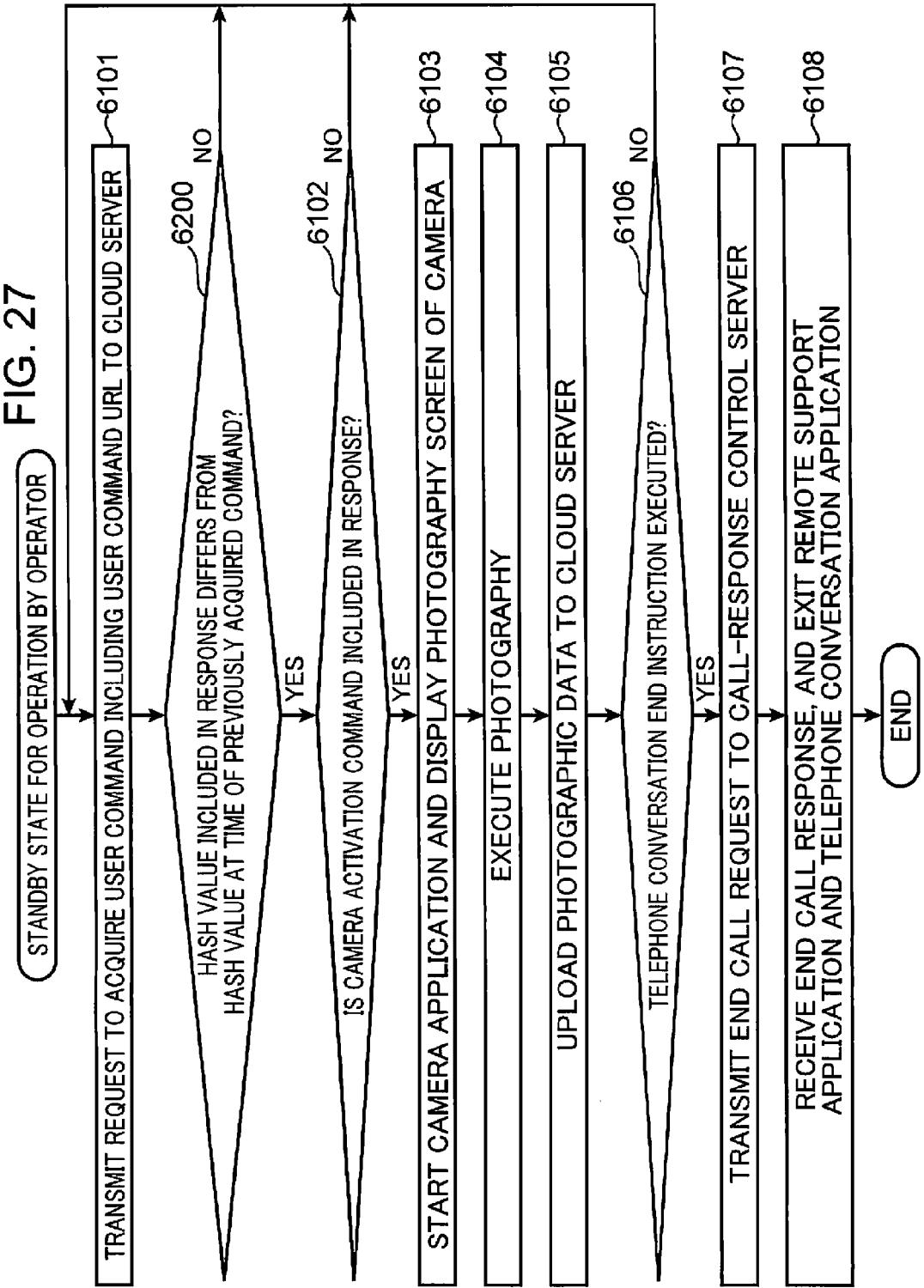
FIG. 27 is a diagram showing a process flow including and subsequent to start of a telephone conversation of a user mobile terminal according to the second embodiment of the present disclosure.

FIG. 27 is a diagram showing a process flow including and subsequent to start of a telephone conversation of the user mobile terminal 1002 according to the second embodiment of the present disclosure. The user mobile terminal 1002 is in a standby state for an operation by the operator. Moreover, the process flow up to start of a telephone conversation of the user mobile terminal 1002 according to the second embodiment is the same as that shown in FIG. 20.

Step 6101 shown in FIG. 27 is the same as step 6101 shown in FIG. 21. In subsequent step 6200, a determination is made on whether or not the third user acquiring section 2104 can receive a response to the request to acquire a user command and on whether or not the hash value included in the received response differs from the hash value at the time of the previously acquired command. When it is judged that the hash value included in the received response is the same as the hash value at the time of the previously acquired command (NO in step 6200), the process returns to step 6101 and steps 6101 and 6200 are repeated. In other words, in a standby state for an operation by the operator, steps 6101 and 6200 are periodically repeated.

On the other hand, when it is judged that the hash value included in the received response differs from the hash value at the time of the previously acquired command (YES in step 6200), the process proceeds to step 6102. Steps 6102 to 6108 are the same as steps 6102 to 6108 shown in FIG. 21.

Figure 28:
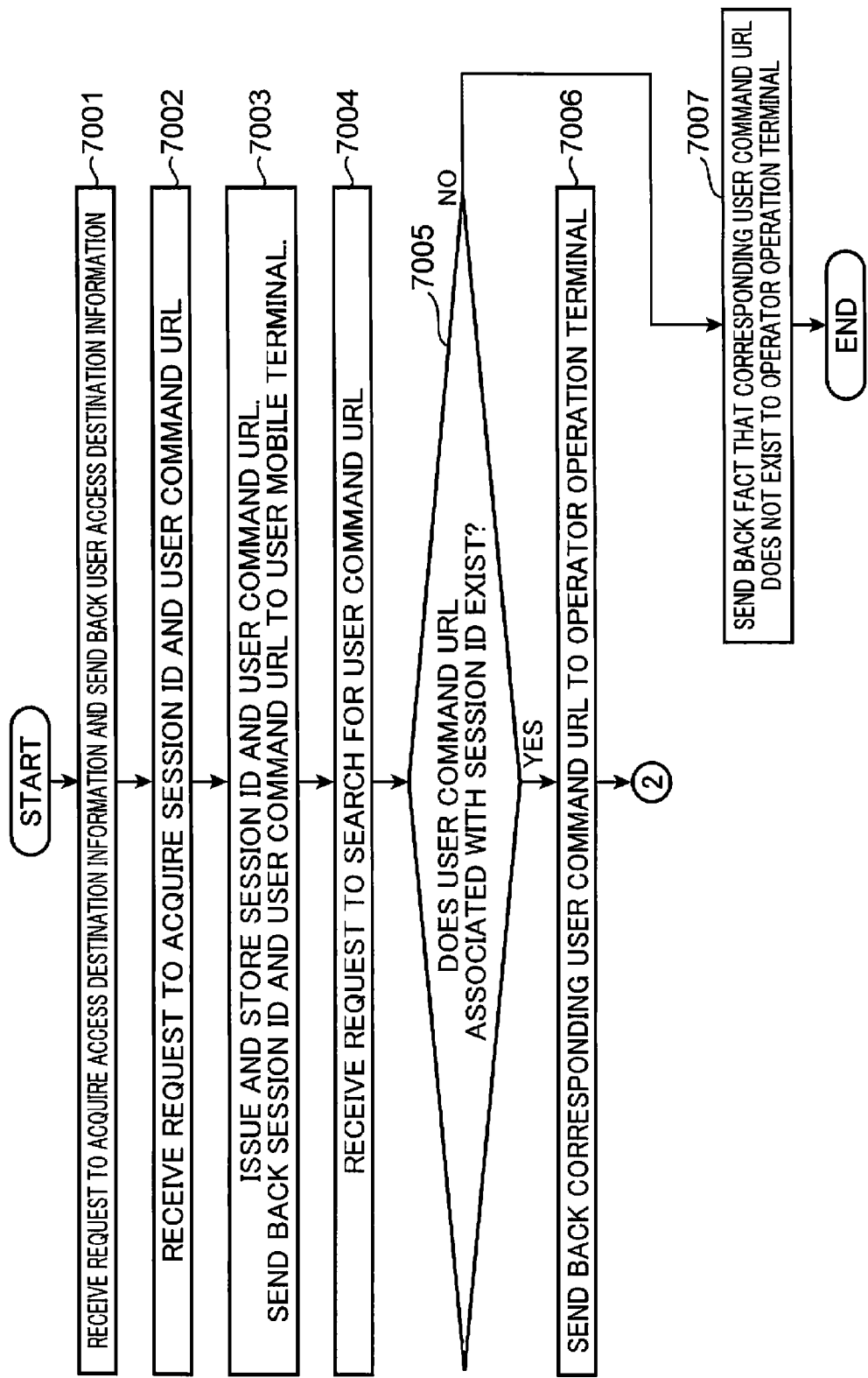
FIG. 28 is a diagram showing a process flow up to start of a telephone conversation of a cloud server according to the second embodiment of the present disclosure.
Figure 29:
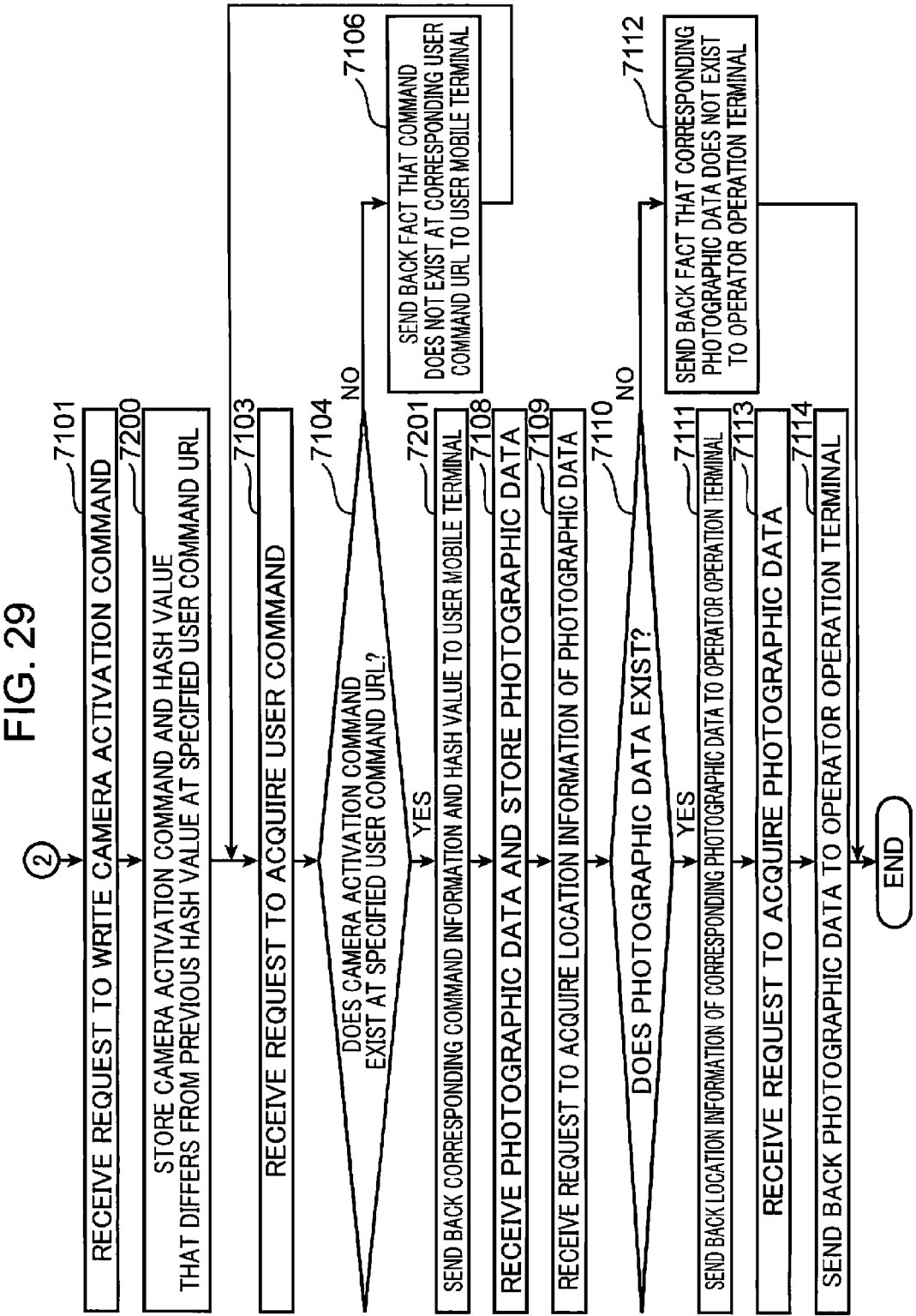
FIG. 29 is a diagram showing a process flow including and subsequent to start of a telephone conversation of a cloud server according to the second embodiment of the present disclosure.

FIG. 28 is a diagram showing a process flow up to start of a telephone conversation of the cloud server according to the second embodiment of the present disclosure. FIG. 29 is a diagram showing a process flow including and subsequent to start of a telephone conversation of the cloud server according to the second embodiment of the present disclosure. In FIG. 28, steps 7001 to 7006 are the same as steps 7001 to 7006 according to the first embodiment shown in FIG. 22.

In FIG. 29, step 7101 is the same as step 7101 shown in FIG. 22. In step 7200 subsequent to step 7101, the command writing section 3116 stores a camera activation command as a user command in association with a specified user command URL of the information storage section 3120. In addition, the command writing section 3116 generates a hash value which differs from that at the time of the previous instruction and stores the hash value together with the camera activation command.

Subsequent steps 7103 and 7104 are the same as steps 7103 to 7104 according to the first embodiment shown in FIG. 23. If a camera activation command does not exist at the specified user command URL (NO in step 7104), the process proceeds to step 7106. Step 7106 is the same as step 7106 shown in FIG. 23.

If a camera activation command exists at the specified user command URL (YES in step 7104), in step 7201, the fourth responding section 3104 sends back corresponding command information (in other words, the camera activation command) and the hash value to the user mobile terminal 1002. Subsequent steps 7108 to 7114 are the same as steps 7108 to 7114 shown in FIG. 23.

As described above, in the second embodiment, the cloud server 1003 transmits a hash value to the user mobile terminal 1002 together with a user command, and the hash value comparing section 2200 of the user mobile terminal 1002 determines whether or not the currently received user command is the same as the previous user command based on the hash value. If the hash values are the same, the command executing section 2106 does not execute an instruction of the corresponding user command. Therefore, in FIG. 29, a step for deleting a camera activation command such as that shown in FIG. 23 is not provided subsequent to step 7201.

In the second embodiment described above, while the command writing section 3116 of the cloud server 1003 generates a hash value and the hash value comparing section 2200 of the user mobile terminal 1002 determines whether or not the currently received user command is the same as the previous user command based on the hash value, hash values are not restrictive. The command writing section 3116 need only generate information for identifying an instruction, that is, information for identifying that the instruction differs from the previous instruction. Based on the generated information, the user mobile terminal 1002 may determine whether or not the currently received user command is the same as the previous user command. As the information for identifying an instruction, the command writing section 3116 may use, for example, time. Alternatively, as the information for identifying an instruction, the command writing section 3116 may use a serial number.

(Third Embodiment)

Figure 30:
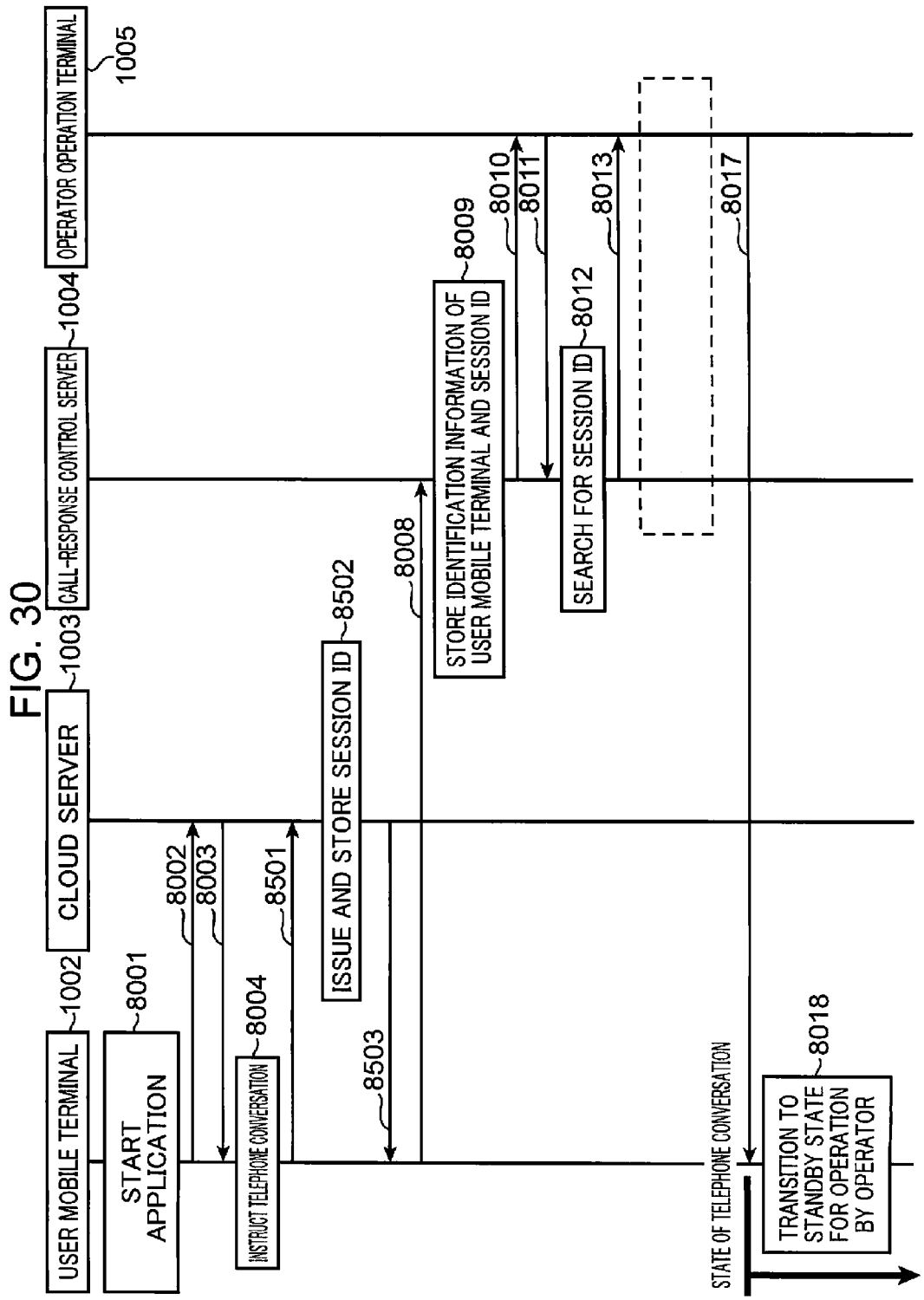
FIG. 30 is a diagram showing a sequence up to start of a telephone conversation according to a third embodiment of the present disclosure.
Figure 31:
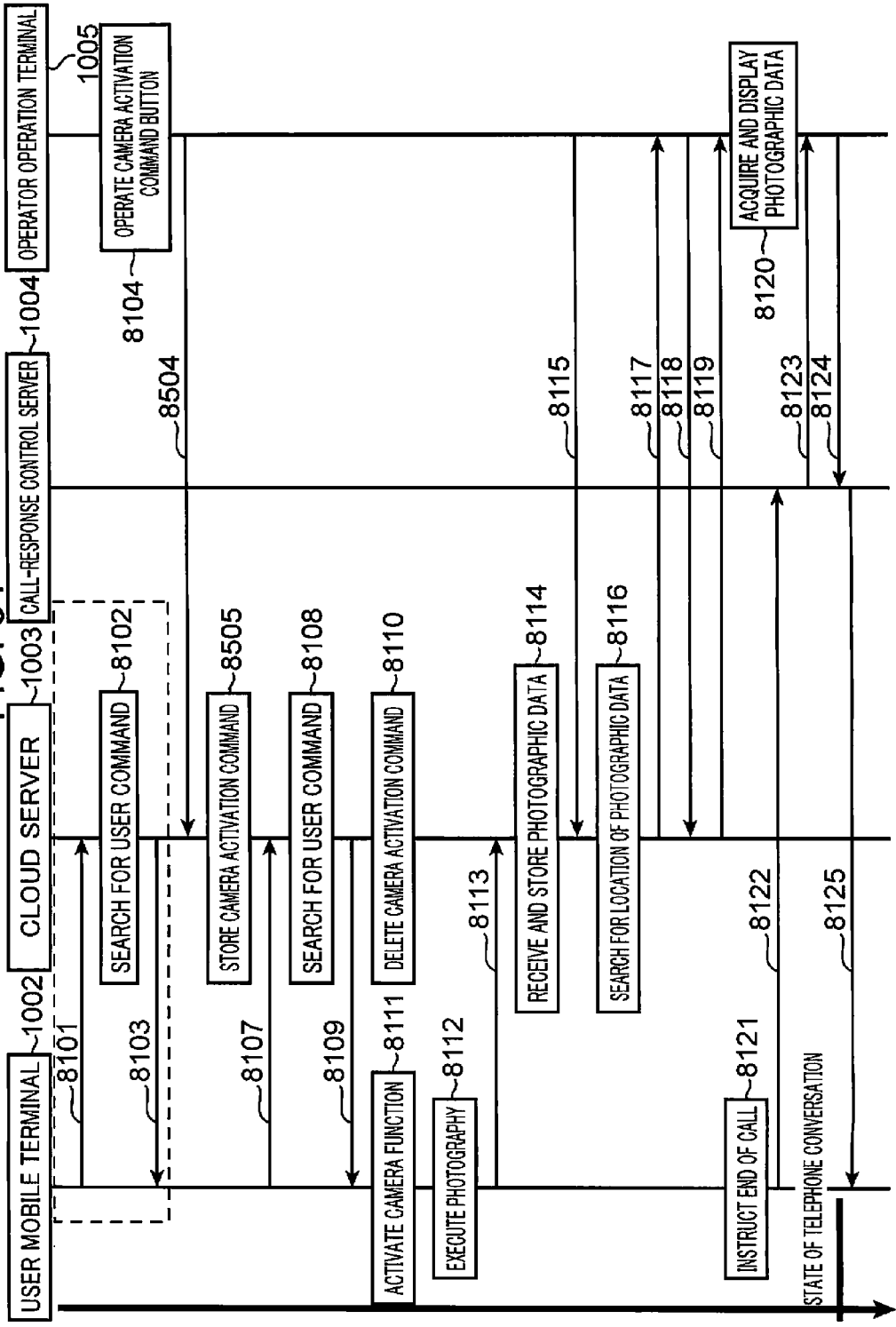
FIG. 31 is a diagram showing a sequence including and subsequent to start of a telephone conversation according to the third embodiment of the present disclosure.

FIGS. 30 and 31 are diagrams showing sequences according to a third embodiment of the present disclosure. FIG. 30 shows a sequence up to start of a telephone conversation, and FIG. 31 shows a sequence including and subsequent to the start of a telephone conversation. A configuration of the remote support system 1000 according to the third embodiment is the same as that according to the first embodiment shown in FIG. 1. Furthermore, configurations and functional blocks of the user mobile terminal 1002, the cloud server 1003, the call-response control server 1004, and the operator operation terminal 1005 according to the third embodiment are the same as those according to the first embodiment shown in FIGS. 2 to 9.

In FIG. 30, steps 8001 to 8004 are the same as steps 8001 to 8004 according to the first embodiment shown in FIG. 10.

FIG. 32 is a diagram showing an example of a user access destination information table 9701 of the cloud server 1003 according to the third embodiment of the present disclosure. In a similar manner to the user access destination information table 9001 according to the first embodiment shown in FIG. 12, the user access destination information table 9701 includes access destination information of the cloud server 1003, access destination information of the call-response control server 1004, and identification information of the operator operation terminal 1005. The identification information of the operator operation terminal 1005 is, for example, a telephone number of the operator operation terminal 1005. In step 8003 shown in FIG. 30, the first responding section 3101 of the cloud server 1003 responds to the request to acquire access destination information by the user mobile terminal 1002 and sends back information of the user access destination information table 9701.

In step 8501 shown in FIG. 30 subsequent to step 8004, the second user acquiring section 2102 of the user mobile terminal 1002 requests the cloud server 1003 to acquire a session ID and a general-purpose user command URL. In step 8502, the second responding section 3102 of the cloud server 1003 issues a session ID and stores the session ID in the information storage section 3120. In step 8503, in response to the request by the user mobile terminal 1002, the second responding section 3102 transmits a general-purpose user command URL and the issued session ID to the user mobile terminal 1002. The second user acquiring section 2102 of the user mobile terminal 1002 stores the acquired session ID and general-purpose user command URL in the memory 2005.

Figure 33:
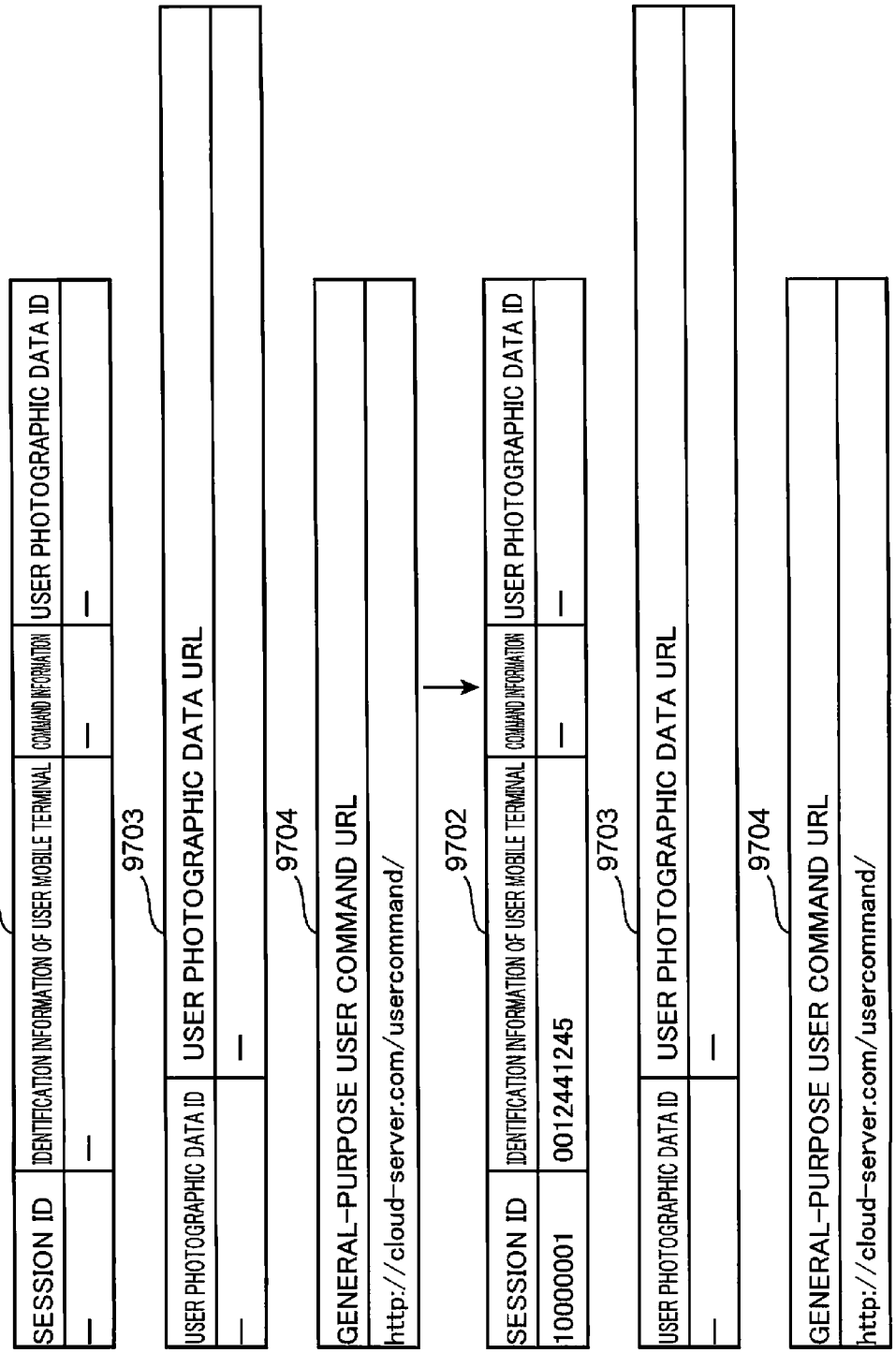
FIG. 33 is a diagram showing an example of a database operation upon issuance of a session ID of a cloud server according to the third embodiment of the present disclosure.

FIG. 33 is a diagram showing an example of a database operation upon issuance of a session ID of the cloud server 1003 according to the third embodiment of the present disclosure. In the third embodiment, the information storage section 3120 of the cloud server 1003 includes an ID table 9702, a photographic data table 9703, and a general command table 9704 as databases.

The ID table 9702 includes a session ID, identification information of the user mobile terminal 1002, command information, and a user photographic data ID for identifying photographic data that is photographed by the user. The identification information of the user mobile terminal 1002 is, for example, a telephone number of the user mobile terminal 1002.

The photographic data table 9703 includes a user photographic data ID and a user photographic data URL representing a location of photographic data photographed by the user in a similar manner to the photographic data table 9201 (for example, FIG. 14) according to the first embodiment. The general command table 9704 includes a general-purpose user command URL set in advance. Therefore, in the third embodiment, the general command table 9704 is not operated and contents thereof do not change when a database is being operated.

If a session ID is issued in step 8502 shown in FIG. 30, the session ID and identification information of the user mobile terminal 1002 are written into a database as shown in FIG. 33. Specifically, in the remote support system 1000 according to the third embodiment, unlike in the first embodiment, the second responding section 3102 of the cloud server 1003 does not individually issue a user command URL for each user and a general-purpose user command URL is used. Therefore, in the third embodiment, information is identified by a session ID. As a result, a session ID is constantly attached to information such as a command and data, in a header, for example.

Steps 8008 to 8013, 8017, and 8018 subsequent to step 8503 shown in FIG. 30 are the same as steps 8008 to 8013, 8017, and 8018 shown in FIG. 10. Moreover, since a user command URL is not individually issued for each user and a general-purpose user command URL is used in the third embodiment, steps 8014 to 8016 shown in FIG. 10 are not executed in the third embodiment.

Steps 8101 to 8104 in FIG. 31 subsequent to step 8018 shown in FIG. 30 are the same as steps 8101 to 8104 according to the first embodiment shown in FIG. 11.

In step 8504 subsequent to step 8104, the command writing section 5102 of the operator operation terminal 1005 issues a request to write a camera activation command to the cloud server 1003. In the present third embodiment, the request to write a camera activation command includes a session ID in place of the user command URL according to the first embodiment. In step 8505, the command writing section 3116 of the cloud server 1003 stores a camera activation command as a user command in association with the specified session ID.

Figure 34:
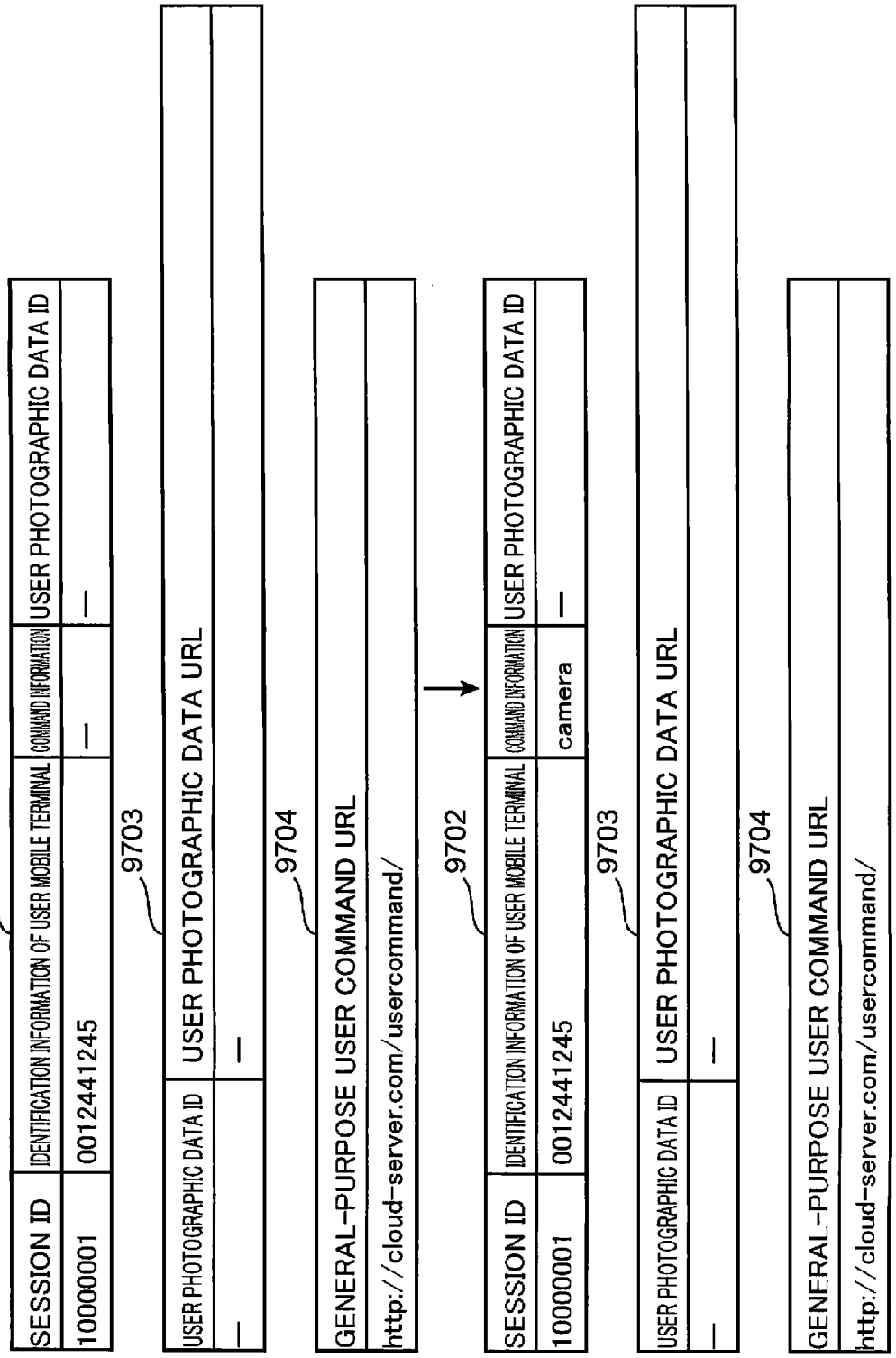
FIG. 34 is a diagram showing an example of a database operation when a camera activation command is stored as a user command in a cloud server according to the third embodiment of the present disclosure.

FIG. 34 is a diagram showing an example of a database operation when a cloud server stores a camera activation command as a user command according to the third embodiment of the present disclosure. In step 8505 in FIG. 31, as shown in FIG. 34, the camera activation command is written into a "command information" field in the ID table 9702 including a corresponding session ID. Moreover, the photographic data table 9703 does not change.

In step 8107 subsequent to step 8505 shown in FIG. 31, the third user acquiring section 2104 of the user mobile terminal 1002 issues a request to acquire a user command to the cloud server 1003. The request to acquire a user command includes, for example, a session ID. In step 8108, the third searching section 3113 of the cloud server 1003 searches for a user command stored in the information storage section 3120, from the session ID included in the request to acquire a user command. Steps 8109 to 8125 are the same as steps 8109 to 8125 shown in FIG. 11.

Figure 35:
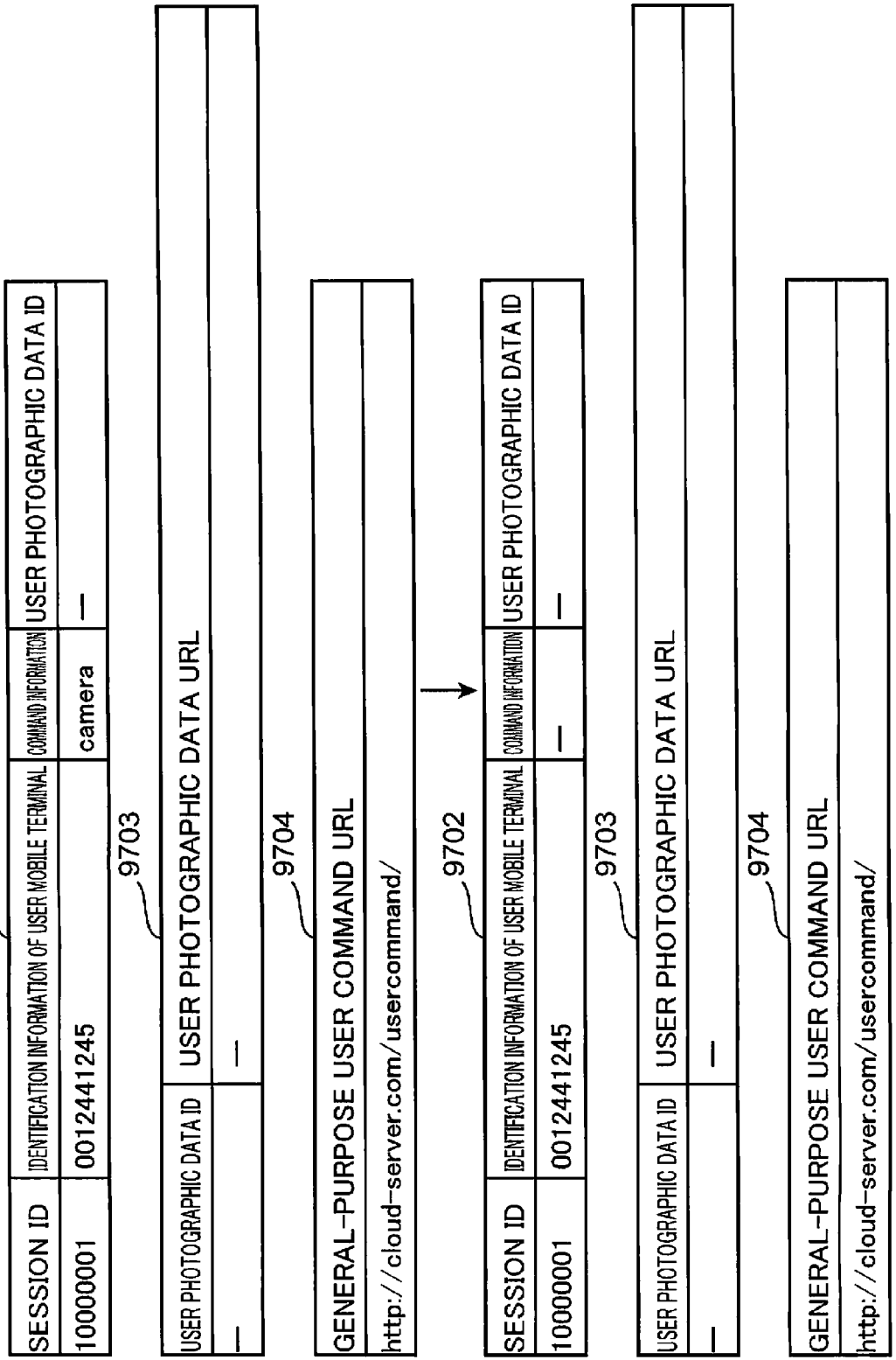
FIG. 35 is a diagram showing an example of a database operation when deleting a camera activation command of a cloud server according to the third embodiment of the present disclosure.

FIG. 35 is a diagram showing an example of a database operation when the cloud server deletes a camera activation command according to the third embodiment of the present disclosure. In step 8110 in FIG. 31, the camera activation command in the "command information" field of the ID table 9702 is deleted as shown in FIG. 35.

Figure 36:
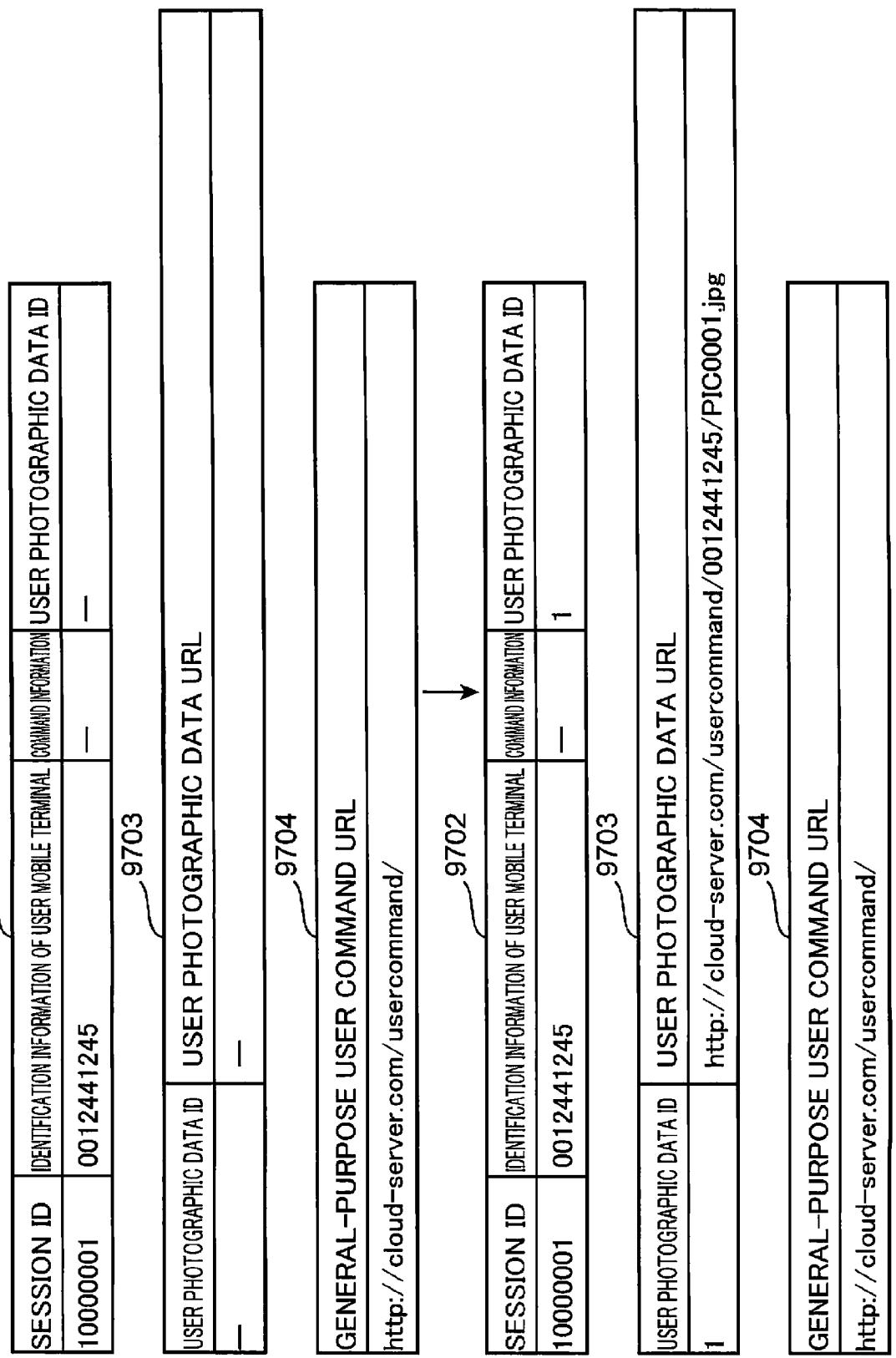
FIG. 36 is a diagram showing an example of a database operation when storing photographic data of a cloud server according to the third embodiment of the present disclosure.

FIG. 36 is a diagram showing an example of a database operation when the cloud server stores photographic data according to the third embodiment of the present disclosure. In step 8114 in FIG. 31, for example, "1" is written into a "user photographic data ID" field of the ID table 9702 as shown in FIG. 36. In addition, a corresponding "1" is written into a "user photographic data ID" field of the photographic data table 9703, and information representing a location of the photographic data is written into a "user photographic data URL" field.

Figure 37:
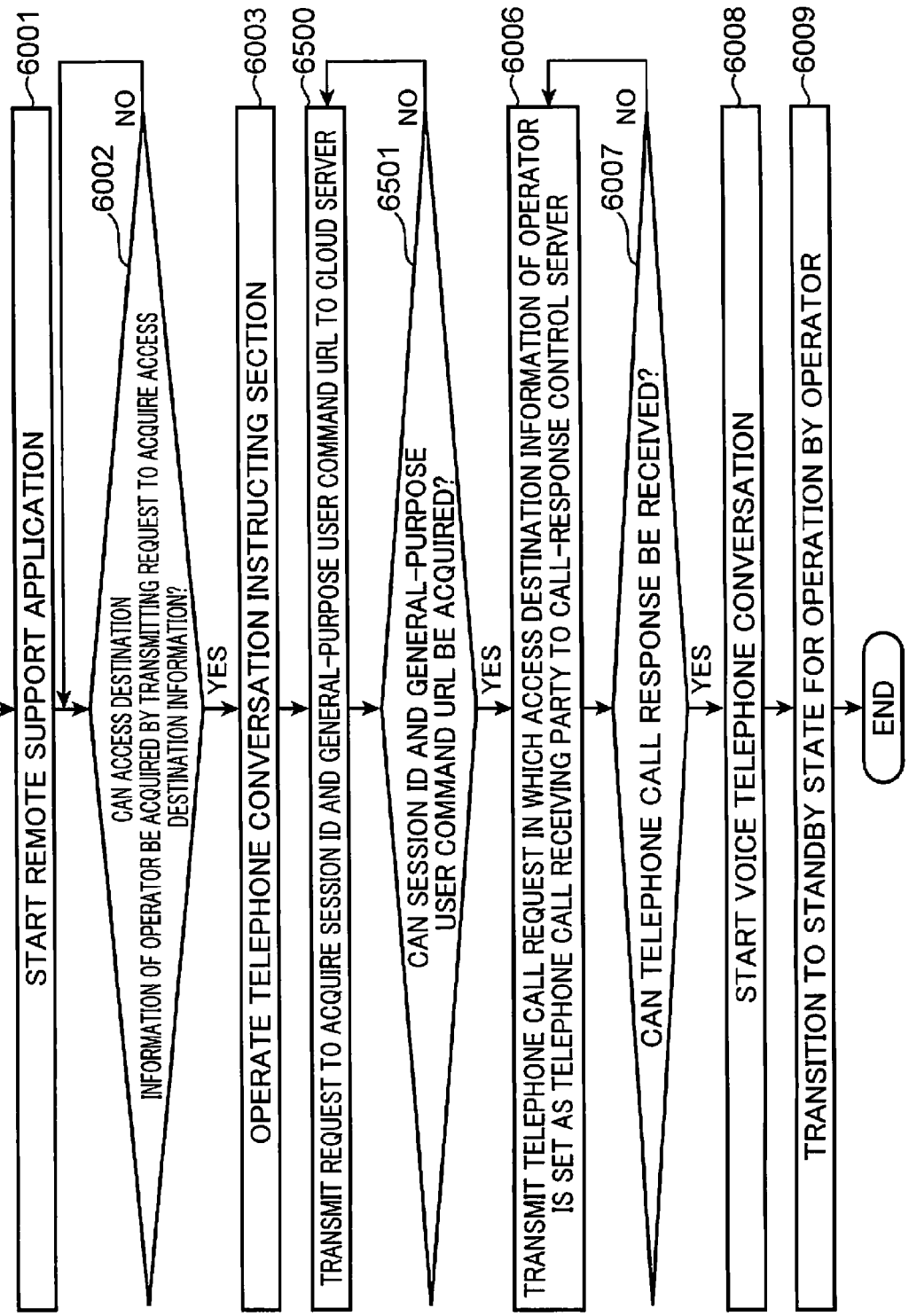
FIG. 37 is a diagram showing a process flow up to start of a telephone conversation of a user mobile terminal according to the third embodiment of the present disclosure.

FIG. 37 is a diagram showing a process flow up to start of a telephone conversation of the user mobile terminal 1002 according to the third embodiment of the present disclosure.

Steps 6001 to 6003 in FIG. 37 are the same as steps 6001 to 6003 according to the first embodiment shown in FIG. 20. In step 6500 subsequent to step 6003, the second user acquiring section 2102 transmits a request to acquire a session ID and a general-purpose user command URL to the cloud server 1003. In step 6501, a determination is made on whether or not the second user acquiring section 2102 can acquire a session ID and a general-purpose user command URL from the cloud server 1003. If the second user acquiring section 2102 cannot acquire a session ID and a general-purpose user command URL (NO in step 6501), the process returns to step 6500 to be repeated for, for example, a predetermined number of times.

If the second user acquiring section 2102 can acquire a session ID and a general-purpose user command URL (YES in step 6501), the process proceeds to step 6006. Steps 6006 to 6009 are the same as steps 6006 to 6009 shown in FIG. 20.

Figure 38:
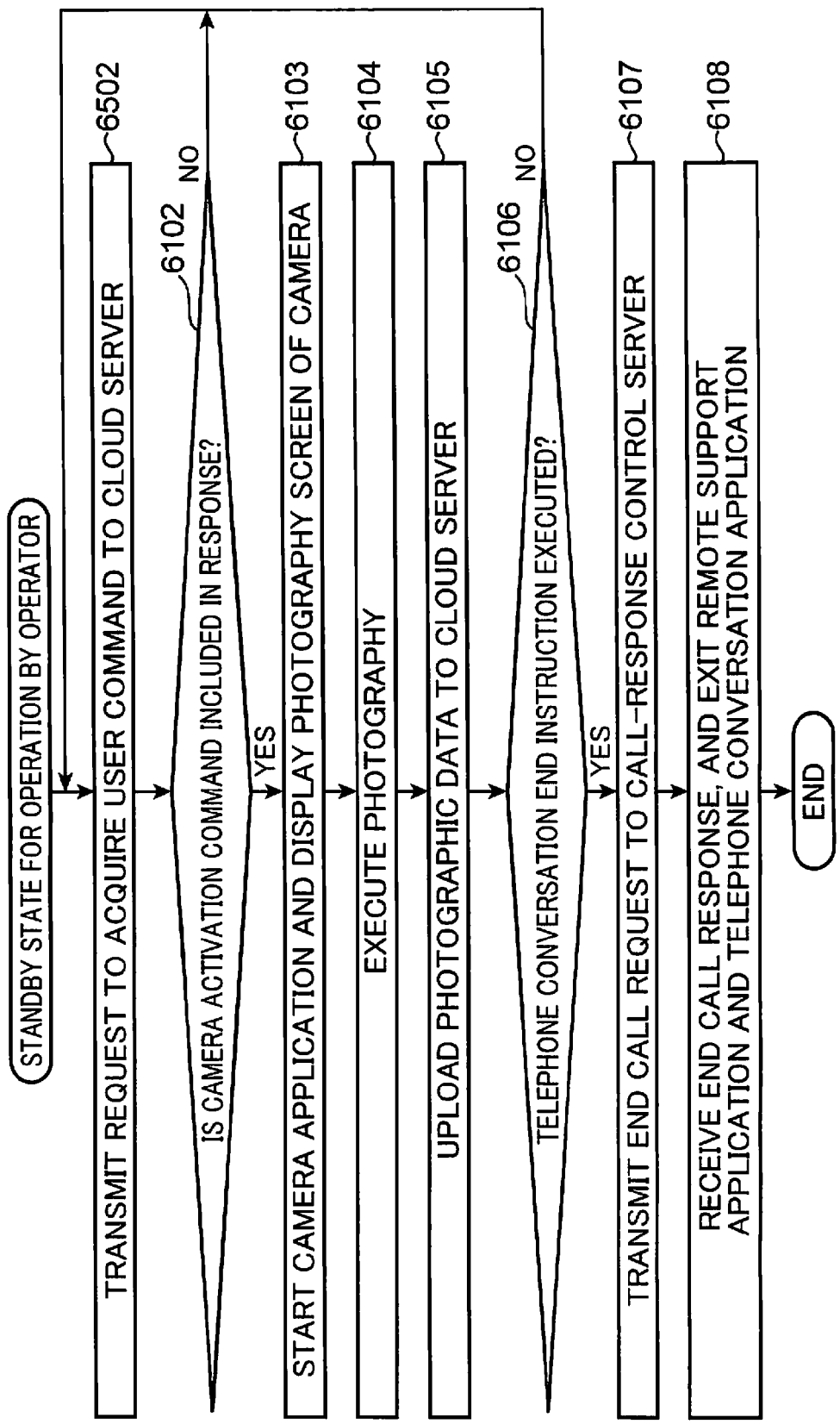
FIG. 38 is a diagram showing a process flow including and subsequent to start of a telephone conversation of a user mobile terminal according to the third embodiment of the present disclosure.

FIG. 38 is a diagram showing a process flow including and subsequent to start of a telephone conversation of the user mobile terminal 1002 according to the third embodiment of the present disclosure. The user mobile terminal 1002 is in a standby state for an operation by the operator.

In step 6502, the third user acquiring section 2104 transmits a request to acquire a user command to the cloud server 1003. The request to acquire a user command includes a session ID. In step 6102, a determination is made on whether or not the third user acquiring section 2104 can receive a response to the request to acquire a user command and whether or not a camera activation command is included in the received response. If a camera activation command is not included in the received response (NO in step 6102), the process returns to step 6502 and steps 6502 and 6102 are repeated. In other words, in a standby state for an operation by the operator, steps 6502 and 6102 are periodically repeated.

In step 6102, if a camera activation command is included in the response (YES in step 6102), the process proceeds to step 6103. Steps 6103 to 6108 are the same as steps 6103 to 6108 according to the first embodiment shown in FIG. 21.

Figure 39:
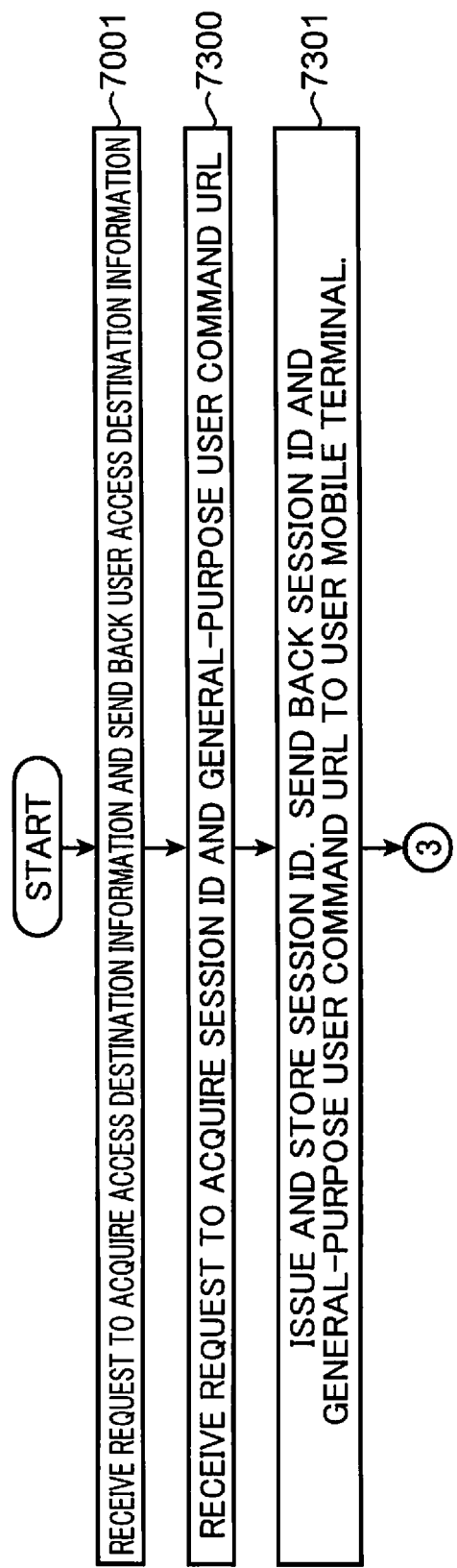
FIG. 39 is a diagram showing a process flow up to start of a telephone conversation of a cloud server according to the third embodiment of the present disclosure.

FIGS. 39 and 40 are diagrams showing a process flow of the cloud server 1003 according to the third embodiment of the present disclosure. FIG. 39 shows a process flow up to start of a telephone conversation, and FIG. 40 shows a process flow including and subsequent to the start of a telephone conversation.

Step 7001 shown in FIG. 39 is the same as step 7001 according to the first embodiment shown in FIG. 22. In step 7300 subsequent to step 7001, the cloud server 1003 receives a request to acquire a session ID and a general-purpose user command URL from the user mobile terminal 1002. In step 7301, the second responding section 3102 issues a session ID and stores the session ID in the information storage section 3120. In addition, the second responding section 3102 sends back the session ID and the general-purpose user command URL to the user mobile terminal 1002.

Step 7101 shown in FIG. 40 subsequent to step 7301 is the same as step 7101 according to the first embodiment shown in FIG. 23. In step 7302 subsequent to step 7101, the command writing section 3116 stores a camera activation command as a user command in association with the specified session ID in the information storage section 3120. Step 7103 subsequent to step 7302 is the same as step 7103 shown in FIG. 23.

In step 7303 subsequent to 7103, the third searching section 3113 searches the information storage section 3120 to determine whether or not a camera activation command exists in the specified session ID.

If a camera activation command does not exist in the specified session ID (NO in step 7303), in step 7304, the fourth responding section 3104 sends back the fact that an instruction does not exist in the corresponding session ID to the user mobile terminal 1002 and the process returns to step 7103.

If a camera activation command exists in the specified session ID (YES in step 7303), the process proceeds to step 7105. Steps 7105 to 7114 are the same as steps 7105 to 7114 shown in FIG. 23.

As described above, in the third embodiment, a general-purpose user command URL is used instead of issuing a user command URL for each user mobile terminal 1002 and data and information such as a command are identified based solely on a session ID. Therefore, in the third embodiment, as shown in FIG. 30, control is simplified as compared to the first embodiment such as steps 8013 to 8016 shown in FIG. 10 no longer being executed.

INDUSTRIAL APPLICABILITY

The present disclosure is useful as a device control method in a communication system and a device control method of an information apparatus for performing remote support of the information apparatus.

The invention claimed is:

1. A device control method in a communication system connectable via a network to an information apparatus of a user and to an information processing apparatus of a service center, the information apparatus being equipped with a first application for providing a telephone conversation function, a second application for providing a camera function, and a third application, the device control method comprising:

receiving a first communication access for an identifier from the information apparatus based on a telephone conversation instruction at the information apparatus, the telephone conversation instruction comprising an instruction to initiate a telephone conversation with the information processing apparatus, the information apparatus initiating the first application to execute a telephone conversation process with the information processing apparatus based on the telephone conversation instruction, and receiving the identifier, which identifies the information apparatus, the identifier being assigned to the information apparatus by the first communication access;

transmitting the identifier and a confirmation destination address to the information apparatus in response to the first communication access, the confirmation destination address confirming an instruction from the information processing apparatus to the information apparatus;

receiving from the information processing apparatus the instruction to the information apparatus in association with the identifier;

receiving from the information apparatus a second communication access for destination information using the confirmation destination address in association with the identifier; and transmitting the instruction to the information apparatus corresponding to the identifier, in response to the second communication access, wherein the third application is for requesting remote support to the communication system, when it is determined at the information apparatus that the transmitted instruction is an instruction to instruct the information apparatus to start the second application, the information apparatus is caused to continue the telephone conversation process using the first application and to start the second application absent a user operation at the information apparatus, and to receive from the information apparatus image information captured by the information apparatus using the camera function provided by the second application, and to forward the image information to the information processing apparatus, and the instruction to instruct the information apparatus to start the second application is generated by the information processing apparatus based on the third application.

2. The device control method according to claim 1, wherein the information processing apparatus acquires the identifier transmitted by the information apparatus.

3. The device control method according to claim 1, wherein a third communication access is received from the information apparatus based on start of the third application at the information apparatus;

address information of the information processing apparatus is transmitted to the information apparatus in response to the third communication access; and the information apparatus executes the telephone conversation process with the information processing apparatus, using the address information of the information processing apparatus, based on the telephone conversation instruction.

4. The device control method according to claim 3, wherein when a display screen corresponding to the third application is displayed on the information apparatus based on the start of the third application, the display screen includes a telephone conversation instruction button of the first application or an image capture button of the second application.

5. The device control method according to claim 1, wherein after the instruction to the information apparatus corresponding to the identifier is transmitted to the information apparatus in response to the second communication access, the instruction to the information apparatus is erased from the communication system.

6. The device control method according to claim 1, further comprising:

managing the instruction to the information apparatus with a value for identifying the instruction after receiving from the information apparatus the second communication access using the confirmation destination address in association with the identifier; and transmitting to the information apparatus the instruction to the information apparatus with the value for identifying the instruction, in response to the second communication access.

7. A method for controlling an information apparatus which is equipped with a first application for providing a telephone conversation function, a second application for providing a camera function, and a third application, the method causing a computer of the information apparatus to:

sense a telephone conversation instruction comprising an instruction to initiate a telephone conversation with a predetermined destination;

start the first application to perform the telephone conversation with the predetermined destination when the telephone conversation instruction is sensed;

execute a communication access to a predetermined server using address information of the predetermined server that differs from the predetermined destination, separately from the telephone conversation process, in response to sensing of the telephone conversation instruction;

receive an identifier and a confirmation destination address from the predetermined server, the identifier identifying the information apparatus, the confirmation destination address for confirming an instruction to the information apparatus from an information processing apparatus corresponding to the predetermined destination;

access the predetermined server based on the confirmation destination address to receive the instruction to the information apparatus from the predetermined server; and when it is judged that the received instruction provides an instruction to start the second application, start the second application absent a user operation at the information apparatus in a state where the telephone conversation process is continued using the first application on the information apparatus, and transmit to the predetermined server image information captured by the information apparatus using the camera function provided by the second application, wherein the third application is for requesting remote support to the communication system, and the instruction to start the second application is generated by the information processing apparatus based on the third application.

8. The method according to claim 7, wherein the method further comprises causing the computer of the information apparatus to:
start the third application when sensing an instruction to start the third application;
display on a display of the information apparatus a display screen which corresponds to the third application upon start of the third application, the display screen including a telephone conversation instruction button; and
execute a communication access to the predetermined server using address information of the predetermined server included in the third application, in response to the sensing of the telephone conversation instruction.

9. The method according to claim 7, wherein the method further comprising causing the computer of the information apparatus to: start the third application when sensing an instruction to start the third application;
execute a communication access to the predetermined server to acquire address information of the predetermined destination, using address information of the predetermined server included in the third application, upon start of the third application;
receive the address information of the predetermined destination from the predetermined server, in response to the communication access to the predetermined server; and
execute the telephone conversation process based on the start of the first application using the address information of the predetermined destination when the telephone conversation instruction is sensed.

10. The method according to claim 9, wherein a display screen corresponding to the third application is displayed on the information apparatus based on the start of the third application, the display screen including a telephone conversation instruction button of the first application.

11. The method according to claim 7, further causing the computer of the information apparatus to:
access the predetermined server based on the confirmation destination address to receive an instruction to the information apparatus from the predetermined server with a value for identifying the instruction; and
store the value for identifying the instruction in a memory of the information apparatus,
wherein when the received value is the same as a value previously stored in the memory of the information apparatus, the second application is not started.

12. The method according to claim 11, wherein the value for identifying the instruction comprises a hash value.

13. A non-transitory computer-readable recording medium which stores a program executable by an information apparatus that includes with a first application for providing a telephone conversation function, a second application for providing a camera function, and a third application,
the program, when executed, causing a computer of the information apparatus to:
sense a telephone conversation instruction comprising an instruction to initiate a telephone conversation with a predetermined destination;
start the first application to perform the telephone conversation with the predetermined destination when the telephone conversation instruction is sensed;
execute a communication access to a predetermined server using address information of the predetermined server that differs from the predetermined destination, separately from the telephone conversation process, in response to sensing of the telephone conversation instruction;
receive an identifier and a confirmation destination address from the predetermined server, the identifier identifying the information apparatus, the confirmation destination address being for confirming an instruction to the information apparatus from an information processing apparatus corresponding to the predetermined destination;
access the predetermined server based on the confirmation destination address to receive the instruction to the information apparatus from the predetermined server; and
when it is judged that the received instruction provides an instruction to start the second application, start the second application absent a user operation at the information apparatus in a state where the telephone conversation process is continued using the first application on the information apparatus, and transmit to the predetermined server image information captured by the information apparatus using the camera function provided by the second application,
wherein the third application is for requesting remote support to the communication system, and
the instruction to start the second application is generated by the information processing apparatus based on the third application.

14. The computer-readable recording medium according to claim 13,
wherein the program is usable to request remote support to the information processing apparatus,
wherein the program further causes the computer of the information apparatus to:
display on a display of the information apparatus a display screen which corresponds to the program, based on start of the program, the display screen including a telephone conversation instruction button; and
execute a communication access to the predetermined server, using address information of the predetermined server included in the program, in response to sensing of the telephone conversation instruction.

15. The computer-readable recording medium according to claim 13,
wherein the program is usable to request remote support to the information processing apparatus,
wherein the program further causing the computer of the information apparatus to:
execute a communication access to the predetermined server to acquire address information of the predetermined destination, using address information of the predetermined server included in the program, upon start of the program;
receive the address information of the predetermined destination from the predetermined server, in response to the communication access to the predetermined server; and
execute the telephone conversation process based on the start of the first application using the address information of the predetermined destination when the telephone conversation instruction is sensed.

16. The computer-readable recording medium according to claim 15,
wherein a display screen corresponding to the program is displayed on the information apparatus based on the start of the program, the display screen including a telephone conversation instruction button of the first application.

17. The computer-readable recording medium according to claim 13,
wherein the program further causing the computer of the information apparatus to:
receive from the predetermined server an instruction to the information apparatus with a value for identifying the instruction by accessing the predetermined server based on the confirmation destination address; and
store the value for identifying the instruction in a memory of the information apparatus, wherein when the received value is the same as a value previously stored in the memory of the information apparatus, the second application is not started.

18. The computer-readable recording medium according to claim 17, wherein the value for identifying the instruction comprises a hash value.

* * * * *